US009744949B2

(12) United States Patent
Takezawa et al.

(10) Patent No.: US 9,744,949 B2
(45) Date of Patent: Aug. 29, 2017

(54) VEHICLE SPEED CONTROL DEVICE AND VEHICLE EQUIPPED WITH VEHICLE SPEED CONTROL DEVICE

(75) Inventors: Yoshinori Takezawa, Kobe (JP); Shinpei Matsuo, Kobe (JP); Naoya Taniguchi, Wakayama (JP); Satoshi Katsumoto, Wakayama (JP)

(73) Assignees: NABTESCO CORPORATION, Tokyo (JP); ACRO NAINEN CO., LTD., Wakayama (JP)

( * ) Notice: Subject to any disclaimer, the term of this patent is extended or adjusted under 35 U.S.C. 154(b) by 122 days.

(21) Appl. No.: 14/346,702

(22) PCT Filed: Sep. 13, 2012

(86) PCT No.: PCT/JP2012/073469

§ 371 (c)(1),
(2), (4) Date: Mar. 21, 2014

(87) PCT Pub. No.: WO2013/047222

PCT Pub. Date: Apr. 4, 2013

(65) Prior Publication Data

US 2014/0224597 A1 Aug. 14, 2014

(30) Foreign Application Priority Data

Sep. 27, 2011 (JP) ................................ 2011-211361

(51) Int. Cl.
*F16D 59/00* (2006.01)
*B60T 1/06* (2006.01)
(Continued)

(52) U.S. Cl.
CPC ................ *B60T 1/067* (2013.01); *A61H 3/04* (2013.01); *B60T 7/126* (2013.01); *B60T 8/32* (2013.01);
(Continued)

(58) Field of Classification Search
CPC .... F16D 51/20; F16D 59/00; F16D 2127/002; F16D 2127/008; B62B 5/0404; B62B 5/048
See application file for complete search history.

(56) References Cited

U.S. PATENT DOCUMENTS 361,128 A 4/1887 Campbell
2,320,758 A * 6/1943 Sinclair .................. F16D 33/00 188/181 R
(Continued)

FOREIGN PATENT DOCUMENTS

JP 52-054570 U 4/1977
JP 57-094726 U 6/1982
(Continued)

OTHER PUBLICATIONS

Machine translation of JP09-135872, retrieved Feb. 8, 2016.*
(Continued)

*Primary Examiner* — Bradley King
(74) *Attorney, Agent, or Firm* — Studebaker & Brackett PC

(57) ABSTRACT

Provided is a vehicle speed control device with respect to which the speed at which a centrifugal brake operates can be easily changed from the outside without disassembling the device. A brake drum 11 is fixed to a vehicle body 101*a*. A brake shoe 23 rotates around a rotary shaft 20 of the wheel 101*c*, and reduces the rotation speed of the wheel 101*c* as a result of coming into contact with an inner circumferential side face of the brake drum 11. A spring 24 prevents contact between the brake drum 11 and the brake shoe 23 when the rotation speed of the wheel 101*c* is lower than or equal to a predetermined speed, and permits contact between the brake drum 11 and the brake shoe 23 when the rotation speed of the wheel 101*c* exceeds the predetermined speed. A position change mechanism 25 is installed within the brake drum 11,
(Continued)

and changes the position of an end of the spring 24 on one end side. A transmission mechanism 26 transmits a force that is input by an external operation to the position change mechanism 25 and drives the position change mechanism.

15 Claims, 26 Drawing Sheets

(51) Int. Cl.

| | |
|---|---|
| ***B60T 7/12*** | (2006.01) |
| ***B62B 5/04*** | (2006.01) |
| ***B60T 8/32*** | (2006.01) |
| ***F16D 51/20*** | (2006.01) |
| *F16D 121/14* | (2012.01) |
| *F16D 125/64* | (2012.01) |
| *F16D 127/00* | (2012.01) |
| *B60T 8/86* | (2006.01) |
| *A61H 3/04* | (2006.01) |

(52) U.S. Cl.

CPC ............ *B62B 5/0404* (2013.01); *B62B 5/048* (2013.01); *F16D 51/20* (2013.01); *F16D 59/00* (2013.01); *A61H 2003/046* (2013.01); *B60T 8/86* (2013.01); *F16D 2121/14* (2013.01); *F16D 2125/64* (2013.01); *F16D 2127/002* (2013.01); *F16D 2127/008* (2013.01)

(56) References Cited

U.S. PATENT DOCUMENTS

| | | | | | |
|---|---|---|---|---|---|
| 3,645,363 | A * | 2/1972 | Fuths | B41J 19/02 | 188/184 |
| 4,448,290 | A * | 5/1984 | Reid, Jr. | B66D 1/54 | 188/184 |
| 4,838,333 | A * | 6/1989 | Mottura | E06B 9/80 | 160/296 |
| 8,851,235 | B2 * | 10/2014 | Allington | A62B 1/08 | 182/234 |
| 2003/0042079 | A1 * | 3/2003 | Sanchez | B60T 1/062 | 187/373 |
| 2008/0142315 | A1 | 6/2008 | Kim | | |
| 2011/0220436 | A1 * | 9/2011 | Green | A62B 35/0093 | 182/232 |

FOREIGN PATENT DOCUMENTS

| | | | |
|---|---|---|---|
| JP | 61-045121 | A | 3/1986 |
| JP | 07-038766 | U | 7/1995 |
| JP | 08-268649 | A | 10/1996 |
| JP | 09-039800 | A | 2/1997 |
| JP | 09-135872 | A | 5/1997 |
| JP | 2001-017041 | A | 1/2001 |
| JP | 2005-103115 | A | 4/2005 |

OTHER PUBLICATIONS

An Office Action issued by the Chinese Patent Office on Sep. 6, 2015, which corresponds to Chinese Patent Application No. 201280045736.Xand is related to U.S. Appl. No. 14/346,702 with English language translation.

The extended European search report issued by the European Patent Office on Jun. 17, 2015, which corresponds to European Patent Application No. 12837484.0-1658 and is related to U.S. Appl. No. 14/346,702.

International Search Report; PCT/JP2012/073469; Dec. 18, 2012.

* cited by examiner

VEHICLE SPEED CONTROL DEVICE AND VEHICLE EQUIPPED WITH VEHICLE SPEED CONTROL DEVICE

TECHNICAL FIELD

The present invention relates to a vehicle speed control device that is provided in a vehicle whose vehicle body moves due to a wheel rotatably attached to the vehicle body rotating as a result of a person manually pushing the vehicle body and that is capable of controlling the vehicle speed, and to a vehicle equipped with this speed control device.

BACKGROUND ART

Conventionally, vehicle speed control devices are known that are provided in a vehicle whose vehicle body moves due to a wheel rotatably attached to the vehicle body rotating as a result of a person manually pushing the vehicle body, and that are capable of controlling the vehicle speed (e.g., see Patent Documents 1 and 2). Patent Documents 1 and 2 disclose speed control devices that are provided in a vehicle configured as a walking supporter or a walking assistance vehicle.

The speed control device disclosed in Patent Document 1 includes a governor brake mechanism section provided within a brake drum with a wheel. The governor brake mechanism section is provided as a mechanism that enables a braking action using a centrifugal force that acts under a rotation speed condition of an output shaft in the brake drum. More specifically, the governor brake mechanism section includes a governor plate that is integrated with the output shaft, a pair of brake shoes having a governor weight structure that are pivotably attached to the governor plate, and a governor spring. The governor spring is attached between ends of the brake shoes and the governor plate. Thus, when the rotation speed of the output shaft is larger than or equal to a predetermined rotation speed, the brake shoes that pivot due to the centrifugal force are pressed against the brake drum, and a braking force is generated.

The speed control device disclosed in Patent Document 2 includes a cylindrical locking disk, a support plate installed within the cylindrical locking disk, a pair of locking pieces, and a spring. The support plate is fixed to a rotary shaft of a wheel, and the pair of locking pieces are pivotably attached to the support plate. The spring connects the pair of locking pieces such that tips of the locking pieces pull each other. Since the pair of locking pieces are pulled by each other with the spring, they do not prevent the rotation of the rotary shaft as long as the rotary shaft rotates at a normal rotation speed. On the other hand, if the rotary shaft rotates rapidly, the support plate also rotates rapidly, and the locking pieces protrude out due to the centrifugal force. As a result, a locking portion of each locking piece is locked at a stepped locking portion formed in the inner face of a circumferential wall of the cylindrical locking disk, and the rotary shaft stops together with the support plate.

CITATION LIST

Patent Document

Patent Document 1: JP H9-135872A

Patent Document 2: JP 2005-103115A

DISCLOSURE OF THE INVENTION

Problem to be Solved by the Invention

With the vehicle speed control devices disclosed in Patent Documents 1 and 2, as the wheel speed increases, the governor weight or the locking pieces pivot radially outward due to the centrifugal force against the biasing force of the governor spring or the spring, as described above. Thus, a centrifugal brake is configured to work as a result of the governor weight or the locking pieces coming into contact with the brake drum or the cylindrical locking disk. However, with the speed control device disclosed in Patent Document 1, to change the speed at which the centrifugal brake operates, it is necessary to disassemble the speed control device itself and replace the governor weight or the governor spring. Similarly, with the speed control device disclosed in Patent Document 2, to change the speed at which the centrifugal brake operates, it is necessary to disassemble the speed control device itself and replace the locking pieces or the spring.

In light of the foregoing situation, an object of the present invention is to provide a vehicle speed control device with respect to which the speed at which a centrifugal brake operates can be easily changed from the outside without disassembling the device, and a vehicle equipped with this speed control device.

Means for Solving the Problem

A vehicle speed control device according to a first aspect of the present invention for achieving the above-stated object is a vehicle speed control device that is provided in a vehicle whose vehicle body moves due to a wheel rotatably attached to the vehicle body rotating as a result of a person manually pushing the vehicle body and is capable of controlling a speed of the vehicle, comprising: a brake drum that has a tubular portion and is fixed to the vehicle body; a brake shoe that rotates around a rotary shaft of the wheel and reduces a rotation speed of the wheel with friction by coming into contact with an inner circumferential side face of the brake drum; an elastic member for preventing contact between the brake drum and the brake shoe when the rotation speed of the wheel is lower than or equal to a predetermined speed, and permitting contact between the brake drum and the brake shoe when the rotation speed of the wheel exceeds the predetermined speed; a position change mechanism that is installed within the brake drum and changes a position of an end of the elastic member on one end side; and a transmission mechanism for transmitting a force that is input by an external operation to the position change mechanism and driving the position change mechanism.

With this configuration, if the rotation speed of the wheel exceeds the predetermined speed, the brake shoe comes into contact with the brake drum due to the centrifugal force against the biasing force of the elastic member, such as a spring or rubber, and the centrifugal brake operates. To change the speed at which the centrifugal brake operates, an operation of inputting an external force to the transmission mechanism is performed. With this operation, the operational force that is input from the outside is transmitted to the position change mechanism within the brake drum, and the position of the end of the elastic member on the one end side changes. Thus, the rotation speed of the wheel at which the brake shoe comes into contact with the brake drum due to the centrifugal force changes. Accordingly, the speed at which the centrifugal brake operates is changed without disassembling the speed control device, or without replacing parts such as a governor weight or a governor spring. As a result, the speed at which the centrifugal brake operates can be easily changed from the outside.

Accordingly, with this configuration, a vehicle speed control device with respect to which the speed at which the centrifugal brake operates can be easily changed from the outside without disassembling the device can be provided.

A vehicle speed control device according to a second aspect of the present invention is the vehicle speed control device of the first aspect of the present invention, wherein the position change mechanism has an elastic member position holding portion that holds the end of the elastic member on the one end side, and a drive portion for driving the elastic member position holding portion so as to change the position of the elastic member position holding portion that holds the end of the elastic member, with the force that is input from the outside and transmitted by the transmission mechanism, and the position change mechanism has at least one of a rack-and-pinion mechanism, a link mechanism, and a wedge-shaped mechanism with which the elastic member position holding portion is displaced as a result of opposed tapered faces sliding relative to each other.

With this configuration, since the position change mechanism is provided as at least one of a rack-and-pinion mechanism, a link mechanism, and a wedge-shaped mechanism, the mechanism for changing the position of the end of the elastic member on the one end side can be configured in a compact manner with a small structure.

A vehicle speed control device according to a third aspect of the present invention is the vehicle speed control device of the second aspect of the present invention, wherein the transmission mechanism has any one of an adjustment gear that is installed such that at least a part thereof is exposable to the outside, and transmits the force that is input from the outside, to the drive portion; a plate portion that is installed such that at least a part thereof is exposable to the outside, and is provided as a plate-like portion that is installed so as to be integrated with, fixed to or in contact with the drive portion; and an operating portion that is installed such that at least a part thereof is exposable to the outside, and is provided so as to be integrated with or fixed to a wedge-shaped member that is provided with one of the opposed tapered faces in the wedge-shaped mechanism.

With this configuration, the transmission mechanism includes the adjustment gear for transmitting a force to the drive portion, or the plate portion or the operating portion that is provided so as to be integrated with or fixed to the drive portion, or that is installed in contact with the drive portion, and it is provided so as to be exposable to the outside. For this reason, the transmission mechanism for transmitting an external force to the position change mechanism can be realized with a small number of constituent components and a simple structure. In particular, the transmission mechanism can be realized with a smaller number of constituent components and a simpler structure than in the case of configuring a transmission mechanism using a crank-and-cam mechanism.

A vehicle speed control device according to a fourth aspect of the present invention is the vehicle speed control device of any of the first to third aspects of the present invention, wherein at least one of the position change mechanism and the transmission mechanism has a positioning mechanism capable of positioning the end of the elastic member on the one end side by changing the position with respect to a plurality of predetermined positions.

With this configuration, at least one of the position change mechanism and the transmission mechanism is provided with the mechanism capable of positioning the end of the elastic member on the one end side at the plurality of predetermined positions. For this reason, the task of changing the speed at which the centrifugal brake is operated is facilitated, and the task of configuring settings such that the centrifugal brake operates at the same speed for both wheels of the vehicle can also be easily performed.

A vehicle speed control device according to a fifth aspect of the present invention is the vehicle speed control device of the fourth aspect of the present invention, wherein the position change mechanism has an elastic member position holding portion for holding the end of the elastic member on the one end side, and a drive portion for driving the elastic member position holding portion so as to change the position of the elastic member position holding portion that holds the end of the elastic member, with the force that is input from the outside and transmitted by the transmission mechanism, and the position change mechanism is configured as a wedge-shaped mechanism in which the elastic member position holding portion is displaced as a result of the opposed tapered faces sliding relative to each other, the elastic member position holding portion includes an elastic member-side wedge-shaped member provided with one of the opposed tapered faces, the drive portion includes a drive-side wedge-shaped member provided with the other of the opposed tapered faces, and the positioning mechanism has a plurality of recessed portions provided in one of the tapered face of the elastic member-side wedge-shaped member and the tapered face of the drive-side wedge-shaped member, and a projecting portion that is provided in the other of the tapered face of the elastic member-side wedge-shaped member and the tapered face of the drive-side wedge-shaped member, and that is capable of being locked in the recessed portions.

With this configuration, the positioning mechanism is constituted by the plurality of recessed portions in one of the tapered face of the elastic member-side wedge-shaped member and the tapered face of the drive-side wedge-shaped member, and a projecting portion in the other of the tapered face of the elastic member-side wedge-shaped member and the tapered face of the drive-side wedge-shaped member. For this reason, the positioning mechanism can be realized with a simple structure in the position change mechanism provided as a wedge-shaped mechanism in which the tapered faces slide relative to each other. Note that a configuration may also be implemented in which a plurality of projecting portions capable of being locked with respect to the recessed portions are provided. In this case, even in the case where one of the projecting portions is damaged, another projecting portion can be locked at the recessed portions, and therefore, the function of the centrifugal brake can be guaranteed.

A vehicle speed control device according to a sixth aspect of the present invention is the vehicle speed control device of the fourth aspect of the present invention, wherein the position change mechanism has an elastic member position holding portion for holding the end of the elastic member on the one end side, and a drive portion for driving the elastic member position holding portion so as to change the position of the elastic member position holding portion that holds the end of the elastic member, with the force that is input from the outside and transmitted by the transmission mechanism, the transmission mechanism has a rotary plate portion that is installed such that at least a part thereof is exposable to the outside and is provided as a plate-like portion installed so as to be integrated with, fixed to or in contact with the drive portion, and the force is input to the rotary plate portion as a result of a rotating operation from the outside, and the positioning mechanism has a through hole provided in the rotary plate portion, and a pin member that is installed in a state of passing through the through hole and is capable of being locked with respect to the through hole at a plurality of points of the through hole.

With this configuration, as a result of the operation being performed to rotate the rotary plate portion, which is provided so as to be integrated with or fixed to the drive portion or installed in contact with the drive portion, and is exposed to the outside, the pin member is locked with respect to the through hole in the rotary plate portion, and the end of the elastic member on the one end side can be positioned at the plurality of predetermined positions. Accordingly, a configuration can be realized in which a separate tool is not necessary for the task of changing the speed at which the centrifugal brake is operated. Further, the user can easily recognize the set state of the speed at which the centrifugal brake is operated by visually checking, from the outside, the position where the pin member is locked with respect to the through hole in the rotary plate that is exposed to the outside. For this reason, a configuration can be realized that does not need a separate indicator for enabling the set state of the speed at which the centrifugal brake is operated to be recognized from the outside.

A vehicle speed control device according to a seventh aspect of the present invention is the vehicle speed control device of any of the first to sixth aspects of the present invention, wherein the elastic member is provided as a compression spring for biasing the brake shoe with respect to the position change mechanism, in a compressed state.

With this configuration, the elastic member for operating the centrifugal brake is provided as a compression spring, and therefore variation in the adjustment thereof in the initial state is reduced, compared with the case of a tension spring. Further, in the case of a compression spring, the free length of the spring, which is the length of the spring in a state where a load is not applied, is accurately defined, compared with a tension spring. For this reason, the operational condition of the spring for operating the centrifugal brake in the initial state can be set with further accuracy.

A vehicle speed control device according to an eighth aspect of the present invention is the vehicle speed control device of any of the first to seventh aspects of the present invention, further comprising: a planetary gear mechanism that is provided on a path through which rotation is transmitted from the wheel to the brake shoe, accelerates and transmits the rotation of the wheel.

With this configuration, the planetary gear mechanism, which serves as an acceleration mechanism capable of efficient acceleration in a small space, is provided on the path through which the rotation is transmitted from the wheel to the brake shoe. For this reason, even in the case of a vehicle having a wheel with a low rotation speed, a configuration can be easily realized in which the centrifugal brake is operated at a desired rotation speed of the wheel.

A vehicle speed control device according to a ninth aspect of the present invention is the vehicle speed control device of the eighth aspect of the present invention, wherein the planetary gear mechanism has a sun gear, a planetary gear that rotates on own axis and revolves around the sun gear while meshing with the sun gear, and a carrier that rotatably supports the planetary gear, and the carrier is provided so as to be integrated with or fixed to a wheel structure portion of the wheel.

With this configuration, since the carrier in the planetary gear mechanism is provided so as to be integrated with or fixed to the wheel structure portion of the wheel, an increase in the size of the vehicle body in the width direction can be suppressed, and the speed control device can be made compact in the width direction of the vehicle body.

A vehicle speed control device according to a tenth aspect of the present invention is the vehicle speed control device of the ninth aspect of the present invention, wherein the planetary gear mechanism includes: a first-stage accelerating portion having the sun gear, the planetary gear, and the carrier; and a second-stage accelerating portion that has the sun gear, the planetary gear, and the carrier, and accelerates and transmits rotation of the first-stage accelerating portion, and the carrier in the first-stage accelerating portion is provided so as to be integrated with or fixed to the wheel structure portion of the wheel, and the sun gear in the first-stage accelerating portion and the carrier in the second-stage accelerating portion are provided so as to be integrated with or fixed to each other.

With this configuration, the sun gear in the first-stage accelerating portion and the carrier in the second-stage accelerating portion are provided so as to be integrated with or fixed to each other. For this reason, even if a large speed increasing ratio needs to be ensured due to an increase in the wheel diameter and therefore a planetary gear mechanism having two or more stages is provided, an increase in the size of the vehicle body in the width direction can be suppressed, and the speed control device can be made compact in the width direction of the vehicle body.

A vehicle speed control device according to an eleventh aspect of the present invention is the vehicle speed control device of any of the first to tenth aspects of the present invention, wherein a tire provided on an outer circumference of the wheel is installed concentrically with the brake drum.

With this configuration, since the tire on the outer circumference of the wheel is installed concentrically with the brake drum, an increase in the size of the vehicle body in the width direction can be suppressed, and the speed control device can be made compact in the width direction of the vehicle body.

A vehicle speed control device according to a twelfth aspect of the present invention is the vehicle speed control device of any of the first to eleventh aspects of the present invention, further comprising: a cover that is detachably attached to the wheel on the outside in a vehicle width direction that is a width direction of the vehicle body, and covers a part of the wheel; and an operation tool that is installed on the cover in an attachable and detachable manner on the inside in the vehicle width direction, and is used in an operation by which the force from the outside is input to the transmission mechanism.

With this configuration, when the speed at which the centrifugal brake operates is changed, the user can remove the cover attached to the wheel to detach the operation tool from the inside of the cover, and input an operational force to the transmission mechanism using the operation tool. Accordingly, when the user wants to change the speed at which the centrifugal brake operates, he/she can promptly carry out the change.

A vehicle speed control device according to a thirteenth aspect of the present invention is the vehicle speed control device of the second aspect of the present invention, wherein in the position change mechanism having the wedge-shaped mechanism, the elastic member position holding portion includes an elastic member-side wedge-shaped member provided with one of the opposed tapered faces, and the drive portion includes a drive-side wedge-shaped member provided with the other of the opposed tapered faces, and the transmission mechanism includes an adjustment gear that is installed such that at least a part thereof is exposable to the outside and transmits the force that is input from the outside to the drive portion, a pinion that meshes with the adjustment gear, and a rack portion that meshes with the pinion and is provided so as to be integrated with or fixed to the drive-side wedge-shaped member.

With this configuration, as a result of the operational force being input to the adjustment gear, the pinion that meshes with the adjustment gear rotates, and further, the rack portion that meshes with the pinion moves. Then, the elastic member-side wedge-shaped member is driven by the drive-side wedge-shaped member provided so as to be integrated with or fixed to the rack portion, and the position of the end of the elastic member on the one end side changes. Accordingly, the position change mechanism including the wedge-shaped mechanism and the transmission mechanism including the rack-and-pinion mechanism can be configured in a compact manner with a simple structure.

A vehicle speed control device according to a fourteenth aspect of the present invention is the vehicle speed control device of the thirteenth aspect of the present invention, wherein an outer gear that is provided on an outer circumference of the adjustment gear and meshes with the pinion is provided as a part in a circumferential direction of the adjustment gear.

With this configuration, the outer gear that meshes with the pinion on the outer circumference of the adjustment gear is provided as a part in the circumferential direction of the adjustment gear, and it is therefore possible to prevent the adjustment gear from excessively rotating the pinion. Further, the mechanism for preventing the position of the end of the elastic member on the one end side from being excessively changed can be realized with a simple structure in which the outer gear of the adjustment gear is provided as a part in the circumferential direction of the adjustment gear.

A vehicle speed control device according to a fifteenth aspect of the present invention is the vehicle speed control device of the thirteenth or fourteenth aspect of the present invention, further comprising: a support plate in which the position change mechanism is installed, and that pivotably supports the brake shoe and rotatably supports the adjustment gear and the pinion; and a pressure plate that is attached so as to be opposed to the support plate via the brake shoe, the adjustment gear, the pinion, and the position change mechanism, in a state of being parallel to the support plate.

With this configuration, the brake shoe, the adjustment gear, the pinion, and the position change mechanism are installed in a compact area between the support plate and the pressure plate that are installed in parallel. For this reason, an increase in the size of the vehicle body in the width direction can be suppressed, and the speed control device can be made compact in the width direction of the vehicle body.

Furthermore, as an invention according to another aspect for achieving the above-stated object, an invention of a vehicle equipped with the above-described speed control device can also be configured. That is to say, a vehicle according to a sixteenth aspect of the present invention is a vehicle equipped with the vehicle speed control device according to any of the first to fifteenth aspects of the present invention, wherein the vehicle body moves due to the wheel rotatably attached to the vehicle body rotating as a result of a person manually pushing the vehicle body.

With this configuration, a vehicle that achieves an effect similar to that of the vehicle speed control device of any of the first to fifteenth aspects of the present invention can be provided.

Effects of the Invention

According to the present invention, a vehicle speed control device with respect to which the speed at which a centrifugal brake operates can be easily changed from the outside without disassembling the device, and a vehicle equipped with this speed control device can be provided.

DESCRIPTION OF EMBODIMENTS

Hereinafter, modes for carrying out the present invention will be described with reference to the drawings. The present invention is applicable to a vehicle speed control device that is provided in a vehicle whose vehicle body moves dues to a wheel rotatably attached to the vehicle body rotating as a result of a person manually pushing the vehicle body (i.e., as a result of the vehicle body being pushed) and that is capable of controlling the vehicle speed, and to a vehicle equipped with this speed control device.

Figure 1:
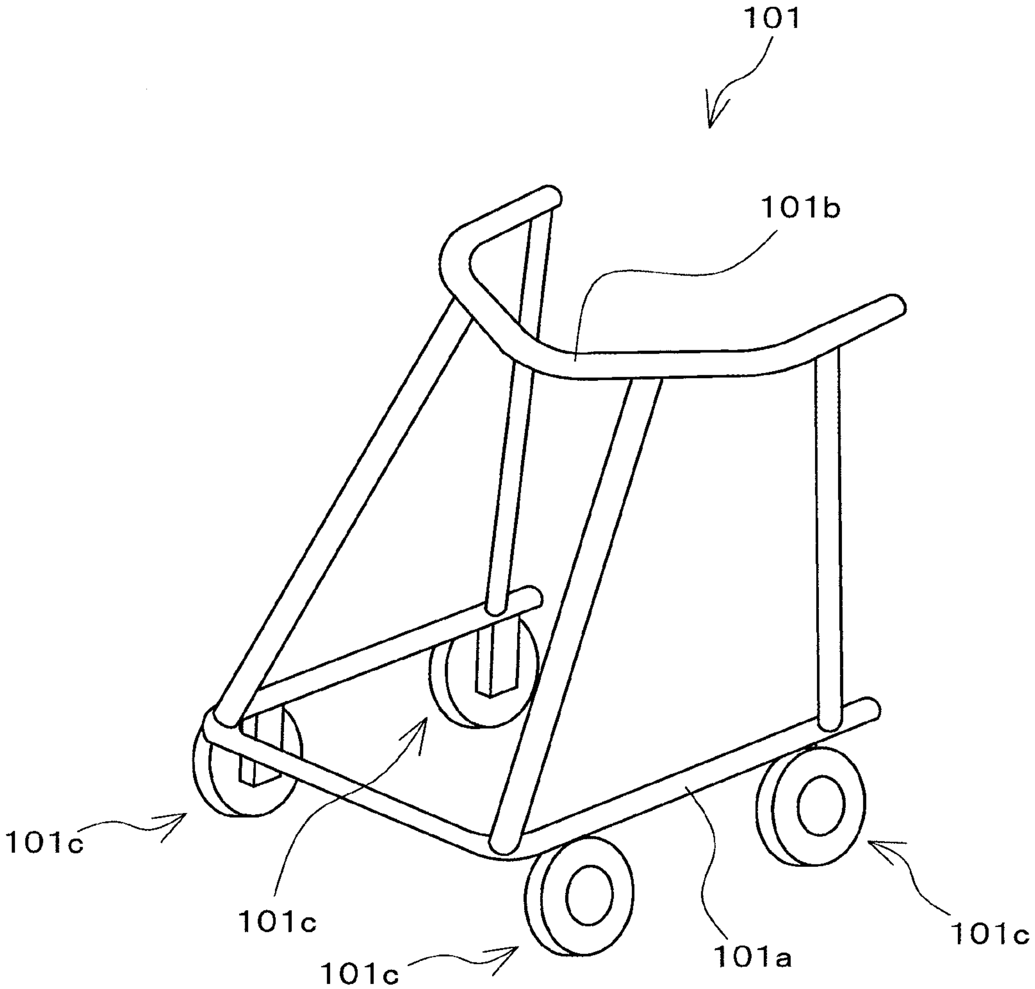
FIG. 1 is a perspective view of a horse-shoe rollator, which is shown as an exemplary vehicle according to embodiments of the present invention.

FIG. 1 is a perspective view of a horse-shoe rollator 101, which is shown as an exemplary vehicle according to embodiments of the present invention. The horse-shoe rollator 101 is used in walking training for rehabilitation. This horse-shoe rollator 101 is configured as a vehicle whose vehicle body 101*a* moves due to wheels 101*c* rotatably attached to the vehicle body 101*a* rotating as a result of a person (user, not shown) manually pushing a hand-push operating portion 101*b*. Note that one wheel 101*c* is provided at each of the two sides in the width direction of the vehicle body 101*a* on the front side, i.e., on the vehicle forward direction side, and one wheel 101*c* is provided at each of the two sides in the width direction of the vehicle body 101*a* on the rear side, i.e., on the vehicle backward direction side. That is to say, four wheels 101*c* are provided in total, respectively at the two sides in the front and at the two sides in the back of the vehicle body 101*a*.

Figure 2:
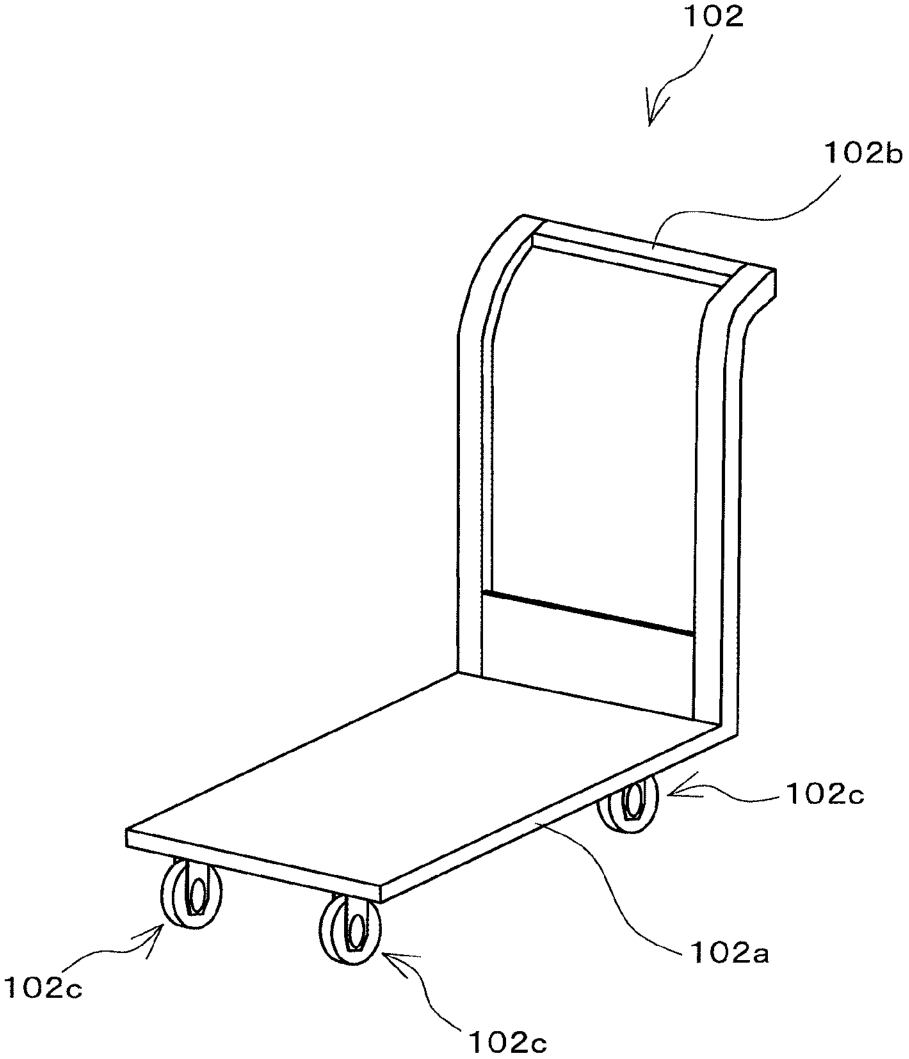
FIG. 2 is a perspective view of a hand truck, which is shown as an exemplary vehicle according to embodiments of the present invention.

FIG. 2 is a perspective view of a hand truck 102, which is shown as an exemplary vehicle according to the embodiments of the present invention. The hand truck 102 is used for transporting goods. This hand truck 102 is configured as a vehicle whose vehicle body 102*a* moves due to wheels 102*c* rotatably attached to the vehicle body 102*a* rotating as a result of a person (user, not shown) manually pushing a hand-push operating portion 102*b*. Note that one wheel 102*c* is provided at each of the two sides in the width direction of the vehicle body 102*a* on the front side, i.e., on the vehicle forward direction side, and one wheel 102*c* is provided at each of the two sides in the width direction of the vehicle body 102*a* on the rear side, i.e., on the vehicle backward direction side. That is to say, four wheels 102*c* are provided in total, at the two sides in the front and at the two sides in the back of the vehicle body 102*a*. A vehicle speed control device according to the embodiments of the present invention and a vehicle according to the embodiments of the present invention that includes this speed control device are applicable not only to the above-described horse-shoe rollator 101 and the hand truck 102, but to various kinds of vehicle that moves due to wheels rotating as a result of being manually pushed by a person. Exemplary vehicles other than the aforementioned vehicles include a stroller for carrying an infant, a rollator used for assisting walking of the aged, and the like.

A description will now be given of first to sixth embodiments of the vehicle speed control device to be applied to the vehicle according to the embodiments of the present invention, such as those described above. Note that in the following description of the first to sixth embodiments, the horse-shoe rollator 101 (hereinafter referred to as the "vehicle 101") will be used as an exemplary vehicle to which the vehicle speed control device is applied, and will be described with this reference numeral.

First Embodiment

Figure 3:
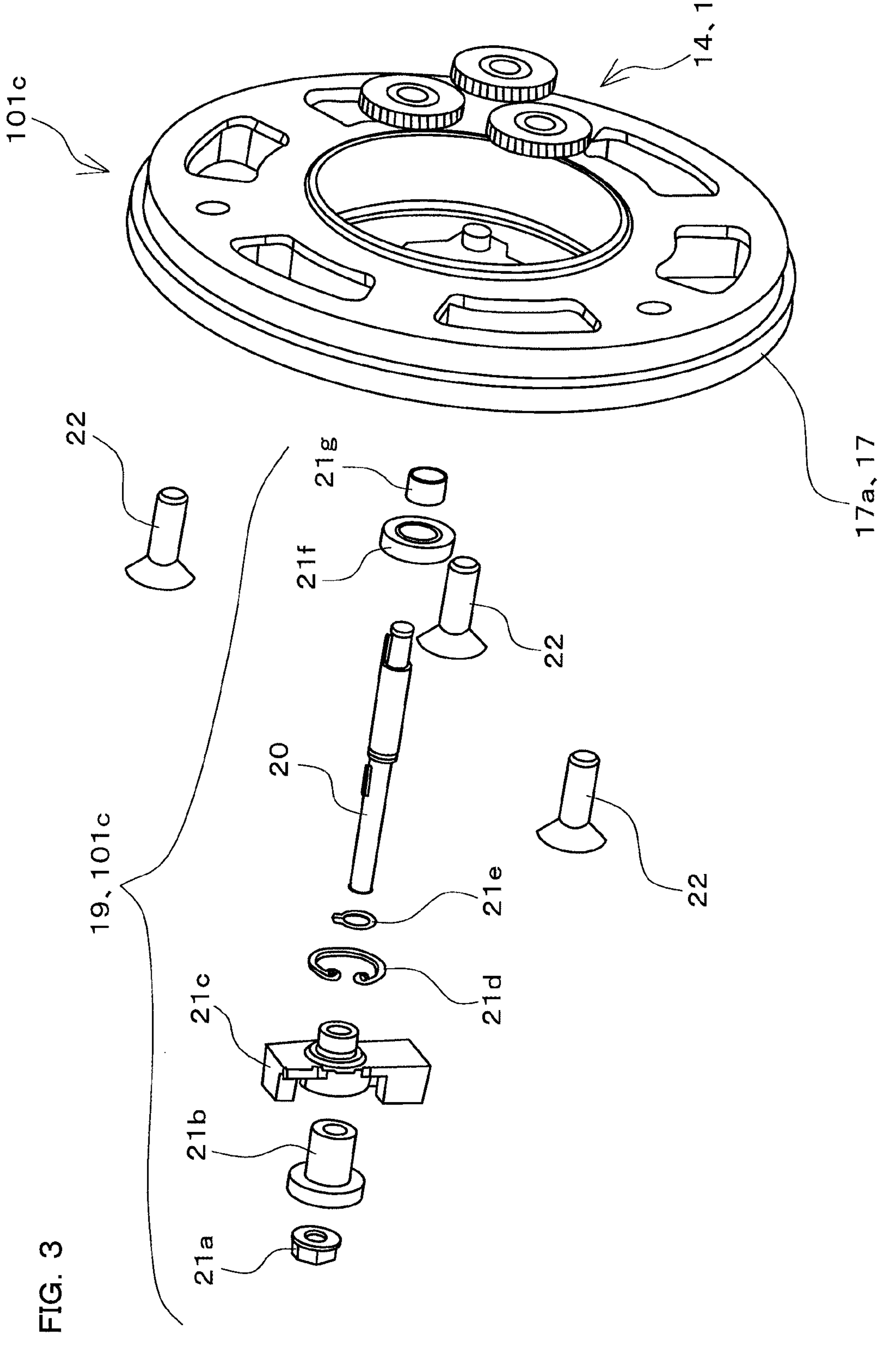
FIG. 3 is an exploded perspective view showing a wheel and a part of a vehicle speed control device according to a first embodiment of the present invention.
Figure 4:
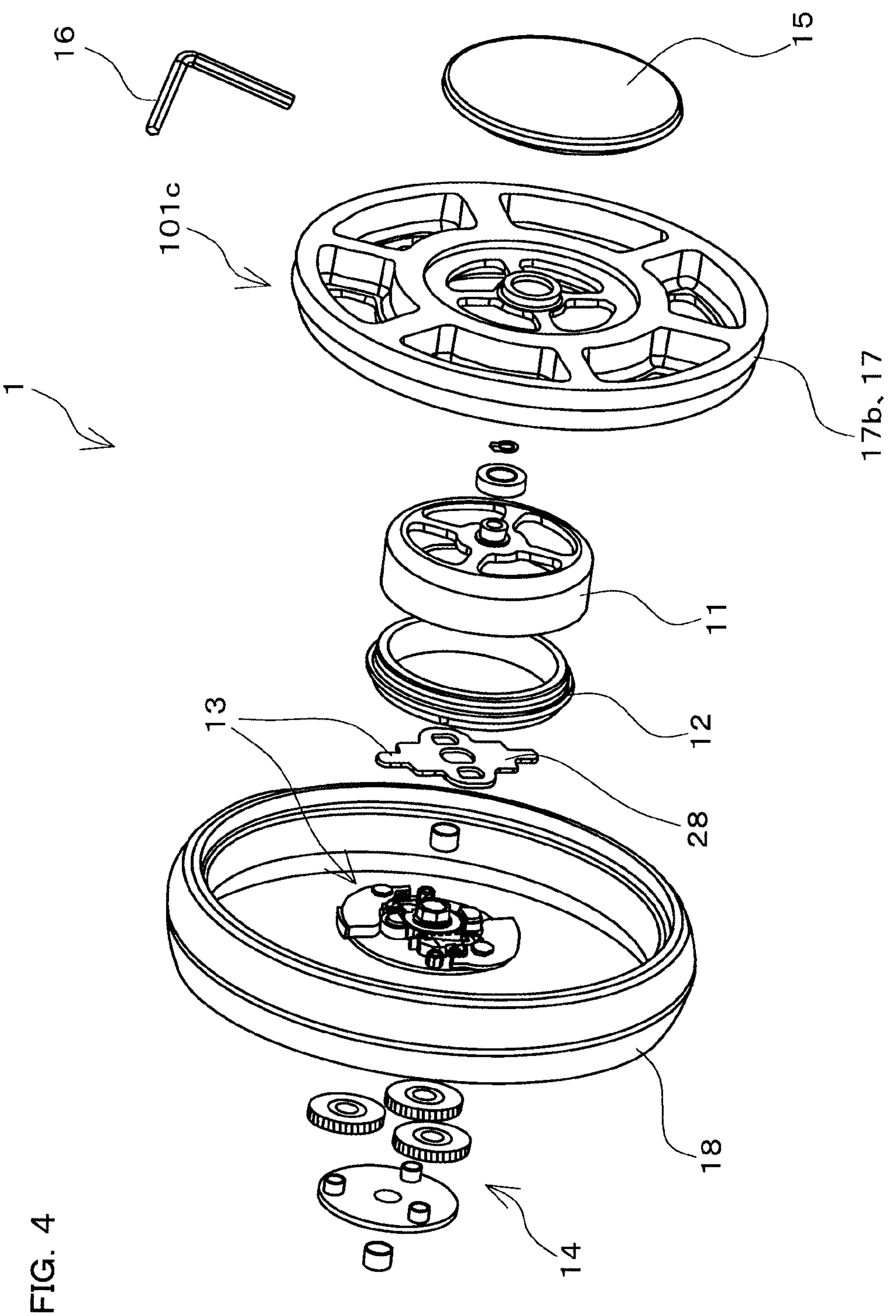
FIG. 4 is an exploded perspective view showing the wheel and a part of the vehicle speed control device according to the first embodiment of the present invention.
Figure 5:
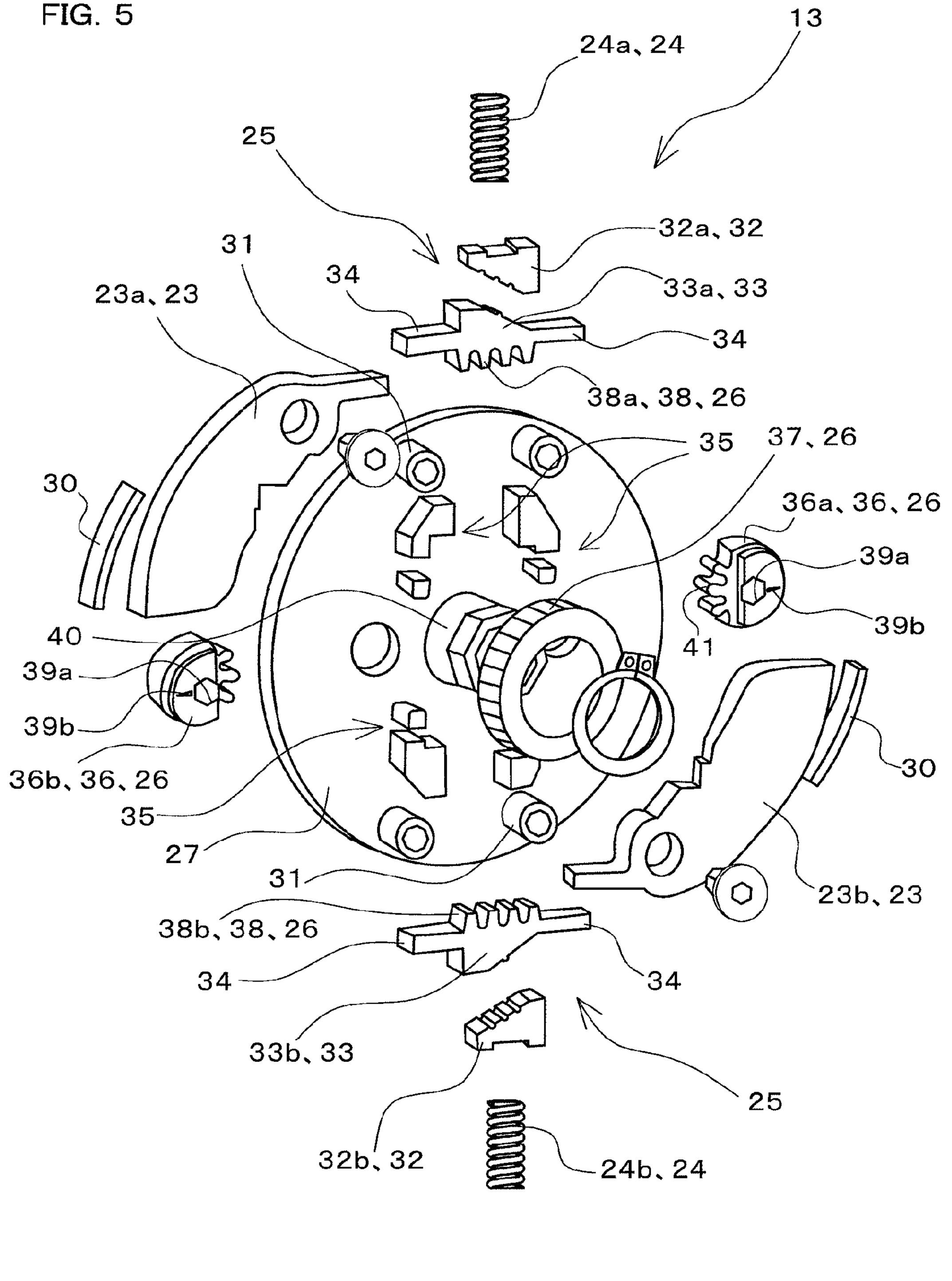
FIG. 5 is an exploded perspective view showing an enlargement of a part of the vehicle speed control device shown in FIG. 4.
Figure 6:
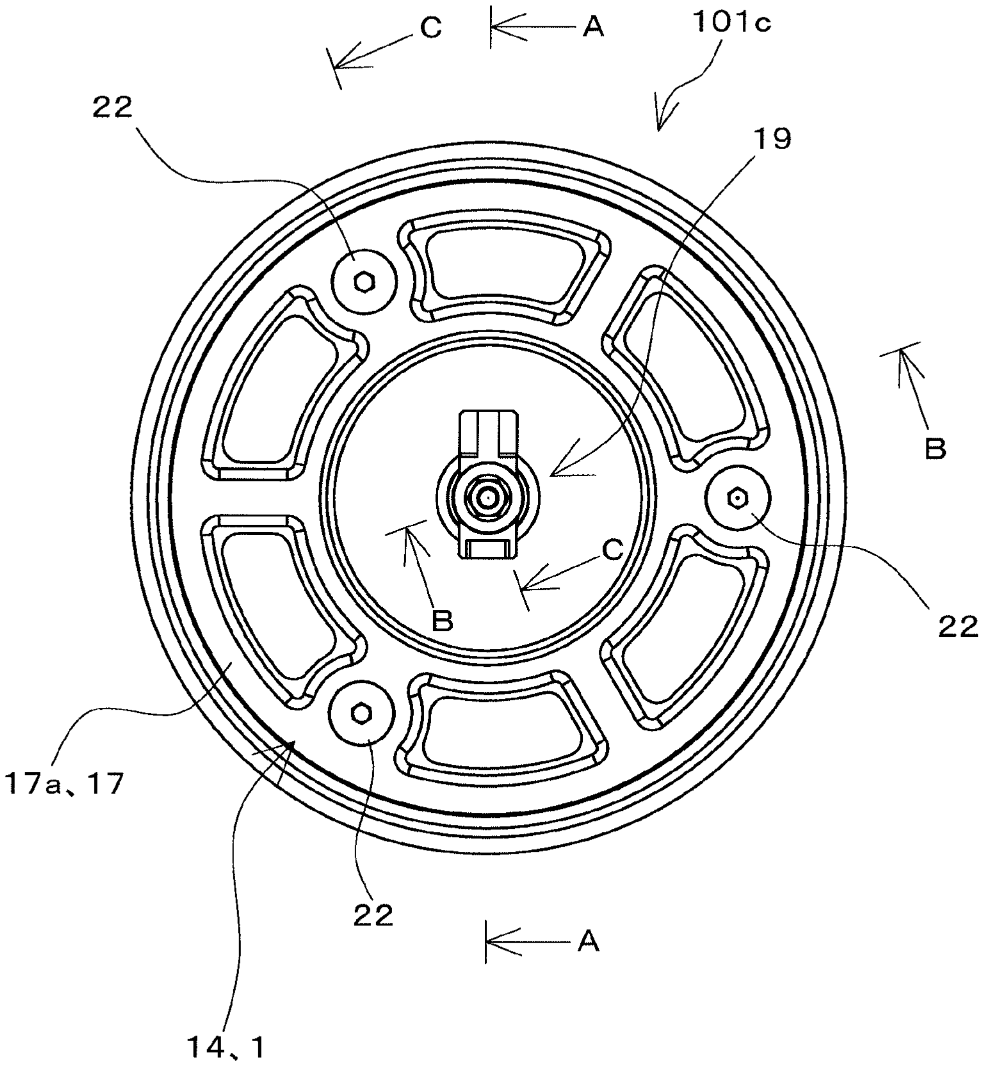
FIG. 6 is a diagram showing the wheel and the vehicle speed control device according to the first embodiment of the present invention as viewed from inside in the vehicle width direction.
Figure 7:
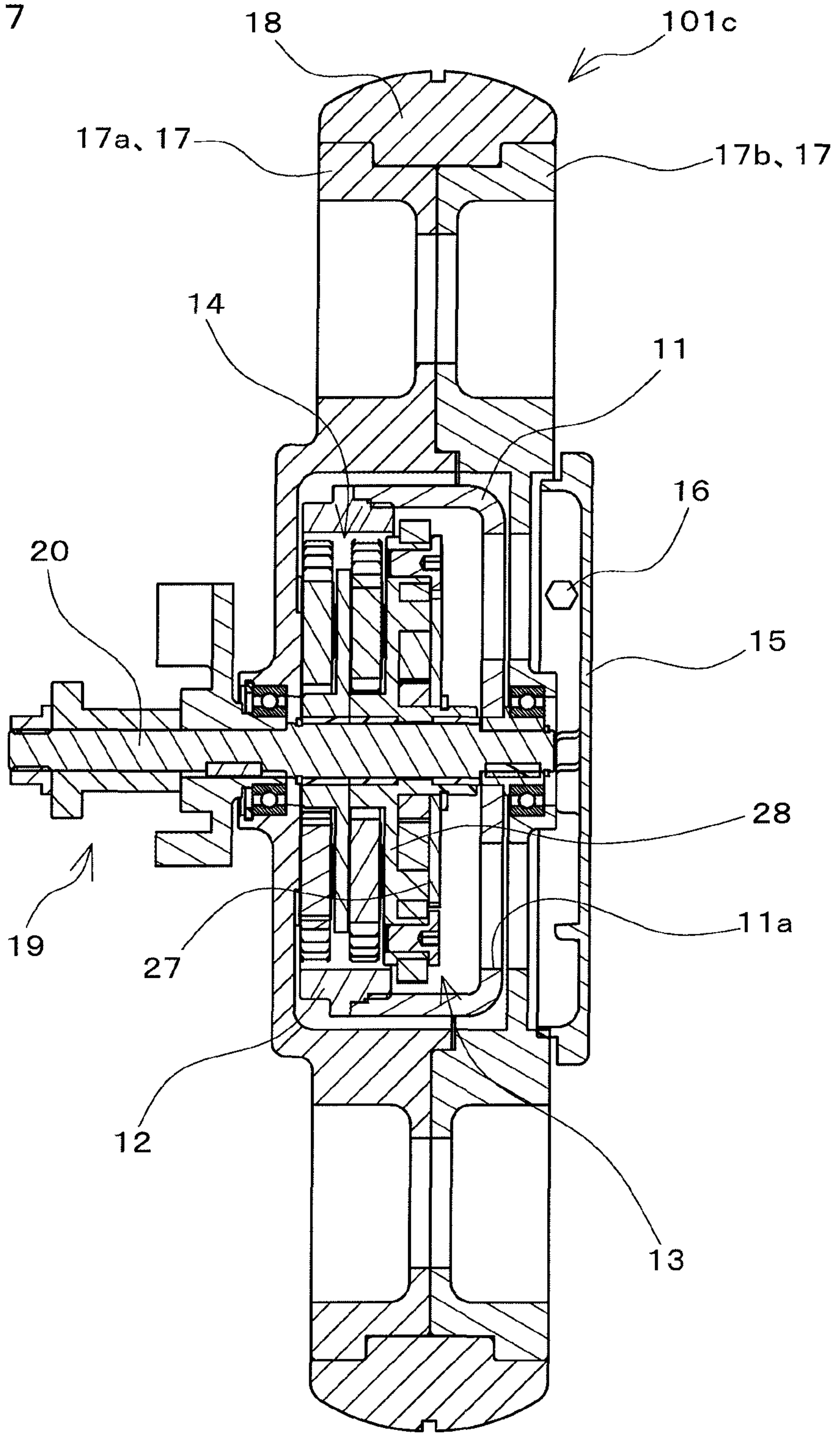
FIG. 7 is a cross-sectional view of the vehicle speed control device as viewed from the position of arrow A in FIG. 6.
Figure 8:
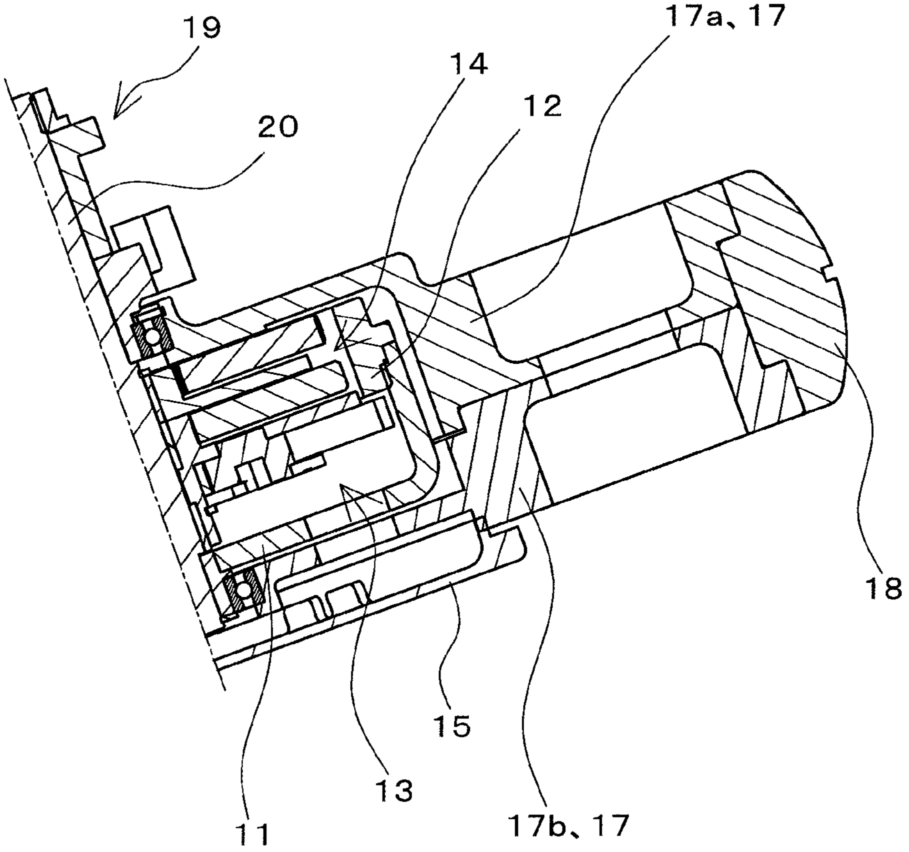
FIG. 8 is a partial cross-sectional view of the vehicle speed control device as viewed from the position of arrow B in FIG. 6.
Figure 9:
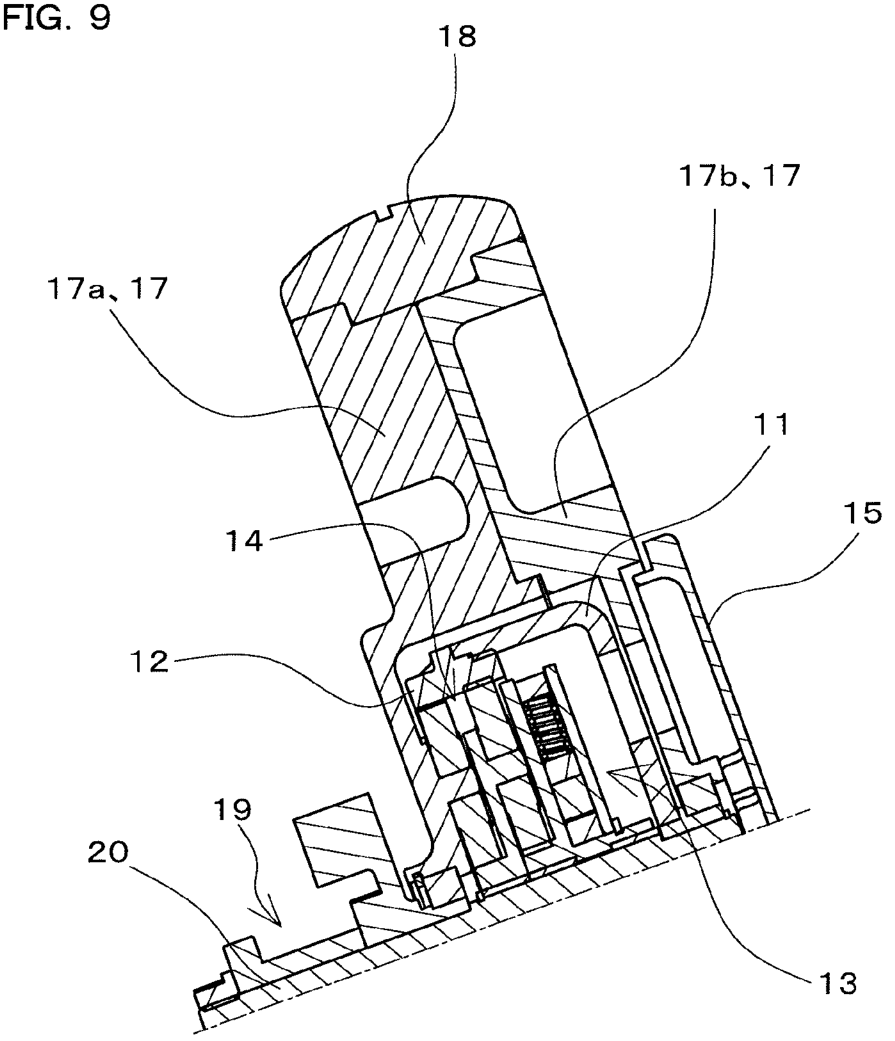
FIG. 9 is a partial cross-sectional view of the vehicle speed control device as viewed from the position of arrow C in FIG. 6.

FIGS. 3 and 4 are exploded perspective views showing a wheel 101*c* and a part of a vehicle speed control device 1 (hereinafter also referred to simply as the "speed control device 1") according to a first embodiment of the present invention. FIG. 5 is an exploded perspective view showing an enlargement of a part of the vehicle speed control device shown in FIG. 4. FIG. 6 is a diagram showing the speed control device 1 and the wheel 101*c*. FIG. 7 is a cross-sectional view of the speed control device 1 as viewed from the position of arrow A in FIG. 6. FIG. 8 is a partial cross-sectional view of the speed control device 1 as viewed from the position of arrow B in FIG. 6. FIG. 9 is a partial cross-sectional view of the speed control device 1 as viewed from the position of arrow C in FIG. 6.

Note that the exploded perspective views of the speed control device 1 and the wheel 101*c* are divided between FIGS. 3 and 4. The constituent elements shown in FIG. 3 are installed on the inside in the vehicle width direction of the wheel 101*c*, which is the width direction of the vehicle body 101*a* of the vehicle 101, and the constituent elements shown in FIG. 4 are installed on the outside in the vehicle width direction of the wheel 101*c*. FIG. 6 is a view from the inside in the vehicle width direction.

As shown in FIGS. 3 to 9, the speed control device 1 includes a brake drum 11, a housing 12, a centrifugal brake unit 13, a planetary gear mechanism 14, a cover 15, an operation tool 16, and the like. The wheel 101*c* provided with the speed control device 1 includes a wheel structure portion 17, a tire 18, a shaft unit 19, and the like.

The wheel structure portion 17 of the wheel 101*c* includes two disk-like divided wheels (17*a*, 17*b*), which are divided in the width direction of the wheel 101*c*, that is, in a direction parallel to the rotation axis of the wheel 101*c*. The divided wheels (17*a*, 17*b*) are each provided with a through hole in an intermediate portion in the radial direction, and have a structure in which a reduction in the weight is achieved. The wheel structure portion 17 is configured by combining the divided wheel 17*a* and the divided wheel 17*b* so as to sandwich the tire 18 and fixing the divided wheels with a plurality of bolts 22 (see FIGS. 6 to 9). Note that the divided wheel 17*a* in the wheel structure portion 17 is also configured as a part of the planetary gear mechanism 14 in the speed control device 1, as described later.

The tire 18 of the wheel 101*c* is formed as a ring-like rubber member, for example, and provided on the outer circumference of the wheel 101*c*. The tire 18 is fixed from the two sides in the width direction of the wheel 101*c* by the divided wheels (17*a*, 17*b*) of the wheel structure portion 17.

The shaft unit 19 is constituted by a plurality of constituent members including a rotary shaft 20 of the wheel 101*c*. The shaft unit 19 includes, in addition to the rotary shaft 20, a nut 21*a*, a bushing 21*b*, an adapter 21*c*, a hole ring 21*d*, a shaft ring 21*e*, bearings (21*f*, 21*g*), and the like.

The brake drum 11 in the speed control device 1 is provided as a structure having a cylindrical portion, and is fixed to the vehicle body 101*a*. The cylindrical brake drum 11 has an opening at one end thereof in its axis direction, and is provided with a frame portion that radially extends at the other end. Note that the aforementioned tire 18 provided on the outer circumference of the wheel 101*c* is installed concentrically with the brake drum 11. That is to say, the axis position, which is the radial center position, of the tire 18 is disposed so as to coincide with the axis position, which is the radial center position, of the brake drum 11.

The housing 12 of the speed control device 1 is provided as a cylindrical structure, and is provided with a step portion that extends circumferentially on its outer circumference. The housing 12 is attached to one end of the brake drum 11, and is fixed to the brake drum 11 at the aforementioned step portion (see FIGS. 7 to 9).

The cover 15 of the speed control device 1 is detachably attached to the wheel 101*c* on the outside in the vehicle width direction. The cover 15 is detachably attached to the divided wheel 17*b* of the wheel structure portion 17 so as to cover a part of the radial center portion of the wheel 101*c*. The operation tool 16 is configured as a hexagonal wrench, for example, and is installed on the inside in the vehicle width direction with respect to the cover 15 in an attachable and detachable manner (see FIG. 7). The operation tool 16 is used in an operation in which an external force is input to a transmission mechanism 26 in the centrifugal brake unit 13, which will be described later, by a user.

Figure 10:
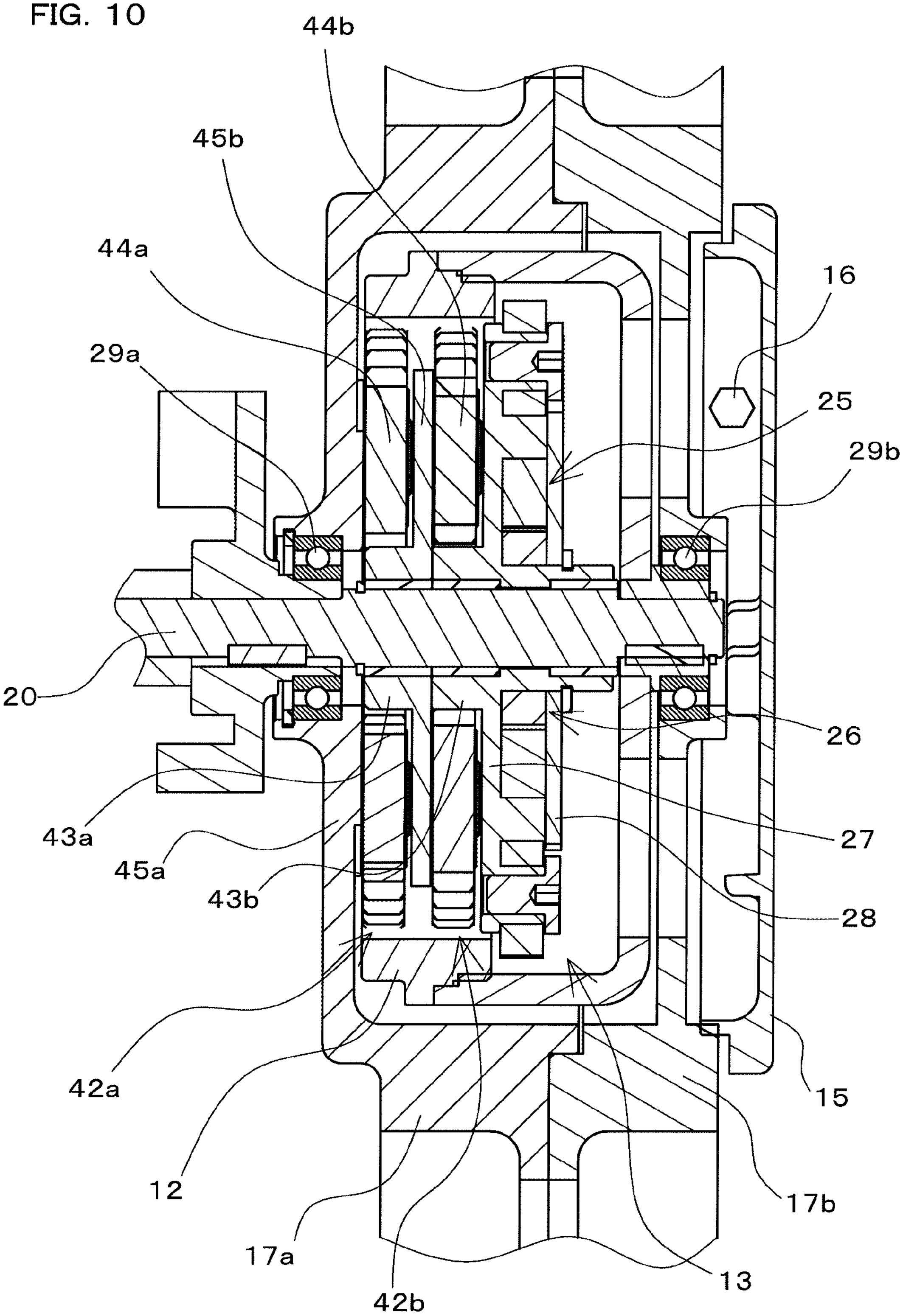
FIG. 10 is a diagram showing an enlargement of a part of FIG. 7.
Figure 11A:
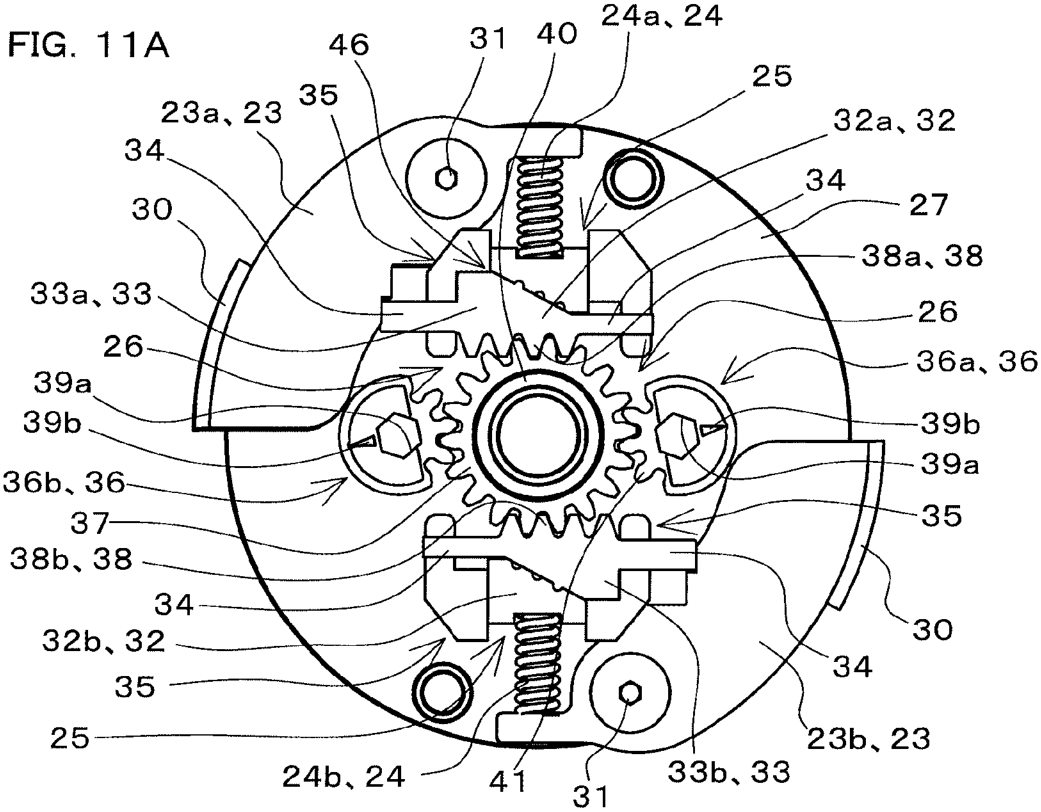
FIGS. 11A and 11B are diagrams schematically showing an internal structure of the vehicle speed control device shown in FIG. 6.
Figure 11B:
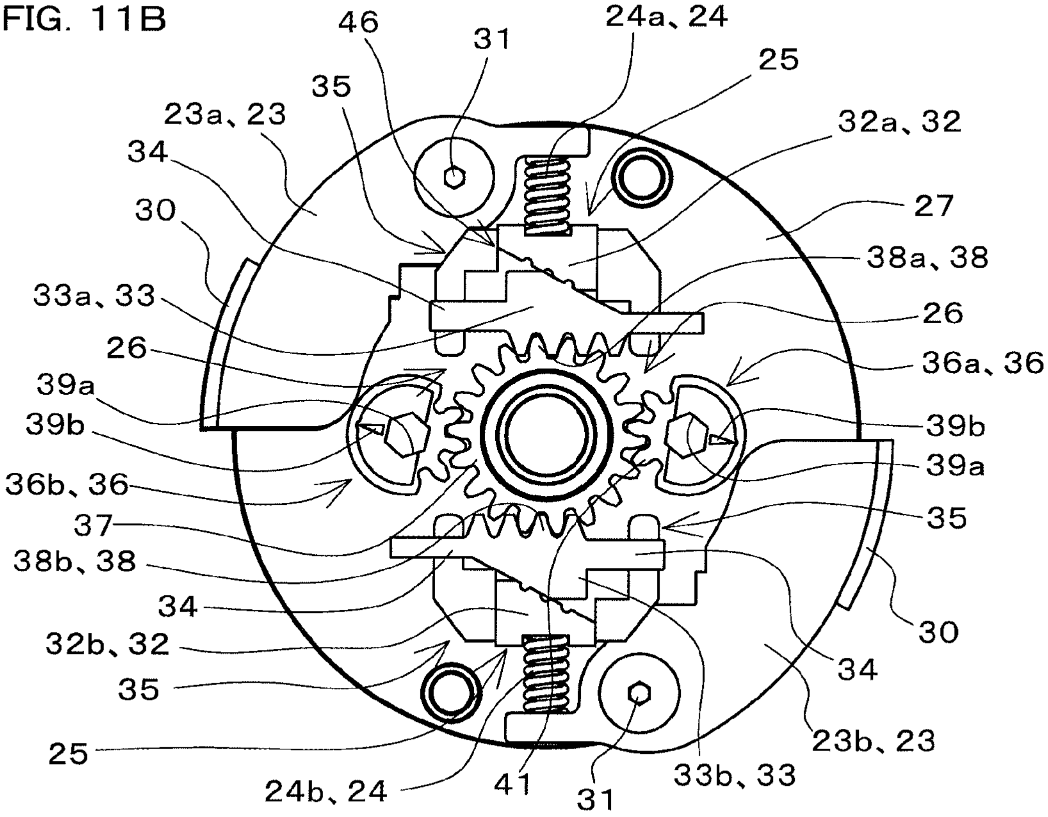
Figure 12:
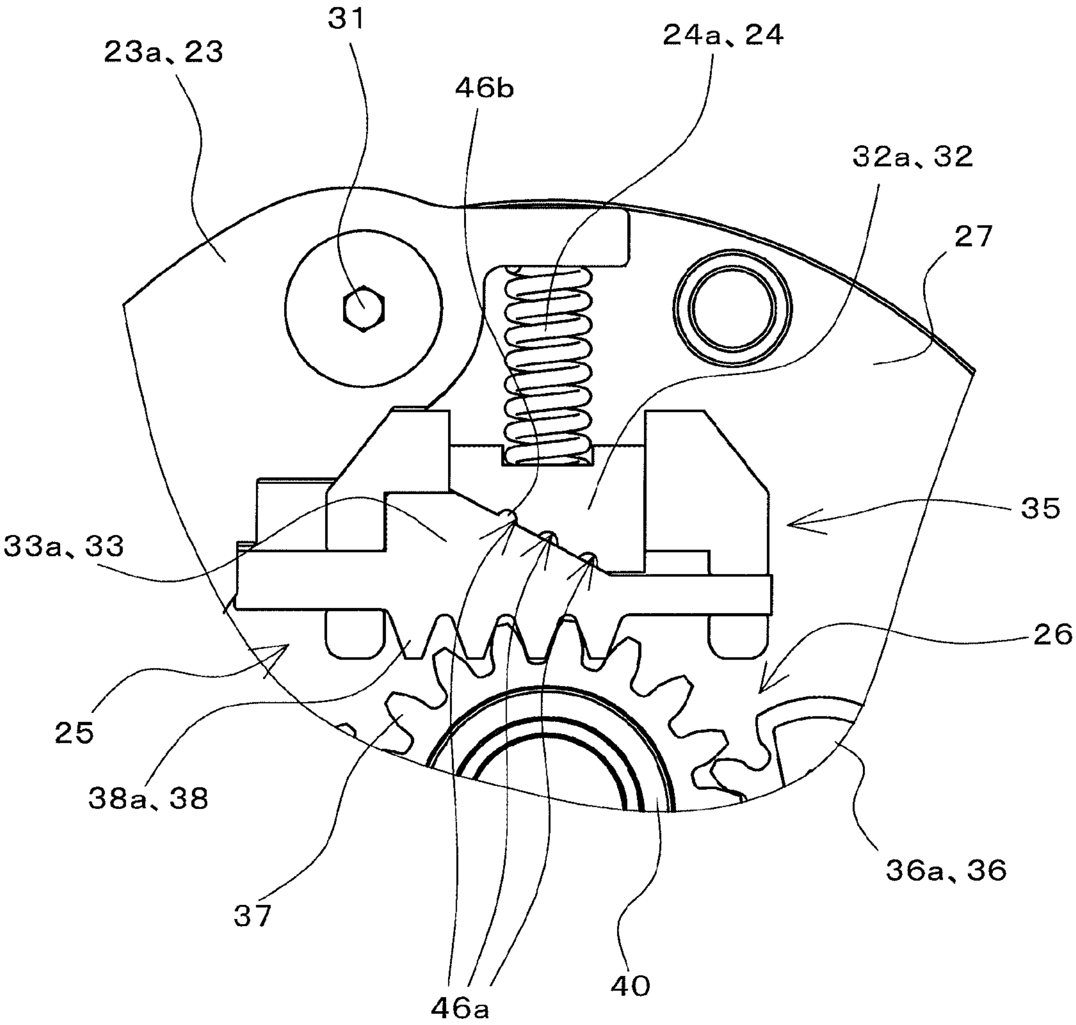
FIG. 12 is a diagram showing an enlargement of a part of FIG. 11.

Next, the centrifugal brake unit 13 and the planetary gear mechanism 14 in the speed control device 1 will be described in detail. FIG. 10 is a diagram showing an enlargement of a part of FIG. 7. FIGS. 11A and 11B are diagrams schematically showing an internal structure of the speed control device 1, and show the centrifugal brake unit 13 from the outside in the vehicle width direction. FIGS. 11A and 11B show the centrifugal brake unit 13 in different operational states. FIG. 12 is a diagram showing an enlargement of a part of FIG. 11A.

The centrifugal brake unit 13 is installed within the brake drum 11, and is provided as a mechanism for generating a braking force of the centrifugal brake between the centrifugal brake unit 13 and the brake drum 11 (see FIGS. 7 to 10).

Note that, as clearly shown in FIG. 10, the brake drum 11 is fixed to an edge on the outside in the vehicle width direction of the rotary shaft 20, and thus, the brake drum 11 is fixed to the vehicle body 101*a* via the rotary shaft 20 fixed to the vehicle body 101*a*. The rotary shaft 20 passes through the center of the centrifugal brake unit 13, and the centrifugal brake unit 13 is rotatably installed centered on the rotary shaft 20. The wheel structure portion 17 of the wheel 101*c* is rotatably installed with respect to the rotary shaft 20, via the bearings (29*a*, 29*b*). When the wheel structure portion 17 of the wheel 101*c* rotates around the rotary shaft 20, the rotation of the wheel 101*c* is accelerated by the planetary gear mechanism 14, which will be described later, and is transmitted to the centrifugal brake unit 13.

As clearly shown in FIGS. 10 and 11, and FIG. 5, which is an exploded perspective view of the centrifugal brake unit 13, the centrifugal brake unit 13 includes brake shoes 23, springs 24, each serving as an elastic member in the present embodiment, a position change mechanism 25, a transmission mechanism 26, a support plate 27, a pressure plate 28, and the like. The brake shoes 23, the springs 24, the position change mechanism 25, and the transmission mechanism 26 are installed between the support plate 27 and the pressure plate 28. Note that in FIGS. 5 and 11, the pressure plate 28 shown in FIGS. 4 and 10 is omitted.

The brake shoes 23 (23*a*, 23*b*) are provided as a pair of flat-plate members, and are pivotably supported to the disk-like support plate 27 to which the rotation is transmitted from the planetary gear mechanism 14. The pair of brake shoes 23 (23*a*, 23*b*) are pivotably supported with respect to the support plate 27 at positions opposed to each other via the radial center of the support plate 27. Each brake shoe (23*a*, 23*b*) is pivotably supported with respect to the support plate 27 via a pivot shaft 31 at a position biased toward one end in the longitudinal direction of the brake shoe (23*a*, 23*b*). Each brake shoe (23*a*, 23*b*) is biased outward in the radial direction of the support plate 27 by the spring 24, which will be described later, at a position further on the aforementioned one end side than the pivot shaft 31.

Each brake shoe (23*a*, 23*b*) has an outer circumferential side face that extends so as to be bent along its longitudinal direction. A pad 30 is attached to the outer circumferential side face of the brake shoe (23*a*, 23*b*). The pad 30 is attached to the brake shoe (23*a*, 23*b*) at the other end thereof, that is, at the opposite end, via the pivot shaft 31, to the end where the brake shoe (23*a*, 23*b*) is biased by the spring 24.

If the rotation speed of the support plate 27 increases, each brake shoe (23*a*, 23*b*) pivots against the biasing force of the spring 24 and causes the pad 30 to come into contact with the inner circumferential side face of the brake drum 11. Thus, the brake shoe (23*a*, 23*b*) is configured to rotate around the rotary shaft 20 of the wheel 101*c* and comes into contact with the inner circumferential side face of the brake drum 11 to decrease the rotation speed of the wheel 101*c* by means of friction.

A pair of springs 24 (24*a*, 24*b*) are provided, which are provided as coil springs in the present embodiment. The pair of springs 24 (24*a*, 24*b*) are installed at positions opposed to each other via the radial center of the support plate 27. Each spring (24*a*, 24*b*) is installed between an end of the corresponding brake shoe (23*a*, 23*b*) on the one end side and the position change mechanism 25, which will be described later. Thus, each spring 24 is configured to prevent contact between the brake drum 11 and the brake shoe 23 when the rotation speed of the wheel 101*c* is lower than or equal to a predetermined speed, and permit contact between the brake drum 11 and the brake shoe 23 when the rotation speed of the wheel 101*c* exceeds the predetermined speed. In the present embodiment, the spring 24 is provided as a compression spring that biases, in a compressed state, the brake shoe 23 with respect to the position change mechanism 25.

The position change mechanism 25 is installed within the brake drum 11, and is provided as a mechanism for changing the position of an end of each spring 24 on one end side. The position change mechanism 25 includes spring position holding portions 32 and drive portions 33.

A pair of spring position holding portions 32 (32*a*, 32*b*) are provided, each serving as an elastic member position holding portion in the present embodiment, and are provided as members for holding the ends of the springs 24 (24*a*, 24*b*) on the one end side. The pair of spring position holding portions 32 (32*a*, 32*b*) are provided so as to correspond to the pair of springs 24 (24*a*, 24*b*), and are installed at positions opposed to each other via the radial center of the support plate 27.

The spring position holding portion 32*a* is provided with a recessed portion for holding the end of the spring 24*a* on the one end side, and the spring position holding portion 32*b* is provided with a recessed portion for holding the end of the spring 24*b* on the one end side. Note that the spring 24*a* is held such that its end on the one end side fits into the recessed portion of the spring position holding portion 32*a*, and an end of the spring 24*a* on the other end side biases the end of the brake shoe 23*a* on the one end side outward in the radial direction of the support plate 27. The spring 24*b* is held such that its end on the one end side fits into the recessed portion of the spring position holding portion 32*b*, and an end of the spring 24*b* on the other end side biases the end of the brake shoe 23*b* on the one end side outward in the radial direction of the support plate 27.

A pair of drive portions 33 (33*a*, 33*b*) are provided so as to correspond to the respective spring position holding portions 32. The drive portions 33 are configured as members for driving the spring position holding portions 32 so as to change the position of the spring position holding portions 32 that hold the ends of the springs 24, with a force that is input from the outside and transmitted by the transmission mechanism 26, which will be described later. Note that the drive portions 33 are provided such that the drive portion 33*a* changes the position of the spring position holding portion 32*a*, and the drive portion 33*b* changes the position of the spring position holding portion 32*b*.

Members that constitute each drive portion (33*a*, 33*b*) are provided with a pair of rail-like sections (34, 34), each extending linearly from the two ends of the drive portion (33*a*, 33*b*). The position change mechanism 25 is further provided with guide portions 35 that are provided so as to be integrated with or fixed to the support plate 27 and installed so as to correspond to the respective drive portions (33*a*, 33*b*), and slidably support the pair of rail-like sections (34, 34).

Each guide portion 35 has a pair of side faces that are in sliding contact with the two side faces of the corresponding spring position holding portion (32*a*, 32*b*). Thus, the guide portion 35 is configured to guide the moving direction of the spring position holding portion (32*a*, 32*b*) in a direction that is perpendicular to the sliding direction of the corresponding drive portion (33*a*, 33*b*) and is parallel to the extending and contracting direction of the corresponding spring (24*a*, 24*b*). Note that the extending and contracting direction of the spring (24*a*, 24*b*) is the longitudinal direction of the spring (24*a*, 24*b*), which is a coil spring, and is a direction parallel to the radial direction of the support plate 27.

With the above-described configuration, the position change mechanism 25 is configured to drive the spring position holding portions (32*a*, 32*b*) along the extending and contracting direction of the respective springs (24*a*, 24*b*) as a result of the drive portions (33*a*, 33*b*) sliding with respect to the guide portions 35.

Here, the position change mechanism 25 will be described in more detail. In the present embodiment, the position change mechanism 25 is configured as a wedge-shaped mechanism with which the spring position holding portions 32 are displaced as a result of opposed tapered faces sliding relative to each other.

The spring position holding portions 32 (32*a*, 32*b*) are configured as spring-side wedge-shaped members, which are elastic member-side wedge-shaped members, each being provided with one of the opposed tapered faces, in the present embodiment. Meanwhile, the drive portions 33 (33*a*, 33*b*) are configured as drive-side wedge-shaped members, each being provided with the other of the opposed tapered faces. In the following description, the spring position holding portions 32 (32*a*, 32*b*) will also be referred to as the spring-side wedge-shaped members 32 (32*a*, 32*b*), and the drive portions 33 (33*a*, 33*b*) will also be referred to as the drive-side wedge-shaped members 33 (33*a*, 33*b*).

The tapered face of each spring-side wedge-shaped member (32*a*, 32*b*) and the tapered face of the corresponding drive-side wedge-shaped member (33*a*, 33*b*) are configured as faces that extend obliquely relative to the sliding direction of the drive-side wedge-shaped member (33*a*, 33*b*) with respect to the corresponding guide portions 35. For this reason, as described above, the position change mechanism 25 drives the spring position holding portions (32*a*, 32*b*) along the extending and compressing direction of the springs (24*a*, 24*b*) as a result of the drive portions (33*a*, 33*b*) sliding with respect to the guide portions 35 and the tapered faces sliding relative to each other.

The transmission mechanism 26 is provided as a mechanism for transmitting a force that is input by a user operation from the outside to the position change mechanism 25, and driving the position change mechanism 25. The transmission mechanism 26 includes adjustment gears 36, a pinion 37, and rack portions 38.

The pair of adjustment gears 36 (36*a*, 36*b*) are provided, and installed at positions opposed to each other via the radial center of the support plate 27. The adjustment gears (36*a*, 36*b*) are rotatably supported to the support plate 27. Each adjustment gear (36*a*, 36*b*) is provided with a hexagonal hole 39*a* capable of engaging with an end of the operation tool 16, which is configured as a hexagonal wrench. The adjustment gear (36*a*, 36*b*) is provided so as to be capable of transmitting a force that is input by a user from the outside via the operation tool 16 whose end is engaged with the hexagonal hole 39*a*, to the corresponding drive portion 33 via the pinion 37, which will be described later.

Each adjustment gear (36*a*, 36*b*) is installed such that at least the hexagonal hole 39*a* and an indicator 39*b*, which is shown as an exemplary triangular mark imprinted in an end face where the hexagonal hole 39*a* is provided, are exposable to the outside. Note that as a result of the cover 15 attached to the wheel structure portion 17 being removed, the hexagonal hole 39*a* and the indicator 39*b* are exposed to the outside via a through hole provided in the divided wheel 17*b* and a through hole 11*a* provided in the brake drum 11. Thus, the user can visually check the hexagonal hole 39*a* and the indicator 39*b* from the outside. Note that when the user operates the adjustment gears 36 using the operation tool 16, he/she can recognize the amount of operation by visually checking the rotational position of the indicators 39*b* that rotate with the adjustment gears 36.

The pinion 37 is provided as a gear provided with an outer gear over its entire outer circumference, and is installed at the radial center position of the support plate 27. The pinion 37 is rotatably supported to the support plate 27. More specifically, the pinion 37 is attached so as to be capable of rotating with respect to a shaft portion 40 that is provided so as to be integrated with or fixed to the support plate 27, at the center position of the support plate 27.

The pinion 37 is installed so as to mesh with both the adjustment gear 36*a* and the adjustment gear 36*b*. An outer gear 41, which is provided on the outer circumference of each adjustment gear (36*a*, 36*b*) and meshes with the pinion 37, is provided as a part in the circumferential direction of the adjustment gear (36*a*, 36*b*).

A pair of rack portions 38 (38*a*, 38*b*) are provided so as to mesh with the pinion 37 and to be integrated with or fixed to the respective drive-side wedge-shaped members 33. In the present embodiment, the rack portion 38*a* is provided so as to be integrated with a side face of the drive-side wedge-shaped member 33*a* that is opposite to the tapered face. The rack portion 38*b* is provided so as to be integrated with a side face of the drive-side wedge-shaped member 33*b* that is opposite to the tapered face.

Note that, as described above, the support plate 27 pivotably supports the brake shoes 23 and rotatably supports the adjustment gears 36 and the pinion 37, and the position change mechanism 25 is installed on the support plate 27. The pressure plate 28 is attached parallel to the support plate 27 so as to be opposed to the support plate 27 via the brake shoes 23, the adjustment gears 36, the pinion 37, and the position change mechanism 25.

The planetary gear mechanism 14 shown in FIGS. 3, 4, and 7 to 10 is installed as a mechanism that is provided on a path through which the rotation is transmitted from the wheel 101*c* to the brake shoes 23, and accelerates and transmits the rotation of the wheel 101*c*. More specifically, the planetary gear mechanism 14 is configured as a mechanism that is provided between the divided wheel 17*a* and the support plate 27, accelerates the rotation of the divided wheel 17*a*, and transmits the accelerated rotation to the support plate 27.

The planetary gear mechanism 14 includes a first-stage accelerating portion 42*a* and a second-stage accelerating portion 42*b* that are installed centered on the rotary shaft 20 so as to be capable of rotating around the rotary shaft 20. The first-stage accelerating portion 42*a* is provided as a mechanism to which the rotation of the wheel structure portion 17 is transmitted and that accelerates this rotation. The second-stage accelerating portion 42*b* is provided as a mechanism for accelerating the rotation of the first-stage accelerating portion 42*a* and transmitting the accelerated rotation to the support plate 27.

As clearly shown in FIG. 10, the first-stage accelerating portion 42*a* includes a sun gear 43*a*, a plurality of planetary gears 44*a*, and a carrier 45*a*. The sun gear 43*a* is provided, at its center, with a through hole through which the rotary shaft 20 passes, and is installed so as to be capable of rotating around the rotary shaft 20.

The planetary gears 44*a* are rotatably supported with respect to the carrier 45*a*, and are installed around the sun gear 43*a*. The planetary gears 44*a* are configured to rotate on its own axis and revolve around the sun gear 43*a* while meshing with the sun gear 43*a*. The planetary gears 44*a* are also configured to mesh with an inner gear provided on the inner circumference of the housing 12 in the circumferential direction.

The carrier 45*a* is provided so as to rotatably support the planetary gears 44*a*. In the present embodiment, the carrier 45*a* is provided so as to be integrated with the divided wheel 17*a* of the wheel structure portion 17. Note that the carrier 45*a* may be provided so as to be fixed to the divided wheel 17*a*.

The second-stage accelerating portion 42*b* includes a sun gear 43*b*, a plurality of planetary gears 44*b*, and a carrier 45*b*. The sun gear 43*b* is provided, at its center, with a through hole through which the rotary shaft 20 passes, and is installed so as to be capable of rotating around the rotary shaft 20. In the present embodiment, the sun gear 43*b* is provided so as to be integrated with the support plate 27 on the side opposite to the side where the position change mechanism 25 is installed.

The planetary gears 44*b* are rotatably supported with respect to the carrier 45*b*, and are installed around the sun gear 43*b*. The planetary gears 44*b* are configured to rotate on its own axis and revolve around the sun gear 43*b* while meshing with the sun gear 43*b*. The planetary gears 44*b* are also configured to mesh with an inner gear provided on the inner circumference of the housing 12.

The carrier 45*b* is provided so as to rotatably support the planetary gears 44*b*. The carrier 45*b* is provided, at its center, with a through hole through which the rotary shaft 20 passes, and is installed so as to be capable of rotating around the rotary shaft 20. In the present embodiment, the carrier 45*b* is provided so as to be integrated with the sun gear 43*a* in the first-stage accelerating portion 42*a*. Note that the carrier 45*b* and the sun gear 43*a* may be provided so as to be fixed to each other.

In the above-described planetary gear mechanism 14, the carrier 45*a* in the first-stage accelerating portion 42*a* rotates together with the wheel structure portion 17 as a result of the rotation of the wheel 101*c*. Further, with the rotation of the carrier 45*a*, the planetary gears 44*a* rotate on its own axis and revolve around the sun gear 43*a* while meshing with the sun gear 43*a* and the inner gear of the housing 12. Thus, the sun gear 43*a* to which the accelerated rotation of the wheel 101*c* is transmitted rotates in a direction opposite to that of the wheel 101*c*.

With the rotation of the aforementioned sun gear 43*a*, the carrier 45*b* in the second-stage accelerating portion 42*b* rotates. Further, with the rotation of the carrier 45*b*, the planetary gears 44*b* rotate on its own axis and revolve around the sun gear 43*b* while meshing with the sun gear 43*b* and the inner gear of the housing 12. Thus, the sun gear 43*b* to which the accelerated rotation of the first-stage accelerating portion 42*a* is transmitted rotates in the same direction as that of the wheel 101*c*. With this rotation of the sun gear 43*b*, the support plate 27 provided so as to be integrated with the sun gear 43*b* rotates at a rapid speed.

FIG. 12 is a diagram showing an enlargement of a part of FIG. 11A. As shown in FIGS. 11A, 11B, and 12, the centrifugal brake unit 13 is provided with a positioning mechanism 46. The positioning mechanism 46 need only be provided in at least one of the position change mechanism 25 and the transmission mechanism 26, and is provided in the position change mechanism 25 in the present embodiment.

The positioning mechanisms 46 are each provided as a mechanism capable of positioning the end of each spring 24 on the one end side by changing this position with respect to a plurality of predetermined positions, and a pair of positioning mechanisms 46 are provided so as to correspond to the respective springs 24*a* and 24*b*. The positioning mechanism 46 corresponding to the spring 24*a* is provided in the spring-side wedge-shaped member 32*a* and the drive-side wedge-shaped member 33*a*. The positioning mechanism 46 corresponding to the spring 24*b* is provided in the spring-side wedge-shaped member 32*b* and the drive-side wedge-shaped member 33*b*. Since the positioning mechanism 46 corresponding to the spring 24*a* and the positioning mechanism 46 corresponding to the spring 24*b* are configured in a similar manner, the positioning mechanism 46 corresponding to the spring 24a will be taken as an example in the following description.

The positioning mechanism 46 includes a plurality of recessed portions 46a and a projecting portion 46b. The recessed portions 46a are provided as a plurality of recessed sections that are recessed on the tapered face of the spring-side wedge-shaped member 32a. The projecting portion 46b is provided as a projecting section that is provided on the tapered face of the drive-side wedge-shaped member 33a and capable of being separately locked at each of the recessed portions 46a. Note that a configuration may also be implemented in which the recessed portions 46a are provided on the tapered face of the drive-side wedge-shaped member 33a, and the projecting portion 46b is provided on the tapered face of the spring-side wedge-shaped member 32a.

Next, an operation of the speed control device 1 will be described. Upon the hand-push operating portion 101b of the vehicle 101 being pressed by the user, the wheel 101c rotates, and the vehicle body 101a moves. When the rotation speed of the wheel 101c is lower than or equal to a predetermined speed, the brake shoes 23 do not come into contact with the inner circumferential side face of the brake drum 11, and a braking force of the centrifugal brake is not generated. Note that when the wheel 101c rotates, the rotation of the wheel structure portion 17 is accelerated by the planetary gear mechanism 14 and transmitted to the support plate 27, as described above. The support plate 27 thereby rotates at a higher rotation speed than that of the wheel 101c.

On the other hand, when the rotation speed of the wheel 101c exceeds the predetermined speed, the support plate 27 whose rotation is accelerated by the planetary gear mechanism 14 also exceeds the predetermined high rotation speed. Thus, the brake shoes 23 pivot around the pivot shafts 31 against the biasing force of the springs 24. Then, the pads 30 of the brake shoes 23 are pressed against the inner circumferential side face of the brake drum 11. The centrifugal brake thereby operates, a braking force of the centrifugal brake is generated, and the speed of the wheel 101c decreases.

Next, to change the speed at which the centrifugal brake operates, the user initially removes the cover 15 from the wheel structure portion 17. Then, the user detaches the operation tool 16 attached to the inside of the cover 15 from the cover 15, engages an end of the operation tool 16 with the hexagonal hole (39a or 39b) of the adjustment gear 36, and rotates the adjustment gear 36. Note that either of the adjustment gears (36a, 36b) may be operated at this time.

When an external force is input to the adjustment gear 36 with the above-described user operation, the adjustment gear 36 rotates, and the pinion 37 that meshes with the adjustment gear 36 rotates. Then, with the rotation of the pinion 37, the drive-side wedge-shaped members 33, which are provided with the rack portions 38 that mesh with the pinion 37, slide. Thus, the tapered faces of each drive-side wedge-shaped member 33 and the corresponding spring-side wedge-shaped member 32 slide relative to each other, and the spring-side wedge-shaped members 32 are displaced along the radial direction of the support plate 27. Then, the ends of the springs 24 on the one end side held by the spring-side wedge-shaped members 32, each being the spring position holding portion, change. With this change, the condition under which the springs 24 bias the brake shoes 23 changes, and the speed at which the centrifugal brake operates changes. Note that FIG. 11B shows a state where the ends of the springs 24 on the one end side have moved outward in the radial direction of the support plate 27, compared with the state shown in FIG. 11A.

In the above-described operation, when the tapered faces of each drive-side wedge-shaped member 33 and the corresponding spring-side wedge-shaped member 32 slide relative to each other, the projecting portion 46b provided on the drive-side wedge-shaped member 33 is locked sequentially with respect to the recessed portions 46a provided on the spring-side wedge-shaped member 32. Accordingly, the user can easily position the ends of the springs 24 on the one end side by selecting a desired position from among the plurality of predetermined positions.

With the above-described vehicle 101 and the speed control device 1, when the rotation speed of the wheel 101c exceeds the predetermined speed, the brake shoes 23 come into contact with the brake drum 11 due to the centrifugal force against the biasing force of the springs 24, and the centrifugal brake operates. To change the speed at which the centrifugal brake operates, an operation of inputting an external force to the transmission mechanism 26 is performed. With this operation, the operational force that is input from the outside is transmitted to the position change mechanism 25 within the brake drum 11, and the positions of the ends of the springs 24 on the one end side change. Thereby, the rotation speed of the wheel 101c at which the brake shoes 23 come into contact with the brake drum 11 due to the centrifugal force changes. Accordingly, the speed at which the centrifugal brake operates is changed without disassembling the speed control device 1, or without replacing parts such as the brake shoes 23 or the springs 24. As a result, the speed at which the centrifugal brake operates can be easily changed from the outside.

Accordingly, according to the present embodiment, the speed control device 1 with respect to which the speed at which the centrifugal brake operates can be easily changed from the outside without disassembling the device, and the vehicle 101 equipped with this speed control device 1 can be provided.

With the vehicle 101 and the speed control device 1, since the position change mechanism 25 is provided as a wedge-shaped mechanism, the mechanism for changing the positions of the ends of the springs 24 on the one end side can be configured in a compact manner with a small structure.

With the vehicle 101 and the speed control device 1, the transmission mechanism 26 includes the adjustment gears 36 for transmitting a force to the drive portions 33, and the adjustment gears 36 are provided so as to be exposable to the outside. For this reason, the transmission mechanism 26 for transmitting an external force to the position change mechanism 25 can be realized with a small number of constituent components and a simple structure. In particular, the transmission mechanism 26 can be realized with a smaller number of constituent components and a simpler configuration than in the case of configuring a transmission mechanism using a crank-and-cam mechanism.

With the vehicle 101 and the speed control device 1, the position change mechanism 25 is provided with the positioning mechanisms 46 capable of positioning the ends of the springs 24 on the one end side at a plurality of predetermined positions. For this reason, the task of changing the speed at which the centrifugal brake is operated is facilitated, and the task of configuring settings such that the centrifugal brake operates at the same speed for both wheels of the vehicle 101 can also be easily performed.

With the vehicle 101 and the speed control device 1, the positioning mechanisms 46 are each constituted by the plurality of recessed portions 46*a* on the tapered face of each spring-side wedge-shaped member 32 and the projecting portion 46*b* on the tapered face of the corresponding drive-side wedge-shaped member 33. For this reason, the positioning mechanisms 46 can be realized with a simple structure in the position change mechanism 25 provided as a wedge-shaped mechanism in which the tapered faces slide relative to each other. Note that a configuration may also be implemented in which a plurality of projecting portions 46*b* are provided that can be locked with respect to the recessed portions 46*a*. In this case, even in the case where one of the projecting portions 46*b* is damaged, another projecting portion 46*b* can be locked at the recessed portions 46*a*, and therefore, the function of the centrifugal brake can be guaranteed.

With the vehicle 101 and the speed control device 1, the springs 24 for operating the centrifugal brake are provided as compression springs, and therefore, a variation in the adjustment thereof in their initial state is reduced, compared with the case of tension springs. Further, in the case of compression springs, the free length of the springs, which is the length of the springs in a state where no load is applied, is accurately defined, compared with the case of tension springs. For this reason, the operational condition of the springs 24 for operating the centrifugal brake in their initial state can be set with further accuracy.

With the vehicle 101 and the speed control device 1, the planetary gear mechanism 14, which serves as an acceleration mechanism capable of efficient acceleration in a small space, is provided on the path through which the rotation is transmitted from the wheel 101*c* to the brake shoes 23. For this reason, even in the case of the vehicle 101 including a wheel 101*c* with a low rotation speed, a configuration can be easily realized in which the centrifugal brake is operated at a desired rotation speed of the wheel 101*c*.

With the vehicle 101 and the speed control device 1, the carrier 45*a* in the planetary gear mechanism 14 is provided so as to be integrated with the wheel structure portion 17 of the wheel 101*c*, and it is therefore possible to suppress an increase in the size of the vehicle body 101*a* in the width direction and make the speed control device 1 compact in the width direction of the vehicle body 101*a*.

With the vehicle 101 and the speed control device 1, the sun gear 43*a* in the first-stage accelerating portion 42*a* and the carrier 45*b* in the second-stage accelerating portion 42*b* are integrally provided. For this reason, even in the case where a large speed increasing ratio needs to be ensured due to an increase in the diameter of the wheel 101*c* and the planetary gear mechanism 14 with two or more stages is provided, an increase in the size of the vehicle body 101*a* in the width direction can be suppressed, and the speed control device 1 can be made compact in the width direction of the vehicle body 101*a*.

With the vehicle 101 and the speed control device 1, the tire 18 on the outer circumference of the wheel 101*c* is installed concentrically with the brake drum 11, and it is therefore possible to suppress an increase in the size of the vehicle body 101*a* in the width direction, and make the speed control device 1 compact in the width direction of the vehicle body 101*a*.

With the vehicle 101 and the speed control device 1, when the speed at which the centrifugal brake operates is changed, the user can remove the cover 15 attached to the wheel 101*c* to detach the operation tool 16 from the inside of the cover 15, and input an operational force to the transmission mechanism 26 using the operation tool 16. Accordingly, when the user wants to change the speed at which the centrifugal brake operates, he/she can promptly carry out the change.

With the vehicle 101 and the speed control device 1, the pinion 37 that meshes with the adjustment gears 36 rotates as a result of the operational force being input to the adjustment gears 36, and further, the rack portions 38 that mesh with the pinion 37 move. Then, the spring-side wedge-shaped members 32 are driven by the drive-side wedge-shaped members 33 provided so as to be integrated with the rack portions 38, and the positions of the ends of the springs 24 on the one end side change. Accordingly, the position change mechanism 25 including the wedge-shaped mechanism and the transmission mechanism 26 including the rack-and-pinion mechanism can be configured in a compact manner with a simple structure.

With the vehicle 101 and the speed control device 1, the outer gears 41 that mesh with the pinion 37 on the outer circumference of the adjustment gears 36 are provided as a part of the adjustment gears 36 in the circumferential direction, and it is therefore possible to prevent the adjustment gears 36 from excessively rotating the pinion 37. Further, the mechanism for preventing the positions of the ends of the springs 24 on the one end side from being excessively changed can be realized with a simple structure in which the outer gears 41 of the adjustment gears 36 are provided as a part in the circumferential direction of the adjustment gears 36.

With the vehicle 101 and the speed control device 1, the brake shoes 23, the adjustment gears 36, the pinion 37, and the position change mechanism 25 are installed in a compact area between the support plate 27 and the pressure plate 28 that are installed in parallel. For this reason, an increase in the size of the vehicle body 101*a* in the width direction can be suppressed, and the speed control device 1 can be made compact in the width direction of the vehicle body 101*a*.

Second Embodiment

Figure 13A:
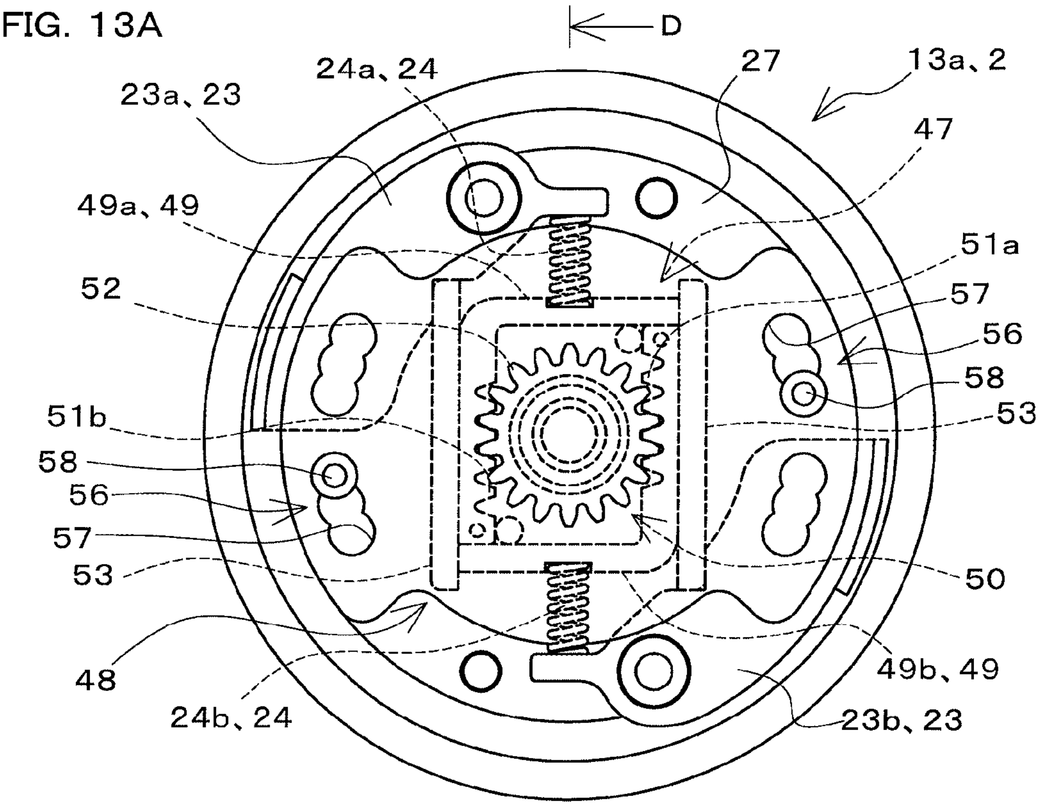
FIGS. 13A and 13B are diagrams schematically showing an internal structure of a vehicle speed control device according to a second embodiment of the present invention.
Figure 13B:
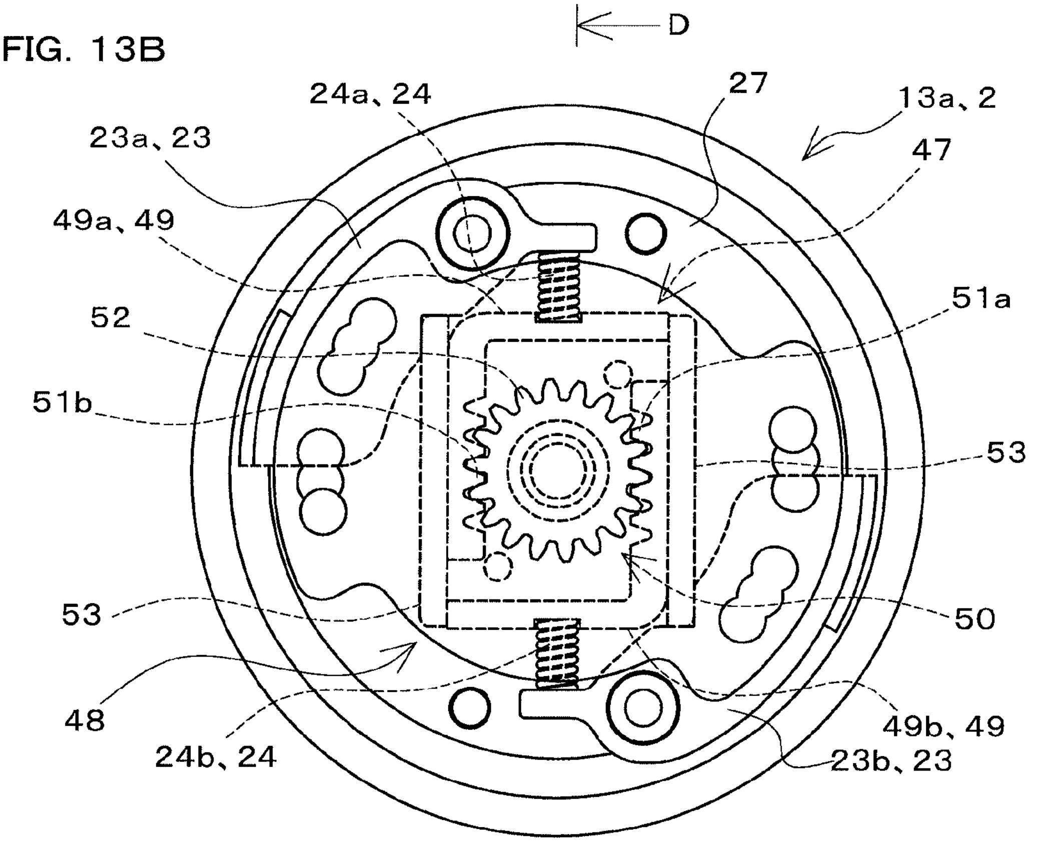

Next, a second embodiment of the present invention will be described. FIGS. 13A and 13B are diagrams schematically showing an internal structure of a vehicle speed control device 2 (hereinafter also referred to simply as a "speed control device 2") according to the second embodiment of the present invention, and show a centrifugal brake unit 13*a* from the outside in the vehicle width direction. FIGS. 13A and 13B show the centrifugal brake unit 13*a* in different operational states.

The speed control device 2 is configured substantially similarly to the speed control device 1 in the first embodiment, and the centrifugal brake unit 13*a* is also configured substantially similarly to the centrifugal brake unit 13 in the first embodiment. However, the speed control device 2 is different from the speed control device in the first embodiment in the configuration of a position change mechanism 47 and a transmission mechanism 48 in the centrifugal brake unit 13*a*. The difference from the first embodiment will now be described, and the elements that are configured similarly to those in the first embodiment will be given the same reference numerals in the diagrams or described with reference to the same reference numerals to omit the description of these elements.

The position change mechanism 47 is installed within the brake drum 11, and is provided as a mechanism for changing the positions of ends of springs 24 on one end side, each serving as an elastic member. This position change mechanism 47 includes spring position holding portions 49 and a drive portion 50.

A pair of spring position holding portions 49 (49*a*, 49*b*) are provided, each serving as an elastic member position holding portion in the present embodiment, and are provided as members for holding the ends of the springs 24 (24*a*, 24*b*) on the one end side. The pair of spring position holding portions 49 (49*a*, 49*b*) are provided so as to correspond to the pair of springs 24 (24*a*, 24*b*). Each spring position holding portion (49*a*, 49*b*) is provided as a member that is bent substantially at a right angle and extend in an L shape so as to constitute two side portions of a right-angled triangle. The pair of spring position holding portions 49 (49*a*, 49*b*) are installed at positions opposed to each other via the radial center of the support plate 27 so as to be disposed along four sides of a rectangle.

The spring position holding portion 49*a* is provided with a recessed portion for holding the end of the spring 24*a* on the one end side, and the spring position holding portion 49*b* is provided with a recessed portion for holding the end of the spring 24*b* on the one end side. Note that the spring 24*a* is held such that its end on the one end side fits into the recessed portion of the spring position holding portion 49*a*, and an end of the spring 24*a* on the other end side biases an end of a brake shoe 23*a* on one end side outward in the radial direction of the support plate 27. The spring 24*b* is held such that its end on the one end side fits into the recessed portion of the spring position holding portion 49*b*, and an end of the spring 24*b* on the other end side biases an end on one end side of the brake shoe 23*b* outward in the radial direction of the support plate 27.

The position change mechanism 47 is further provided with guide portions (53, 53) that are provided so as to be integrated with or fixed to the support plate 27, are installed so as to correspond to the respective spring position holding portions (49*a*, 49*b*), and slidably support the spring position holding portions (49*a*, 49*b*) in a radial direction of the support plate 27.

The drive portion 50 is configured as a mechanism for driving the spring position holding portions 49 so as to change the positions of the spring position holding portions 49 that hold the ends of the springs 24, with a force that is input from the outside and transmitted by the transmission mechanism 48. The drive portion 50 includes a pair of drive rack portions (51*a*, 51*b*) and a drive pinion 52.

Each drive rack portion (51*a*, 51*b*) is provided in a member that constitutes the corresponding spring position holding portion (49*a*, 49*b*). In the member that constitutes each spring position holding portion (49*a*, 49*b*), a portion provided with the recessed portion for holding the end of the spring (24*a*, 24*b*) and a portion provided with the drive rack portion (51*a*, 51*b*) are provided in respective portions that constitute different sides of the right-angled triangle shape. Note that the drive rack portion 51*a* is provided in a member that constitutes the spring position holding portion 49*a*, and the drive rack portion 51*b* is provided in a member that constitutes the spring position holding portion 49*b*.

The drive pinion 52 is provided as a gear for driving the drive rack portions (51*a*, 51*b*), and is provided so as be integrated with the transmission mechanism 48. Note that the drive rack portions (51*a*, 51*b*) are installed so as to mesh with the drive pinion 52, and are installed at positions opposed to each other via the drive pinion 52. The axis of the drive pinion 52 passes through the radial center of the support plate 27, and is positioned on the same line as a line perpendicular to the support plate 27.

Figure 14:
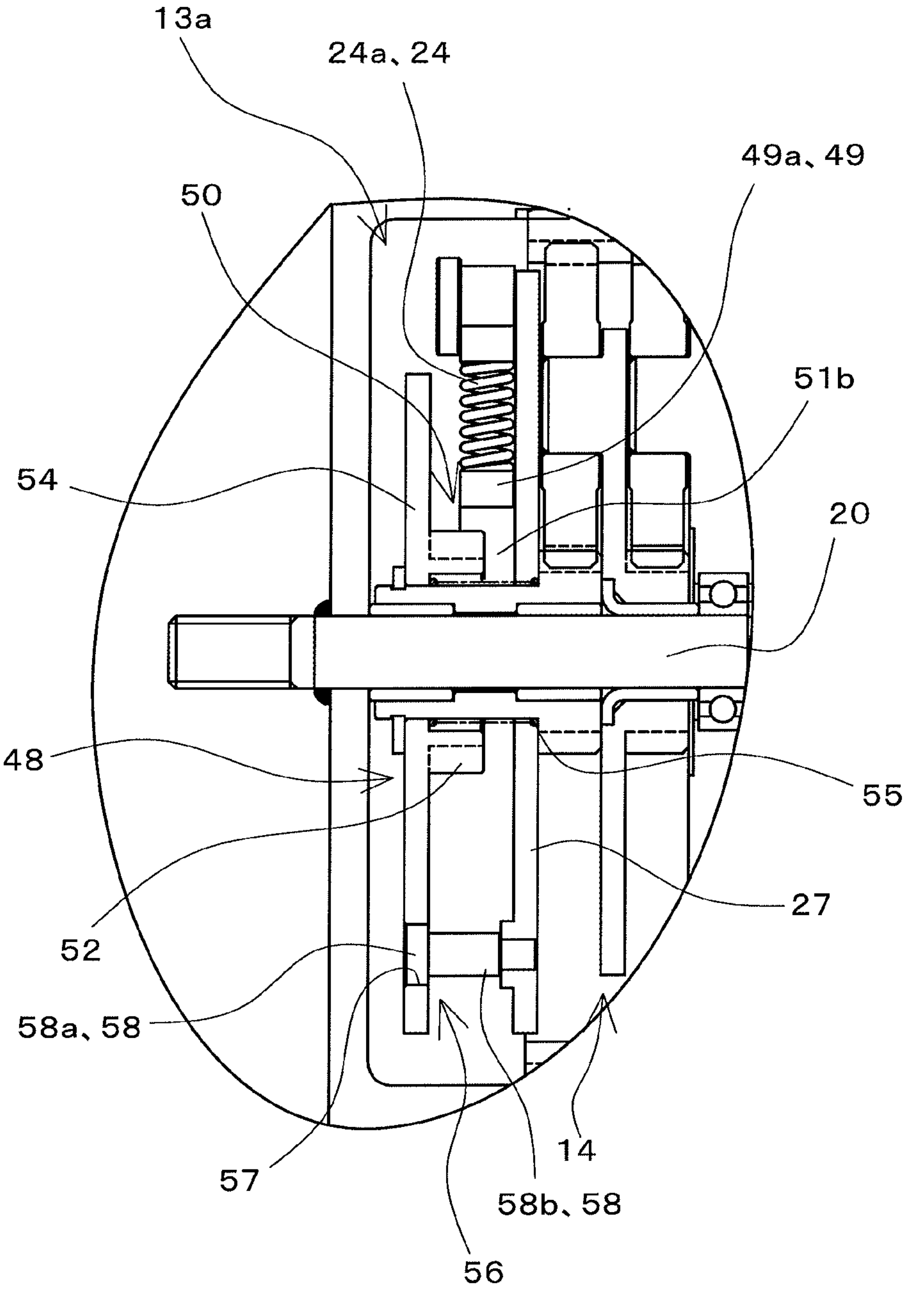
FIG. 14 is a diagram schematically showing a part of a cross-section as viewed from the position of arrows D-D in FIG. 13A.
Figure 15:
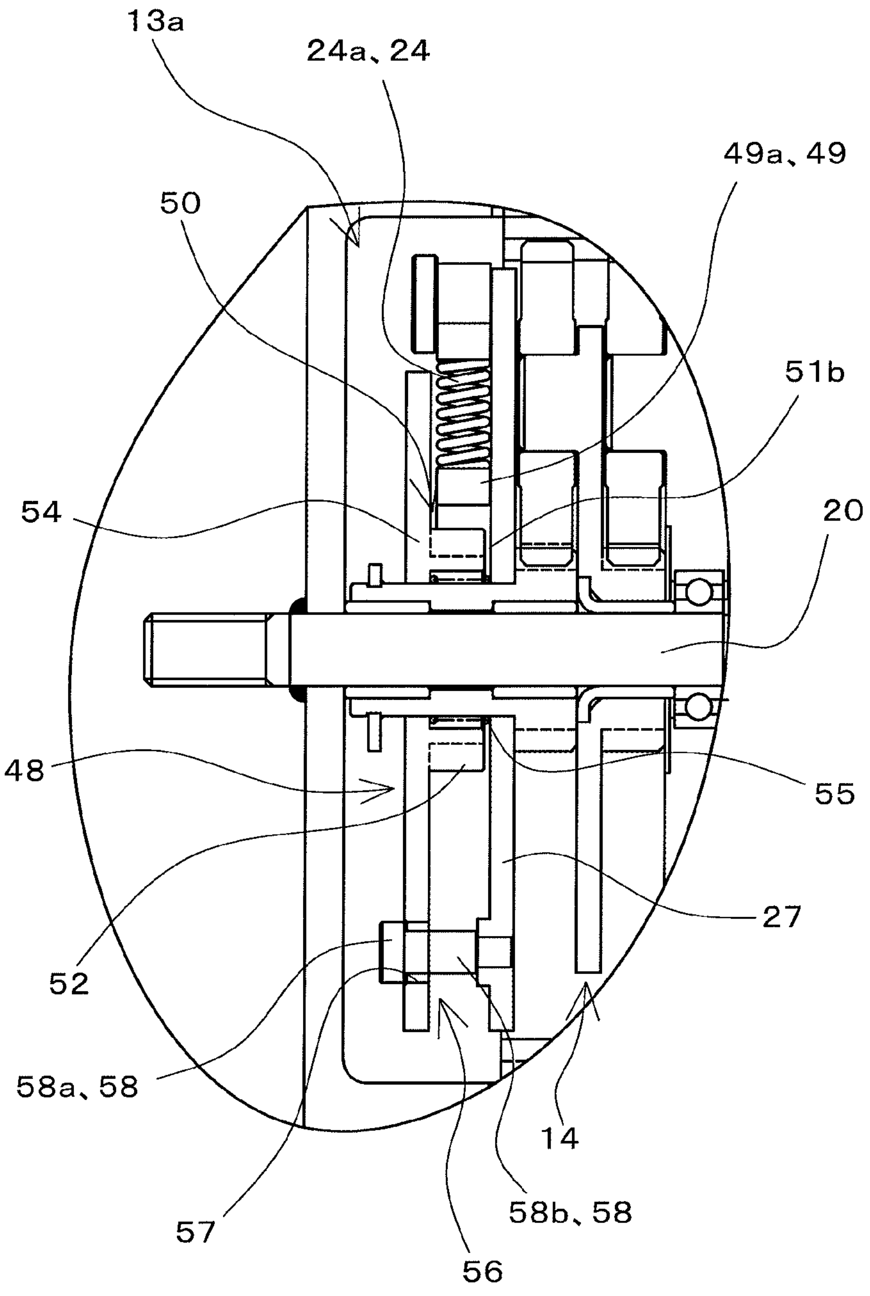
FIG. 15 is a diagram schematically showing a part of the cross-section as viewed from the position of arrows D-D in FIG. 13A in a different operational state of a transmission mechanism in the vehicle speed control device from the state shown in FIG. 14.

FIG. 14 is a diagram schematically showing a part of a cross-section as viewed from the position of arrows D-D in FIG. 13A. FIG. 15 is a diagram schematically showing a part of a cross section as viewed from the position of arrows D-D in FIG. 13A in a different operational state of the transmission mechanism 48 from the state shown in FIG. 14. Note that FIGS. 14 and 15 omit hatching for indicating a cross-section, from the viewpoint of more clearly showing the structure.

As shown in FIGS. 13 to 15, the transmission mechanism 48 includes a rotary plate portion 54 that is supported around the rotary shaft 20 so as to be capable of rotating around the rotary shaft 20, and a biasing spring 55 for biasing the rotary plate portion 54 in a direction of moving the rotary plate portion 54 away from the support plate 27.

The rotary plate portion 54 is installed so as to be exposable to the outside at least partially, and is provided as a member having a rotational symmetrical shape to which a force is input as a result of a rotating operation from the outside by a user. The rotary plate portion 54 is provided as a plate-like member that is integrated with the drive pinion 52 in the drive portion 50, and constitutes a plate portion in the present embodiment. The biasing spring 55 is provided as a coil spring that is installed such that the rotary shaft 20 passes therethrough, for example, and is configured as a compression spring.

The rotary plate portion 54 is biased in a direction of moving away from the support plate 27 by the biasing spring 55, as shown in FIG. 14, in a state where an external operation is not performed. Thus, meshing between the drive rack portions (51*a*, 51*b*) and the drive pinion 52 is canceled.

On the other hand, when an operation of pushing the rotary plate portion 54 toward the support plate 27 from the outside is performed, the rotary plate portion 54 approaches the support plate 27 against the biasing force of the biasing spring 55, as shown in FIG. 15. Then, the drive pinion 52 provided so as to be integrated with the rotary plate portion 54 is in a state of meshing with the drive rack portions (51*a*, 51*b*). As a result of the user operating so as to further rotate the rotary plate portion 54 in a state of pressing on the rotary plate portion 54 from the outside, the drive pinion 52 rotates together with the rotary plate portion 54. Thus, the drive rack portions (51*a*, 51*b*) meshing with the drive pinion 52 are displaced in opposite directions parallel to the radial direction of the support plate 27.

As described above, in the speed control device 2, the position change mechanism 47 is configured as a rack-and-pinion mechanism including the pair of drive rack portions (51*a*, 51*b*) and the drive pinion 52. Further, in the speed control device 2, the positions of the ends of the springs 24 on the one end side held by the spring position holding portions 49 change as a result of the operation being performed to press on the rotary plate portion 54 and rotate the rotary plate portion 54. With this change, the condition under which the springs 24 bias the brake shoes 23 changes, and the speed at which the centrifugal brake operates changes. Note that FIG. 13B shows a state where the ends of the springs 24 on the one end side have moved outward in the radial direction of the support plate 27, compared with the state shown in FIG. 13A.

As shown in FIGS. 13 to 15, the speed control device 2 is provided with positioning mechanisms 56 in the transmission mechanism 48. The positioning mechanisms 56 are provided as mechanisms capable of positioning the ends of the springs 24 on the one end side by changing the positions with respect to a plurality of predetermined positions, and a plurality of positioning mechanisms 56 are provided in the present embodiment. Each positioning mechanism 56 includes a through hole 57 provided in the rotary plate portion 54, and a pin member 58 that is installed in a state of penetrating the through hole 57 and is capable of being locked in the through hole 57 at a plurality of points of the through hole 57.

The through hole 57 is provided in an elongated shape that extends along a circumferential direction around the rotation center of the rotary plate portion 54. The through hole 57 is provided with arc-shaped enlarged portions, each being formed to expand in an arc shape such that their radial dimensions from the rotation center of the rotary plate 54 increase at a plurality of points of the aforementioned circumferential direction. In the present embodiment, an exemplary configuration provided with three arc-shaped enlarged portions is described.

The pin member 58 is fixed to the support plate 27 at its one end, and is supported in a cantilevered manner with respect to the support plate 27. The pin member 58 is provided with a large diameter portion 58*a* having a large radial dimension at its tip projecting from the support plate 27 in a cantilevered manner. A portion of the pin member 58 between an end thereof supported to the support plate 27 and the large diameter portion 58 is provided with a small diameter portion 58*b* having a cylindrical shape with a smaller diameter than that of the large diameter portion 58*a*.

As shown in FIG. 14, the pin member 58*a* is configured to be capable of being locked at the large diameter portion 58*a* with respect to the arc-shaped enlarged portions of the through hole 57 when the operation of pressing on the rotary plate portion 54 is not performed. That is to say, the radial dimension of the large diameter portion 58*a* is set so as to correspond to the dimension of each arc-shaped enlarged portion.

On the other hand, as shown in FIG. 15, when the operation of pressing on the rotary plate portion 54 is performed, the large diameter portion 58*a* and the arc-shaped enlarged portions of the through hole 57 are disengaged. Then, the pin member 58 is in a state of penetrating the through hole 57 at the small diameter portion 58*b*. Thus, the through hole 57 is capable of relatively moving along its longitudinal direction with respect to the pin member 58, and the operation of rotating the rotary plate portion 54 is enabled. The user then cancels the rotation operation and the pressing operation at the stage where the pin member 58 has moved up to the position corresponding to a desired arc-shaped enlarged portion of the through hole 57. The pin member 58 is thereby locked in the through hole 57 at a different arc-shaped enlarged portion from the arc-shaped enlarged portion that was used before the user operation is performed. With the above-described operation of the rotary plate portion 54, the user can easily position the ends of the springs 24 on the one end side by selecting a desired position from among a plurality of predetermined positions.

With the above-described speed control device 2, as with the speed control device 1 in the first embodiment, the speed at which the centrifugal brake operates can be easily changed from the outside without disassembling the device.

With the speed control device 2, since the position change mechanism 47 is provided as a rack-and-pinion mechanism, the mechanism for changing the positions of the ends of the springs 24 on the one end side can be configured in a compact manner with a small structure.

With the speed control device 2, the transmission mechanism 48 includes the rotary plate portion 54 serving as a plate portion provided so as to be integrated with the drive pinion 52 in the drive portion 50, and the rotary plate portion 54 is provided so as to be exposable to the outside. For this reason, the transmission mechanism 48 for transmitting an external force to the position change mechanism 47 can be realized with a small number of constituent components and a simple structure.

Further, with the speed control device 2, the transmission mechanism 48 is provided with the positioning mechanisms 56 capable of positioning the ends of the springs 24 on the one end side at a plurality of predetermined positions. For this reason, the task of changing the speed at which the centrifugal brake is operated is facilitated, and the task of configuring settings such that the centrifugal brake operates at the same speed for both wheels of the vehicle 101 can also be easily performed.

With the speed control device 2, as a result of performing the operation of rotating the rotary plate portion 54 that is provided so as to be integrated with the drive pinion 52 in the drive portion 50 and exposed to the outside, the pin member 58 is locked with respect to the through hole 57 in the rotary plate portion 54, and the ends of the springs 24 on the one end side can be positioned at a plurality of predetermined positions. Accordingly, a configuration can be realized in which a separate tool is not necessary for the task of changing the speed at which the centrifugal brake is operated. Further, the user can easily recognize the set state of the speed at which the centrifugal brake is operated by visually checking, from the outside, the position where the pin member 58 is locked with respect to the through hole 57 in the rotary plate 54 that is exposed to the outside. Accordingly, a configuration can be realized in which a separate indicator for enabling the set state of the speed at which the centrifugal brake is operated to be recognized from the outside is not necessary.

Third Embodiment

Figure 16A:
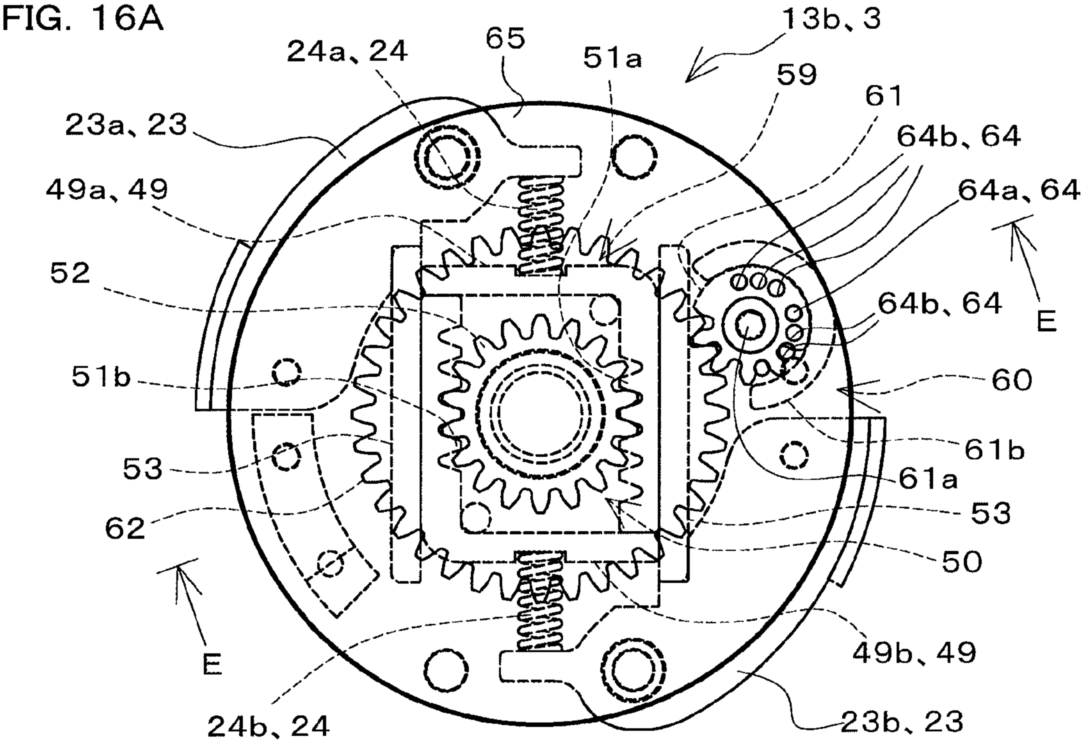
FIGS. 16A and 16B are diagrams schematically showing an internal structure of a vehicle speed control device according to a third embodiment of the present invention.
Figure 16B:
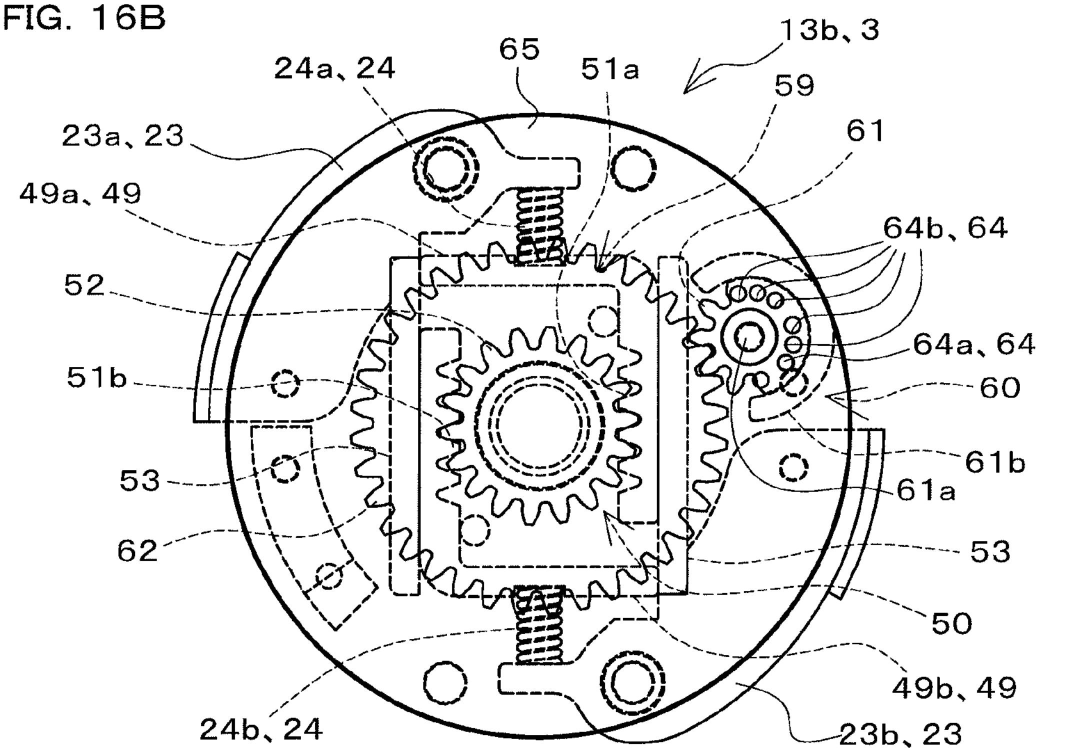

Next, a third embodiment of the present invention will be described. FIGS. 16A and 16B are diagrams schematically showing an internal structure of a vehicle speed control device 3 (hereinafter also referred to simply as a "speed control device 3") according to the third embodiment of the present invention, and show a centrifugal brake unit 13*b* from the outside in the vehicle width direction. FIGS. 16A and 16B show the centrifugal brake unit 13*b* in different operational states.

The speed control device 3 is configured substantially similarly to the speed control device 1 in the first embodiment, and the centrifugal brake unit 13*b* is also configured substantially similarly to the centrifugal brake unit 13 in the first embodiment. However, the speed control device 3 is different from the speed control device in the first embodiment in the configuration of a position change mechanism 59 and a transmission mechanism 60 in the centrifugal brake unit 13*b*. Meanwhile, the position change mechanism 59 is configured substantially similarly to the position change mechanism 47 in the second embodiment. The difference from the first and second embodiments will now be described, and the elements that are configured similarly to those in the first and second embodiments will be given the same reference numerals in the diagrams or described with reference to the same reference numerals to omit the description of these elements.

The position change mechanism 59 is installed within a brake drum 11, and is provided as a mechanism for changing positions of ends of springs 24 on one end side, each being an elastic member. This position change mechanism 59 includes spring position holding portions 49, each being an elastic member position holding portion, and a drive portion 50, as in the position change mechanism 47 in the second embodiment. Note that the spring position holding portions 49 (49*a*, 49*b*) in the position change mechanism 59 are configured similarly to those in the second embodiment, except that the arrangement of portions where drive rack portions (51*a*, 51*b*) are provided relative to a drive pinion 52 is inverted. The drive portion 50 in the position change mechanism 59 is configured similarly to that in the second embodiment, except that the drive pinion 52 is provided so as to be integrated with a large-diameter gear 62, which will be described later, in the transmission mechanism 60.

Figure 17A:
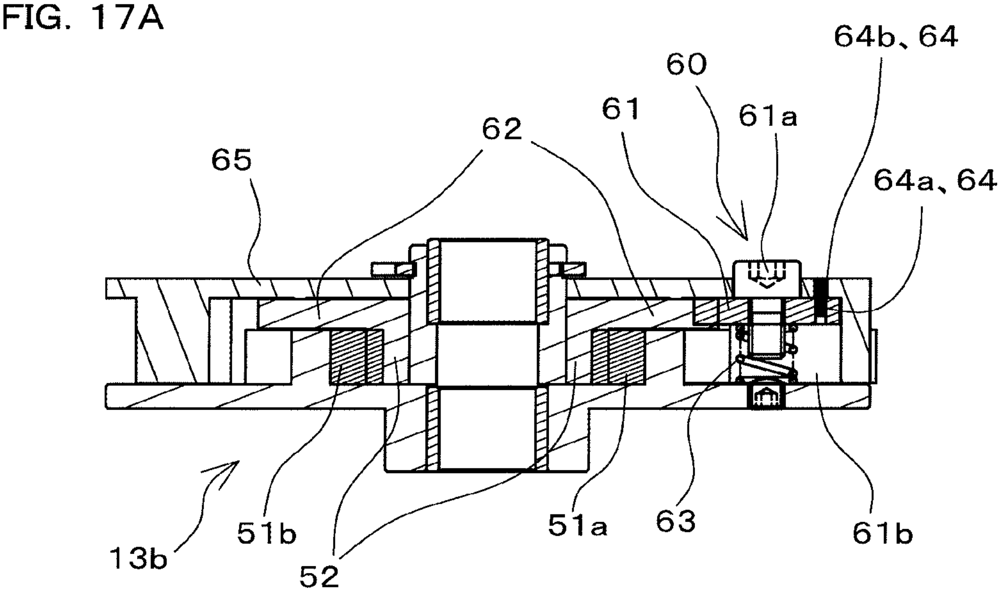
FIGS. 17A and 17B are diagrams schematically showing a part of a cross-section as viewed from the position of arrows E-E in FIG. 16A.
Figure 17B:
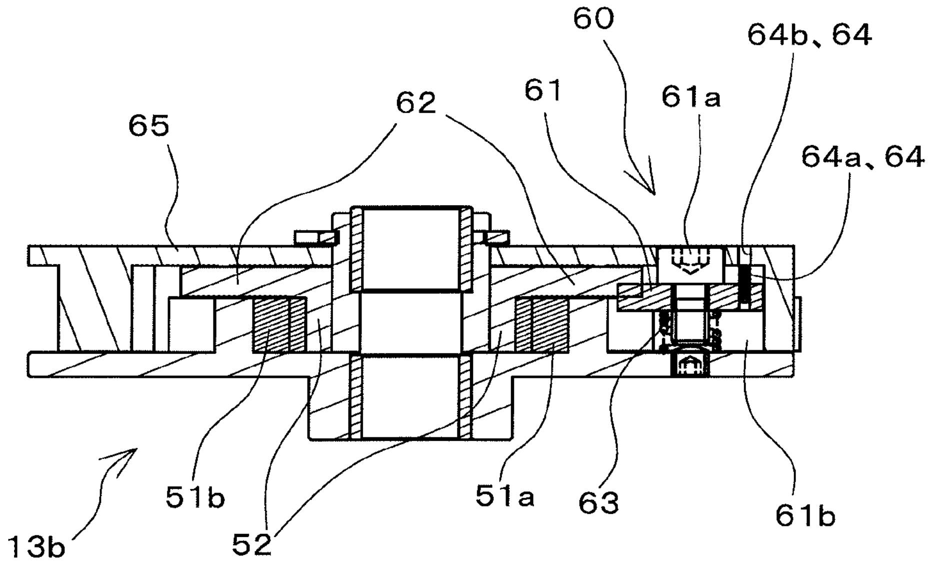

FIG. 17 is a diagram schematically showing a part of a cross-section as viewed from the position of arrows E-E in FIG. 16A. Note that FIGS. 17A and 17B show the transmission mechanism 60 in different operational states. As shown in FIGS. 16 and 17, the transmission mechanism 60 includes an adjustment gear 61, a large-diameter gear 62, a biasing spring 63, and the like.

The adjustment gear 61 is installed so as to be exposable to the outside, and is provided as a gear for transmitting a force that is input from the outside to the drive portion 50 via the large-diameter gear 62. The adjustment gear 61 is provided with an outer gear as a part of its outer circumference. The outer gear is configured to mesh with the large-diameter gear 62.

The adjustment gear 61 has an outer circumferential curved face in an arc shape as a part of its outer circumference other than the part where the outer gear is provided. The adjustment gear 61 is installed within a guide wall portion 61*b* having an inner circumferential face in an arc shape. The adjustment gear 61 is configured to be guided in the rotation direction as a result of sliding at its outer circumferential curved face in an arc shape with respect to the inner circumferential face of the guide wall portion 61*b*.

A shaft portion 61*a* is fixed to the radial center portion of the adjustment gear 61. The shaft portion 61*a* is inserted in a through hole provided in an outer plate 65 disposed on the outside in the width direction of a vehicle body 101*a* in the centrifugal brake unit 13*b*, in a rotatably penetrating state. An end of the shaft portion 61*a* that is exposed from the outer plate 65 is provided with a hexagonal hole capable of engaging with an end of an operation tool 16. As a result of the operation being performed to rotate the operation tool 16 engaging with the hexagonal hole, the operation of rotating the adjustment gear 61 is enabled.

The large-diameter gear 62 is rotatably installed in the centrifugal brake unit 13*b*, and the drive pinion 52 is provided so as to be integrated with the large-diameter gear 62 in its radial center portion. The large-diameter gear 62 is installed so as to be capable of meshing with the outer gear of the adjustment gear 61. The biasing spring 63 is provided as a coil spring, for example, and is configured as a compression spring for biasing the adjustment gear 61 in a direction of approaching and coming into contact with the outer plate 65.

The adjustment gear 61 is biased toward the outer plate 65 by the biasing spring 63 as shown in FIG. 17A, when an external operation using the operation tool 16 is not performed by the user. The adjustment gear 61 is thereby held in a state of being coupled to the outer plate 65 via a positioning mechanism 64, which will be described later. As a result of the adjustment gear 61 being coupled to the outer plate 65 via the positioning mechanism 64, the positions of the large-diameter gear 62, the drive pinion 52, and the spring position holding portions 49 are held, and the positions of the ends of the springs 24 on the one end side are held.

On the other hand, when an end of the operation tool 16 is inserted into the hexagonal hole in the adjustment gear 61 and the operation of pressing on the adjustment gear 61 is performed, the adjustment gear 61 moves away from the outer plate 65 against the biasing force of the biasing spring 63, as shown in FIG. 17B. Thus, the state in which the adjustment gear 61 is coupled to the outer plate 65 with the later-described positioning mechanism 64 is canceled, and the adjustment gear 61 can rotate. Then, when the operation of rotating the adjustment gear 61 with the operation tool 16 is performed, the large-diameter gear 62 rotates, and the drive pinion 52 rotates together with the large-diameter gear 62. Thus, the drive rack portions (51*a*, 51*b*) meshing with the drive pinion 52 are displaced in opposite directions.

As described above, in the speed control device 3, the positions of the ends of the springs 24 on the one end side held by the spring position holding portions 49 change as a result of the operation being performed to press on the adjustment gear 61 and rotate the adjustment gear 61. With this change, the condition under which the springs 24 bias the brake shoes 23 changes, and the speed at which the centrifugal brake operates changes. Note that FIG. 16B shows a state where the ends of the springs 24 on the one end side have moved outward in the radial direction of the support plate 27, compared with the state shown in FIG. 16A.

As shown in FIGS. 16A, 16B, 17A, and 17B, the speed control device 3 is provided with the positioning mechanism 64 in the transmission mechanism 60. The positioning mechanism 64 is provided as a mechanism capable of positioning the ends of the springs 24 on the one end side by changing the positions with respect to a plurality of predetermined positions. The positioning mechanism 64 includes a plurality of holes 64*b* formed to passes through the outer plate 65, and a positioning pin 64*a* capable of being separately locked with respect to each of the holes 64*b*.

The holes 64*b* are provided so as to be arranged along the circumferential direction around the rotation center of the adjustment gear 61. The positioning pin 64*a* is fixed to the adjustment gear 61 and supported to the adjustment gear 61 in a cantilevered manner. The positioning pin 64*a* is configured so as to be capable of being separately inserted in and locked with respect to each of the holes 64*b*, at its tip projecting from the adjustment gear 61 in a cantilevered manner. That is to say, as shown in FIG. 17A, the positioning pin 64*a* is configured to be capable of being locked with respect to one of the holes 64*b* at its tip when the operation of pressing on the adjustment gear 61 is not performed. As a result of the positioning pin 64*a* being locked in the hole 64*b*, the state where the adjustment gear 61 is coupled to the outer plate 65 is held.

On the other hand, when the operation of pressing on the adjustment gear 61 is performed, the positioning pin 64*a* and the hole 64*b* are disengaged, as shown in FIG. 17B. Thus, the adjustment gear 61 can rotate, and the operation of rotating the adjustment gear 61 with the operation tool 16 is enabled. The user cancels the rotation operation and the pressing operation at the stage where the positioning pin 64*a* has moved up to the position corresponding to a desired hole 64*b* of the holes 64*b*. The positioning pin 64*a* is thereby locked with respect to a different hole 64*b* from the hole 64*b* that was used before the user operation is performed. With the above-described operation of the adjustment gear 61, the user can easily position the ends of the springs 24 on the one end side by selecting a desired position from among a plurality of predetermined positions.

With the above-described speed control device 3, as with the speed control device 1 in the first embodiment, the speed at which the centrifugal brake operates can be easily changed from the outside without disassembling the device.

With the speed control device 3, the transmission mechanism 60 includes the adjustment gear 61 for transmitting a force to the drive portion 50, and the adjustment gear 61 is provided so as to be exposable to the outside. For this reason, the transmission mechanism 60 for transmitting an external force to the position change mechanism 59 can be realized with a small number of constituent components and a simple structure.

With the speed control device 3, the transmission mechanism 60 is provided with the positioning mechanism 64 capable of positioning the ends of the springs 24 on the one end side at a plurality of predetermined positions. For this reason, the task of changing the speed at which the centrifugal brake is operated is facilitated, and the task of configuring settings such that the centrifugal brake operates at the same speed for both wheels of the vehicle 101 can also be easily performed.

Fourth Embodiment

Figure 18A:
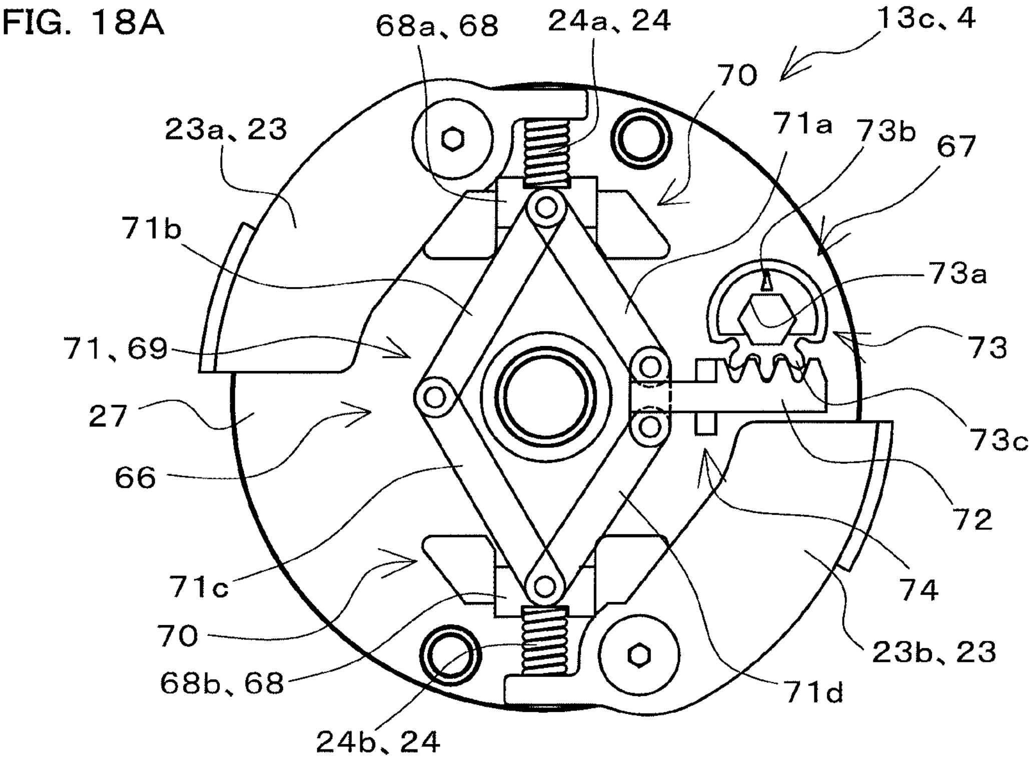
FIGS. 18A and 18B are diagrams schematically showing an internal structure of a vehicle speed control device according to a fourth embodiment of the present invention.
Figure 18B:
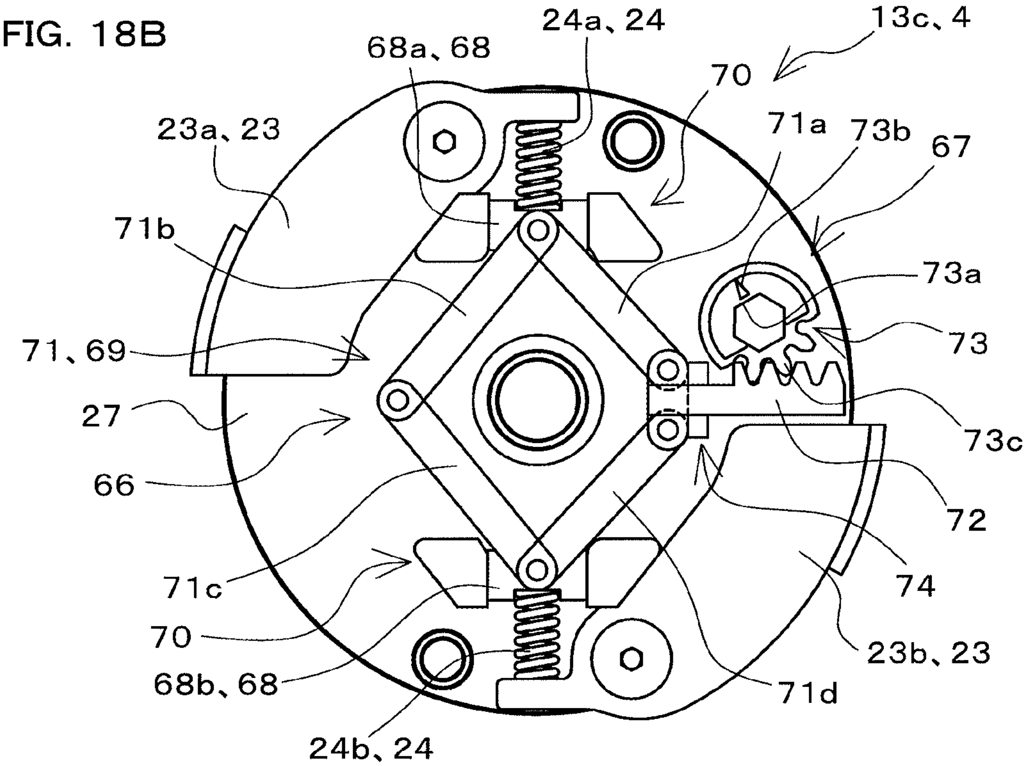

Next, a fourth embodiment of the present invention will be described. FIGS. 18A and 18B are diagrams schematically showing an internal structure of a vehicle speed control device 4 (hereinafter also referred to simply as a "speed control device 4") according to the fourth embodiment of the present invention, and show a centrifugal brake unit 13*c* from the outside in the vehicle width direction. FIGS. 18A and 18B show the centrifugal brake unit 13*c* in different operational states.

The speed control device 4 is configured substantially similarly to the speed control device 1 in the first embodiment, and the centrifugal brake unit 13*c* is also configured substantially similarly to the centrifugal brake unit 13 in the first embodiment. However, the speed control device 4 is different from the speed control device in the first embodiment in the configuration of a position change mechanism 66 and a transmission mechanism 67 in the centrifugal brake unit 13*c*. The difference from the first embodiment will now be described, and the elements that are configured similarly to those in the first embodiment will be given the same reference numerals in the diagrams or described with reference to the same reference numerals to omit the description of these elements.

The position change mechanism 66 is installed within a brake drum 11, and is provided as a mechanism for changing the positions of ends of springs 24 on one end side, each being an elastic member. This position change mechanism 66 includes spring position holding portions 68 and a drive portion 69.

A pair of spring position holding portions 68 (68*a*, 68*b*) are provided, each serving as an elastic member position holding portion in the present embodiment, and are provided as members for holding the ends of the springs 24 (24*a*, 24*b*) on the one end side. The pair of spring position holding portions 68 (68*a*, 68*b*) are provided so as to correspond to the pair of springs 24 (24*a*, 24*b*), and are installed at positions opposed to each other via the radial center of the support plate 27. The spring position holding portions (68*a*, 68*b*) are provided as block-like members.

The spring position holding portion 68*a* is provided with a recessed portion for holding the end of the spring 24*a* on the one end side, and the spring position holding portion 68*b* is provided with a recessed portion for holding the end of the spring 24*b* on the one end side. The position change mechanism 66 is further provided with guide portions (70, 70) that are installed so as to be integrated with or fixed to the support plate 27 and installed so as to correspond to the respective spring position holding portions (68*a*, 68*b*), and slidably support the spring position holding portions (68*a*, 68*b*) in a radial direction of the support plate 27.

The drive portion 69 is configured as a member for driving the spring position holding portions 68 so as to displace the positions of the spring position holding portions 68 that hold the ends of the springs 24, with a force that is input from the outside and transmitted by the transmission mechanisms 67. The drive portion 69 includes a link mechanism 71 and a drive rack portion 72.

In the present embodiment, the link mechanism 71 is configured as a square link mechanism in which four link members (71*a*, 71*b*, 71*c*, 71*d*) are connected to each other in tandem, and are rotatably connected with respect to each other at respective ends of the connected link members (71*a*, 71*b*, 71*c*, 71*d*). The two ends of the link mechanism in which the four link members (71*a*, 71*b*, 71*c*, 71*d*) are connected in tandem are rotatably connected to the drive rack portion 72.

More specifically, one end of the link member 71*a* is connected to the drive rack portion 72, the other end of the link member 71*a* is connected to one end of the link member 71*b*, the other end of the link member 71*b* is connected to one end of the link member 71*c*, the other end of the link member 71*c* is connected to one end of the link member 71*d*, and the other end of the link member 71*d* is connected to the drive rack portion 72. The other end of the link member 71*a* and the one end of the link member 71*b* are rotatably connected to the spring position holding portion 68*a*. The other end of the link member 71*c* and the one end of the link member 71*d* are rotatably connected to the spring position holding portion 68*b*.

The drive rack portion 72 is installed so as to mesh with an adjustment gear 73 in the transmission mechanism 67. The drive rack portion 72 is slidably supported by a guide portion 74 fixed to the support plate 27 so as to move along a direction perpendicular to the direction in which the pair of springs (24*a*, 24*b*) are arranged. As a result of the drive rack portion 72 moving toward the center of the support plate 27, the link mechanism 71 undergoes deformation such that the spring position holding portion 68*a* and the spring position holding portion 68*b* move away from each other. On the other hand, as a result of the drive rack portion 72 moving outward in the radial direction of the support plate 27, the link mechanism 71 undergoes deformation such that the spring position holding portion 68*a* and the spring position holding portion 68*b* approach each other.

The transmission mechanism 67 includes the adjustment gear 73. The adjustment gear 73 is rotatably supported to the support plate 27. The adjustment gear 73 is provided with a hexagonal hole 73*a* capable of engaging with an end of an operation tool 16. Further, the adjustment gear 73 is provided so as to be capable of transmitting a force that is input from the outside via the operation tool 16 with its end engaging with the hexagonal hole 73*a* by the user, to the drive rack portion 72 in the drive portion 69. Accordingly, as a result of the operation being performed to rotate the adjustment gear 73, the drive rack portion 72 moves, the link mechanism 71 undergoes deformation, and the positions of the spring position holding portions 68 change. Note that an outer gear 73*c* that meshes with teeth of the drive rack portion 72 is provided on the outer circumference of the adjustment gear 73. The outer gear 73*c* is provided as a part in the circumferential direction of the adjustment gear 73.

The adjustment gear 73 is installed such that at least the hexagonal hole 73*a* and an indicator 73*b*, which is shown as an exemplary triangular mark imprinted in an end face where the hexagonal hole 73*a* is provided, are exposable to the outside. Thus, the user can visually check the hexagonal hole 73*a* and the indicator 73*b* from the outside. Note that when the user operates the adjustment gears 73 using the operation tool 16, he/she can recognize the amount of operation by visually checking the rotational position of the indicator 73*b* that rotates together with the adjustment gear 73.

As described above, in the speed control device 4, the position change mechanism 66 includes the link mechanism 71. Further, in the speed control device 4, the positions of the ends of the springs 24 on the one end side held by the spring position holding portions 68 change as a result of the operation being performed to rotate the adjustment gear 73. With this change, the condition under which the springs 24 bias the brake shoes 23 changes, and the speed at which the centrifugal brake operates changes. Note that FIG. 18B shows a state where the ends of the springs 24 on the one end side have moved radially inward of the support plate 27, compared with the state shown in FIG. 18A.

Note that the speed control device 4 is also provided with a positioning mechanism, as in the first to third embodiments. In this case, for example, the speed control device 4 may be provided with a positioning mechanism configured similarly to that in the third embodiment.

With the above-described speed control device 4, as with the speed control device 1 in the first embodiment, the speed at which the centrifugal brake operates can be easily changed from the outside without disassembling the device.

With the speed control device 4, since the position change mechanism 47 is provided so as to have a configuration including the link mechanism 71, the mechanism for changing the positions of the ends of the springs 24 on the one end side can be configured in a compact manner with a small structure.

Fifth Embodiment

Figure 19:
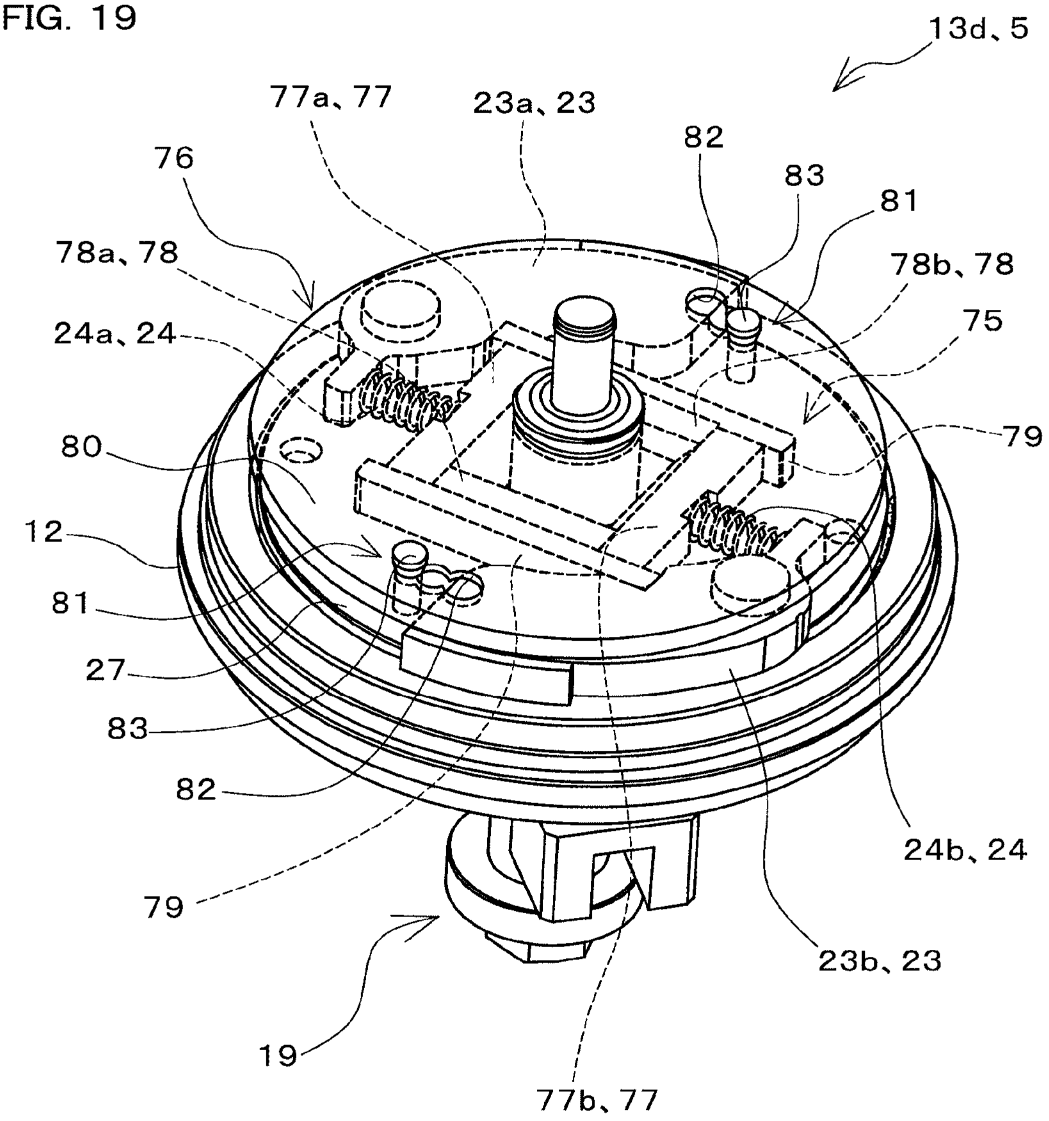
FIG. 19 is a perspective view schematically showing a vehicle speed control device according to a fifth embodiment of the present invention.
Figure 20:
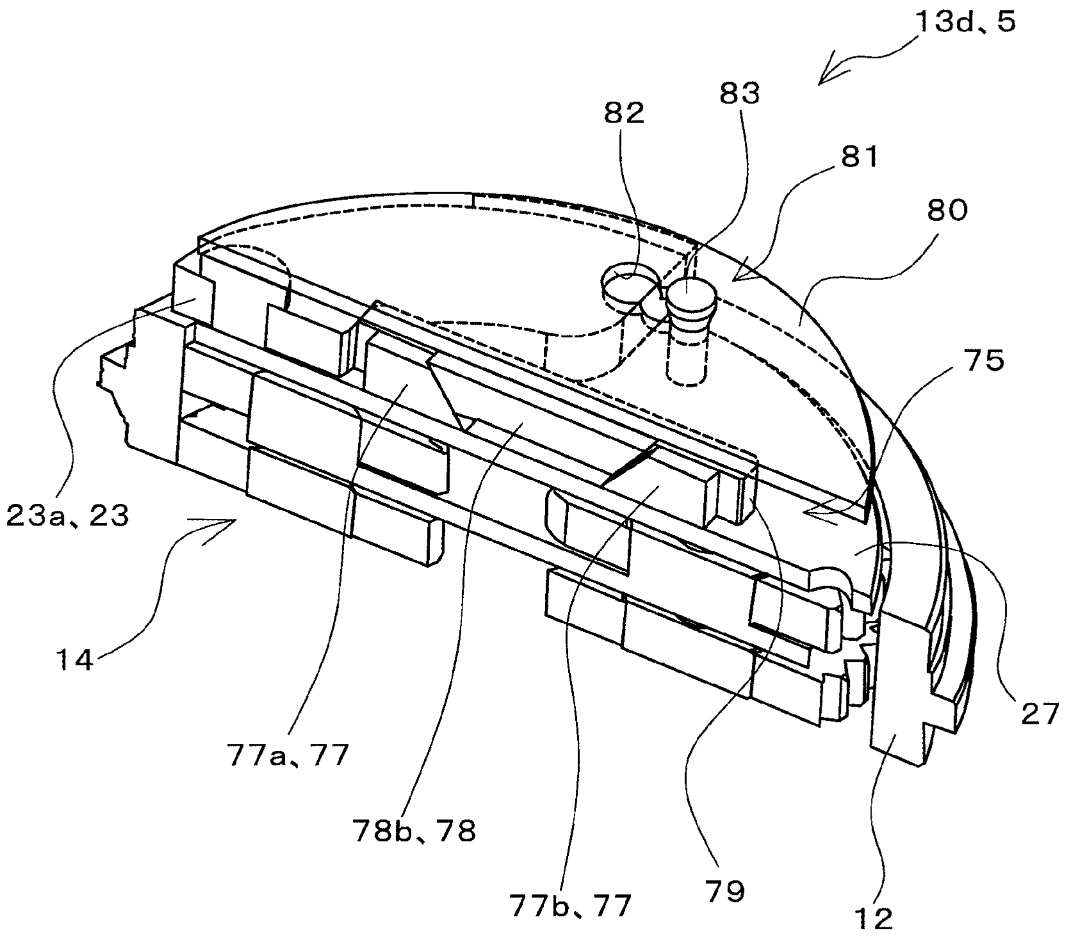
FIG. 20 is a perspective view schematically showing a part of a cross-section of the vehicle speed control device shown in FIG. 19.
Figure 21A:
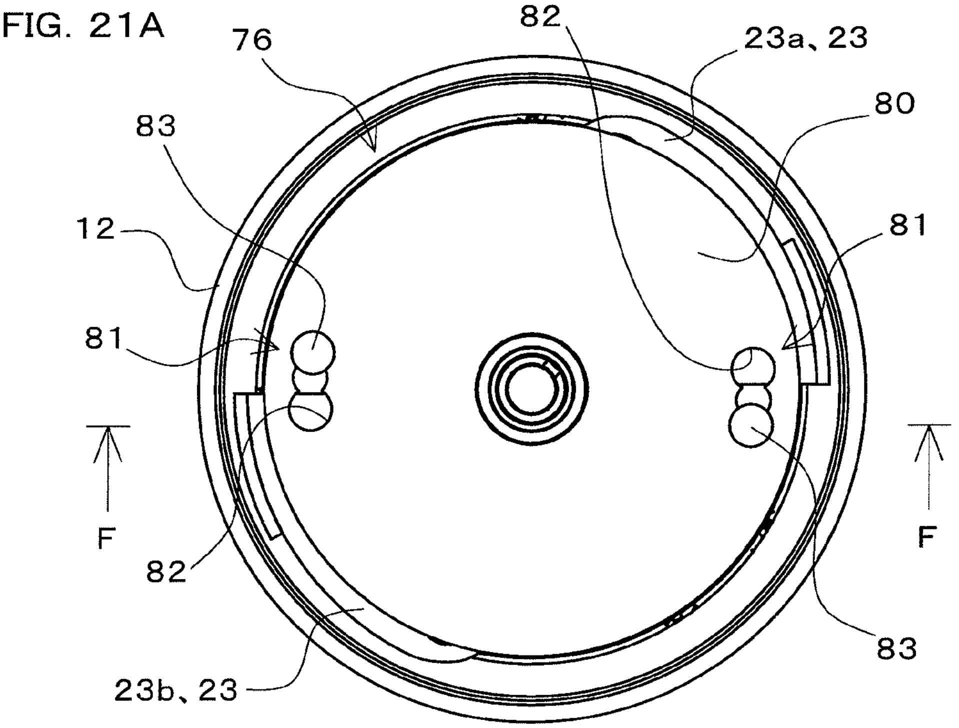
FIGS. 21A and 21B are diagrams showing the vehicle speed control device shown in FIG. 19, including a view from the outside in the vehicle width direction, and a cross-sectional view thereof as viewed from the position of arrows F-F.
Figure 21B:
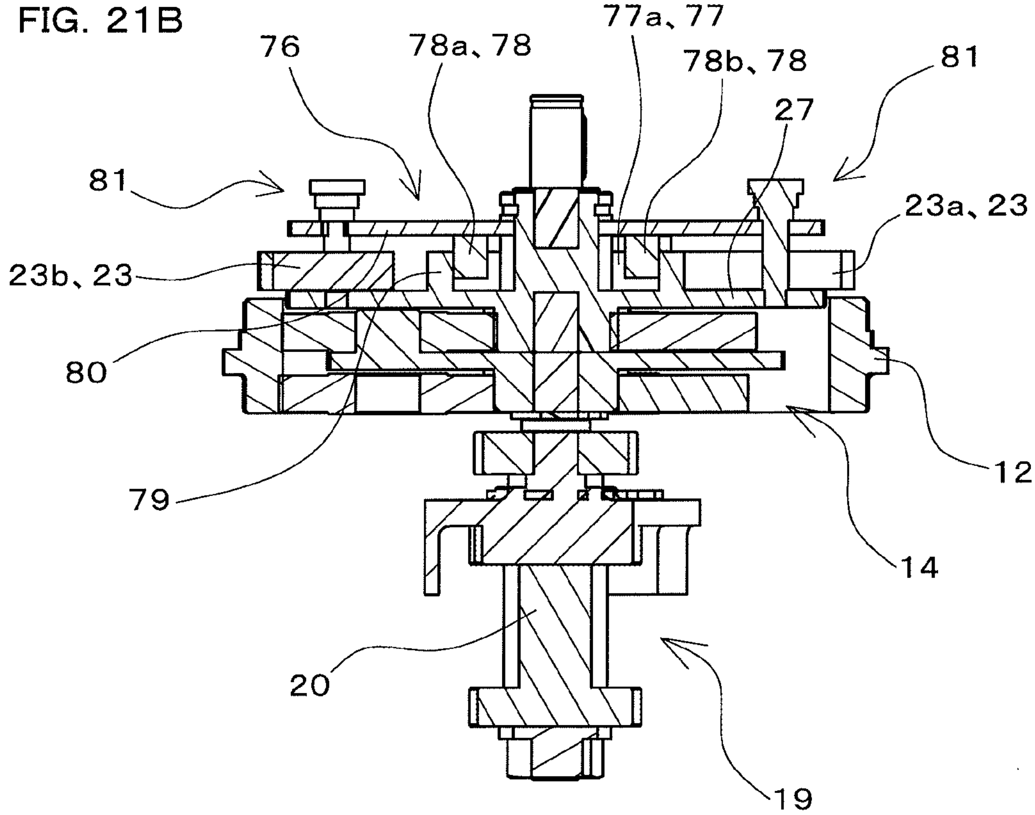
Figure 22B:
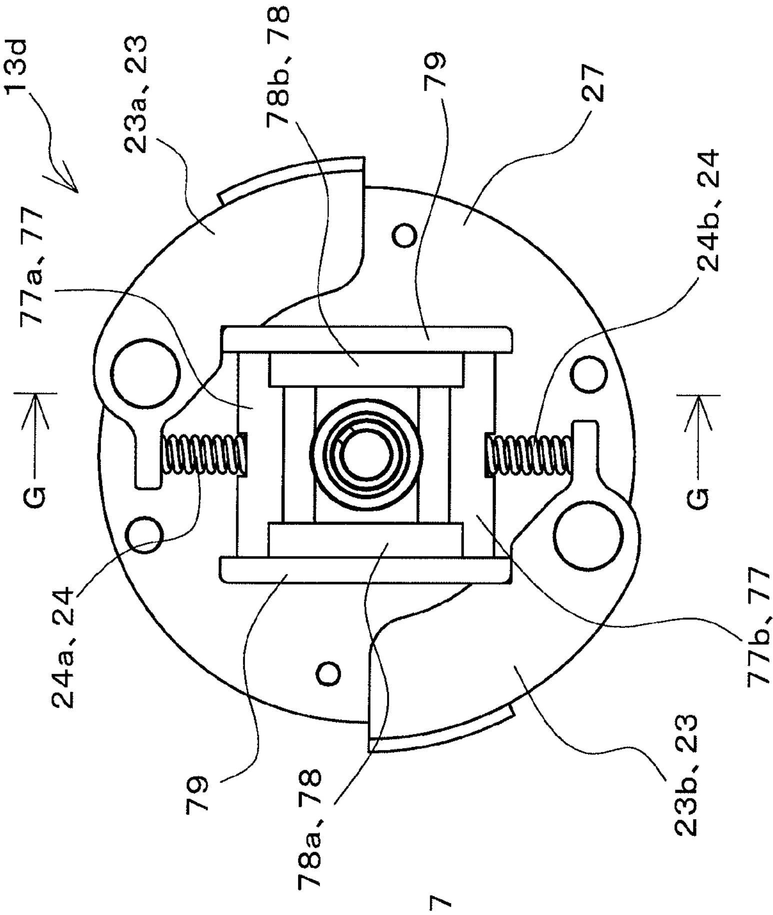
FIGS. 22A and 22B are a diagram schematically showing an internal structure of the vehicle speed control device shown in FIG. 19, and a cross-sectional view thereof as viewed from the position of arrows G-G.
Figure 22A:
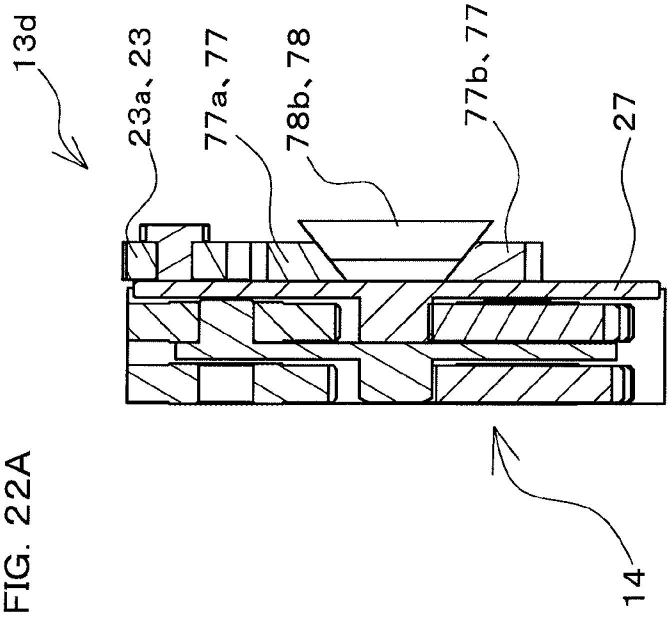
Figure 23B:
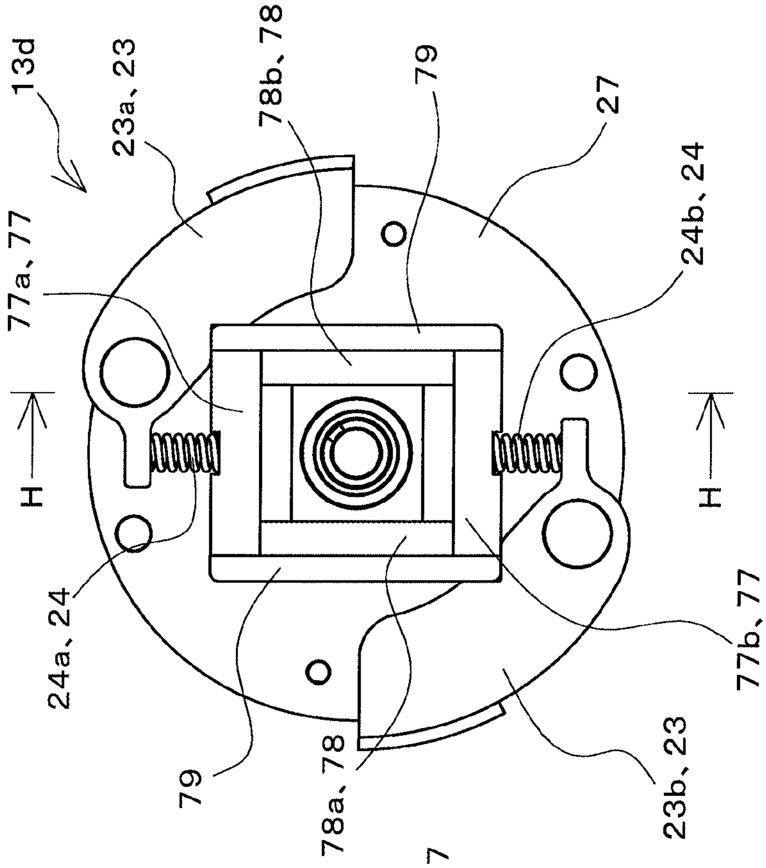
FIGS. 23A and 23B are a diagram schematically showing an internal structure of the vehicle speed control device shown in FIG. 19, and a cross-sectional view as viewed from the position of arrows H-H.
Figure 23A:
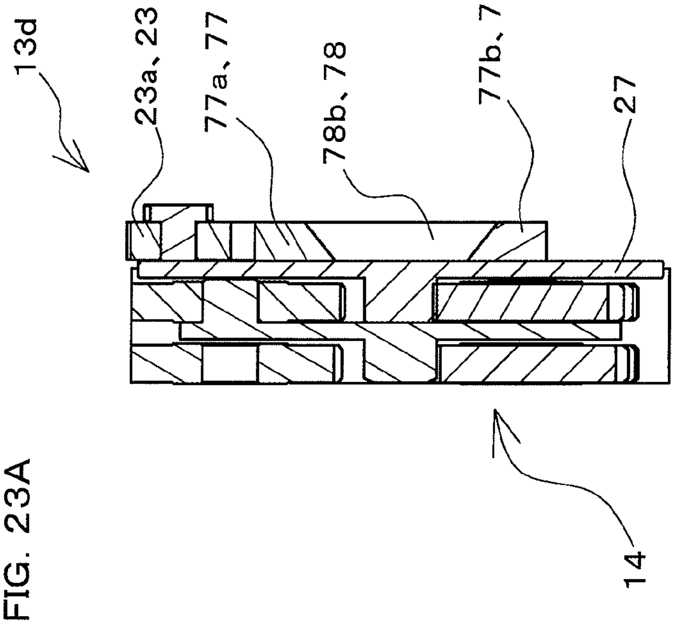

Next, a fifth embodiment of the present invention will be described. FIG. 19 is a perspective view schematically showing a vehicle speed control device 5 (hereinafter also referred to simply as a "speed control device 5") according to the fifth embodiment of the present invention. FIG. 20 is a perspective view schematically showing a part of a cross-section of a part of the vehicle speed control device 5. FIGS. 21A and 21B are diagrams showing the vehicle speed control device 5, including a view from the outside in the vehicle width direction (FIG. 21A) and a cross-sectional view as viewed from the position of arrows F-F (FIG. 21B). FIGS. 22A and 22B include a diagram schematically showing an internal structure of the vehicle speed control device 5 (FIG. 22B) and a cross-sectional view thereof as viewed from the position of arrows G-G (FIG. 22A). FIGS. 23A and 23B include a diagram schematically showing an internal structure of the vehicle speed control device 5 (FIG. 23B) and a cross-sectional view thereof as viewed from the position of arrows H-H (FIG. 23A).

Figure 24A:
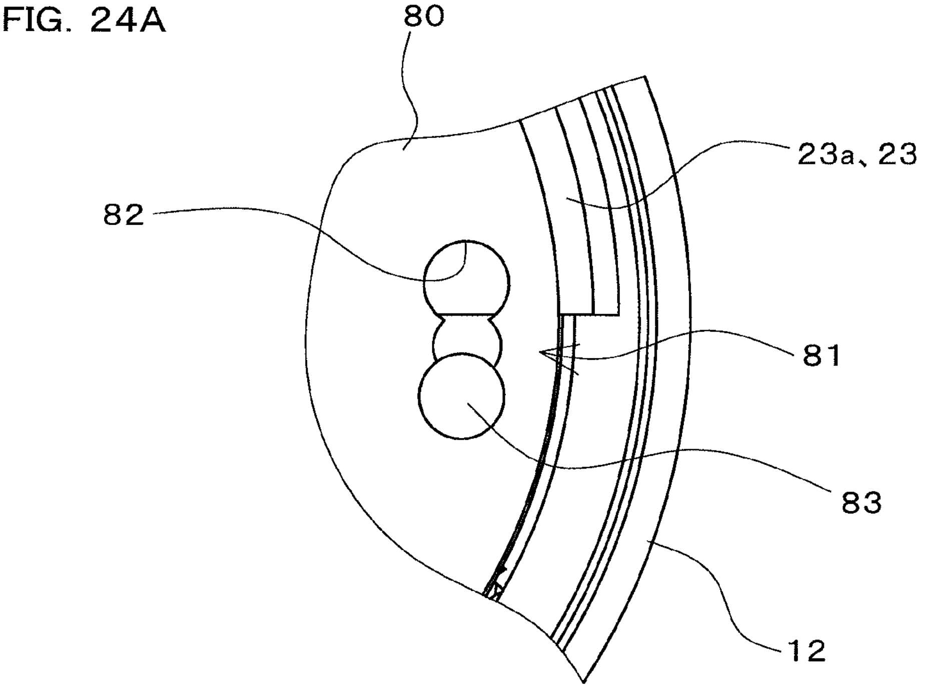
FIGS. 24A and 24B are diagrams showing an enlargement of a part of FIGS. 21A and 21B.
Figure 24B:
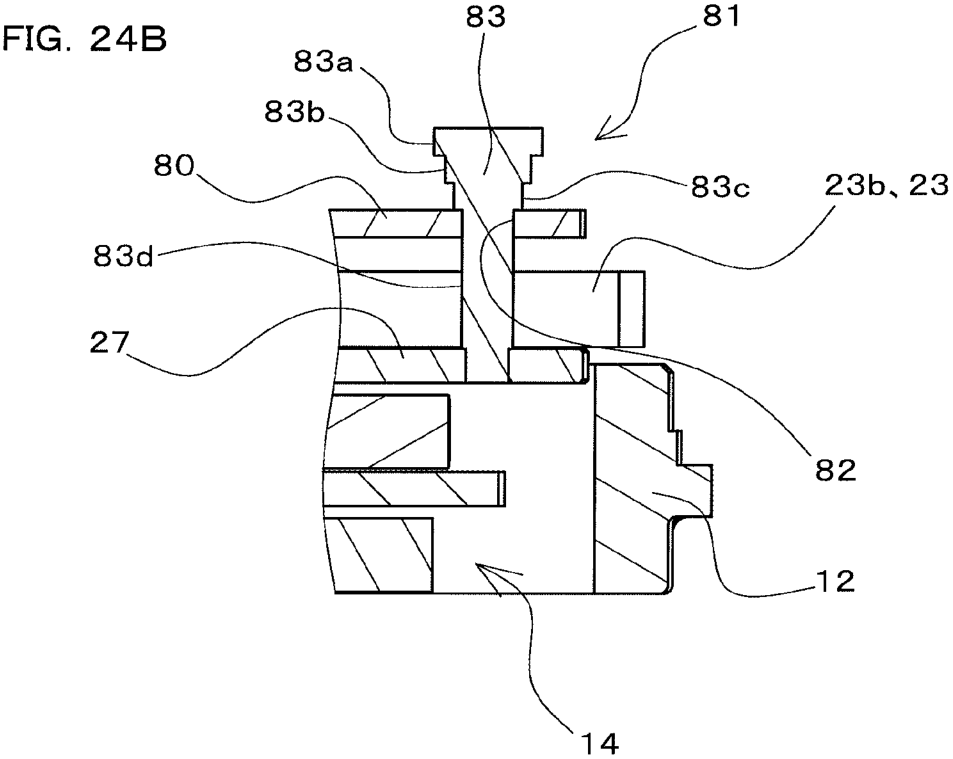

FIGS. 24A and 24B include a diagram showing an enlargement of a part of FIG. 21A (FIG. 24A) and a diagram showing an enlargement of a part of FIG. 21B (FIG. 24B). Note that FIG. 20 omits hatching for indicating a cross-section, from the viewpoint of more clearly showing the structure. FIGS. 22A, 22B, 23A, and 23B show the centrifugal brake unit 13*d* as viewed from the outside in the vehicle width direction. FIGS. 22A, 22B, 23A, and 23B show the centrifugal brake unit 13*d* in different operational states.

The speed control device 5 is configured substantially similarly to the speed control device 1 in the first embodiment, and the centrifugal brake unit 13*d* is also configured substantially similarly to the centrifugal brake unit 13 in the first embodiment. However, the speed control device 5 is different from the speed control device in the first embodiment in the configuration of a position change mechanism 75 and a transmission mechanism 76 in the centrifugal brake unit 13*d*. The difference from the first embodiment will now be described, and the elements that are configured similarly to those in the first embodiment will be given the same reference numerals in the diagrams or described with reference to the same reference numerals to omit the description of these elements.

The position change mechanism 75 is installed within a brake drum 11, and is provided as a mechanism for changing positions of ends of springs 24 on one end side, each being an elastic member. This position change mechanism 75 includes spring position holding portions 77 and drive portions 78.

A pair of spring position holding portions 77 (77*a*, 77*b*) are provided, each serving as an elastic member position holding portion in the present embodiment, and are provided as members for holding the ends of the springs 24 (24*a*, 24*b*) on the one end side. The pair of spring position holding portions 77 (77*a*, 77*b*) are provided so as to correspond to the pair of springs 24 (24*a*, 24*b*), and are installed at positions opposed to each other via the radial center of the support plate 27.

The spring position holding portion 77*a* is provided with a recessed portion for holding the end of the spring 24*a* on the one end side, and the spring position holding portion 77*b* is provided with a recessed portion for holding the end of the spring 24*b* on the one end side. Note that the spring 24*a* is held such that its end on the one end side fits into the recessed portion of the spring position holding portion 77*a*, and an end of the spring 24*a* on the other end side biases an end on one end side of a brake shoe 23*a* outward in the radial direction of the support plate 27. The spring 24*b* is held such that its end on the one end side fits into the recessed portion of the spring position holding portion 77*b*, and an end of the spring 24*b* on the other end side biases an end on one end side of the brake shoe 23*b* outward in the radial direction of the support plate 27.

The position change mechanism 75 is further provided with guide portions (79, 79) that are installed so as to be integrated with or fixed to the support plate 27 and installed on the two sides of the respective spring position holding portions (77*a*, 77*b*), and slidably support the spring position holding portions (77*a*, 77*b*) in a radial direction of the support plate 27.

A pair of drive portions 78 (78*a*, 78*b*) are provided so as to correspond to the respective spring position holding portions 77. The drive portions 78 are configured as members for driving the spring position holding portions 77 so as to change positions of the spring position holding portions 77 that hold the ends of the springs 24, with a force that is input from the outside and transmitted by the transmission mechanism 76, which will be described later. Note that the drive portion 78*a* is provided so as to change the position of the spring position holding portion 77*a*, and the drive portion 78*b* is provided so as to change the position of the spring position holding portion 77*b*. Further, the drive portions (78*a*, 78*b*) are installed between the pair of guide portions (79, 79), and are installed so as to be displaced along a direction perpendicular to the support plate 27 as a result of their moving directions being guided by the pair of guide portions (79, 79).

As described above, the position change mechanism 75 is configured to drive the spring position holding portions (77*a*, 77*b*) in directions in which the respective springs (24*a*, 24*b*) extend and compress, as a result of the drive portions (78*a*, 78*b*) moving perpendicularly to the support plate 27 along the guide portions (79, 79).

Here, the position change mechanism 75 will be described in more detail. In the present embodiment, the position change mechanism 75 is configured as a wedge-shaped mechanism with which the spring position holding portions 77 are displaced as a result of opposed tapered faces sliding relative to each other.

The spring position holding portions 77 (77*a*, 77*b*) are configured as spring-side wedge-shaped members, which are elastic member-side wedge-shaped members, each being provided with one of the opposed tapered faces, in the present embodiment. On the other hand, the drive portions 78 (78*a*, 78*b*) are configured as drive-side wedge-shaped members, each being provided with the other of the opposed tapered faces. Note that in the following description, the spring position holding portions 77 (77*a*, 77*b*) will also be referred to as the spring-side wedge-shaped members 77 (77*a*, 77*b*), and the drive portions 78 (78*a*, 78*b*) will also be referred to as the drive-side wedge-shaped members 78 (78*a*, 78*b*).

The tapered face of each spring-side wedge-shaped member (77*a*, 77*b*) and the tapered face of the corresponding drive-side wedge-shaped member (78*a*, 78*b*) are configured as faces that extend obliquely with respect to the moving direction of the drive-side wedge-shaped member (78*a*, 78*b*) that is perpendicular to the support plate 27. For this reason, as described above, the position change mechanism 75 drives the spring position holding portions (77*a*, 77*b*) along the extending and compressing direction of the springs (24*a*, 24*b*) as a result of the drive portions (78*a*, 78*b*) sliding in a direction perpendicular to the support plate 27 and the tapered faces sliding relative to each other. Note that in the present embodiment, each drive-side wedge-shaped member (78*a*, 78*b*) is provided with a pair of tapered faces, and these tapered faces are provided at respective ends of the drive-side wedge-shaped member (78*a*, 78*b*). The pair of tapered faces of each drive-side wedge-shaped member (78*a*, 78*b*) are configured to slide with respect to the tapered faces of the spring-side wedge-shaped members (77*a*, 77*b*).

The transmission mechanism 76 includes a disk-like plate portion 80 that is supported around the rotary shaft 20 so as to be capable of rotating around the rotary shaft 20. The plate portion 80 is provided as a member that is installed so as to be exposable to the outside at least partially, and to which a force in a direction perpendicular to the support plate 27 is input by a user operation from the outside. The plate portion 80 is provided as a plate-like portion installed in contact with the drive portions 78, and is held with respect to the support plate 27 via positioning mechanisms 81, which will be described later. Thus, the plate portion 80 is installed so as to receive a force deriving from the springs 24 via the spring position holding portions 77 and the drive portions 78.

With the above-described configuration, the plate portion 80 is configured to transmit a force in a direction perpendicular to the support plate 27 to the drive portions 78, as a result of a force in a direction perpendicular to the support plate 27 being input from the outside. Accordingly, when the plate portion 80 is operated in a direction in which it is pushed toward the support plate 27 against a reaction force deriving from the springs 24, the drive portions 78 approach the support plate 27. Then, the tapered faces of each drive portion (drive-side wedge-shaped member) 78 and the corresponding spring position holding portion (spring-side wedge-shaped member) 77 slide relative to each other, and the spring position holding portions 77 change the positions of the ends of the springs 24 on the one end side outward in the radial direction of the support plate 27.

On the other hand, when the plate portion 80 is operated in a direction in which it moves away from the support plate 27 while keeping balance with the reaction force deriving from the springs 24, the drive portions 78 move away from the support plate 27. Then, the tapered faces of each drive portion (drive-side wedge-shaped member) 78 and the corresponding spring position holding portion (spring-side wedge-shaped member) 77 slide relative to each other, and the spring position holding portions 77 changes the positions of the ends of the springs 24 on the one end side radially inward of the support plate 27.

As described above, in the speed control device 5, the position change mechanism 75 is configured as the wedge-shaped mechanism including the drive-side wedge-shaped members 78 and the spring-side wedge-shaped members 77. Further, in the speed control device 5, the positions of the ends of the springs 24 on the one end side held by the spring position holding portions 77 change as a result of the operation of the plate portion 80 in a direction perpendicular to the support plate 27 being performed. With this change, the condition under which the springs 24 bias the brake shoes 23 changes, and the speed at which the centrifugal brake operates changes. Note that FIGS. 23A and 23B show the state where the ends of the springs 24 on the one end side have moved outward in the radial direction of the support plate 27, compared with the state shown in FIGS. 22A and 22B.

The speed control device 5 is provided with the positioning mechanisms 81 in the transmission mechanisms 76. The positioning mechanisms 81 are provided as mechanisms capable of positioning the ends of the springs 24 on the one end side by changing the positions with respect to a plurality of predetermined positions, and a plurality of positioning mechanisms 81 are provided in the present embodiment. Each positioning mechanism 81 includes an elongated hole 82 provided so as to pass through the plate portion 80, and a positioning pin 83 that is installed in a state of penetrating the elongated hole 82 and is capable of being locked with respect to the elongated hole 82 at a plurality of points of this elongated hole 82.

The elongated hole 82 is provided as an elongated hole that extends along a circumferential direction around the rotation center of the plate portion 80. The elongated hole 82 is provided with arc-shaped enlarged portions, each being formed so as to expand in an arc shape such that their radial dimensions from the rotation center of the plate portion 80 increase at a plurality of points of the aforementioned circumferential direction. In the present embodiment, an exemplary configuration with three arc-shaped enlarged portions is described. The three arc-shaped enlarged portions are provided such that the diameter dimensions of the arcs are different in three steps.

As clearly shown in FIG. 24, the positioning pin 83 is fixed at its one end to the support plate 27, and is supported to the support plate 27 in a cantilevered manner. The positioning pin 83 is provided with a large diameter portion

83*a* with its largest radial dimension at its tip projecting from the support plate 27 in a cantilevered manner. A portion on the end side of the positioning pin 83 where the positioning pin 83 is supported to the support plate 27 is provided with a small diameter portion 83*d* with the smallest radial dimension that has a cylindrical shape.

A first intermediate diameter portion 83*b* and a second intermediate diameter portion 83*c* are provided in tandem in a portion between the large diameter portion 83*a* and the small diameter portion 83*d* of the positioning pin 83. The first intermediate diameter portion 83*b* has a smaller radial dimension than that of the large diameter portion 83*a*, and the second intermediate diameter portion 83*c* has a radial dimension that is smaller than that of the first intermediate diameter portion 83*b* and is larger than that of the small diameter portion 83*c*. The radial dimensions of the first intermediate diameter portion 83*b*, the second intermediate diameter portion 83*c*, and the small diameter portion 83*c* are set so as to individually correspond to and fit into the arc-shaped enlarged portions with arc diameter dimensions of the elongated hole 82 that are different in three steps. The radial dimension of the large diameter portion 83*a* is set larger than the diameter dimensions of the arcs of all the arc-shaped enlarged portions.

When the operation of the plate portion 80 is not performed, the positioning pin 83 is in a state where one of the first intermediate diameter portion 83*b*, the second intermediate diameter portion 83*c*, and the small diameter portion 83*d* fits into one of the arc-shaped enlarged portions of the elongated hole 82.

On the other hand, when the operation of pressing on the plate portion 80 is performed, the elongated hole 82 is enabled to relatively move along its longitudinal direction with respect to the positioning pin 83, and the operation of rotating the plate portion 80 is enabled. The user cancels the rotation operation and the pressing operation at the stage where the positioning pin 83 has moved up to the position corresponding to a desired arc-shaped enlarged portion of the elongated hole 82. As a result, the positioning pin 83 is locked in the elongated hole 82 at a different arc-shaped enlarged portion from the arc-shaped enlarged portion used in a state before the user operation is performed. With the above-described operation of the plate portion 80, the user can easily position the ends of the springs 24 on the one end side by selecting desired positions from a plurality of predetermined positions.

With the above-described speed control device 5, as with the speed control device 1 in the first embodiment, the speed at which the centrifugal brake operates can be easily changed from the outside without disassembling the device.

With the speed control device 5, since the position change mechanism 25 is provided as a wedge-shaped mechanism, the mechanism for changing the positions of the ends of the springs 24 on the one end side can be configured in a compact manner with a small structure.

With the speed control device 5, the transmission mechanism 76 includes the plate portion 80 installed in contact with the drive portions 78, and the plate portion 80 is provided so as to be exposable to the outside. For this reason, the transmission mechanism 76 for transmitting an external force to the position change mechanism 75 can be realized with a small number of constituent components and a simple structure.

With the speed control device 5, the transmission mechanism 76 is provided with the positioning mechanisms 81 capable of positioning the ends of the springs 24 on the one end side at a plurality of predetermined positions. For this reason, the task of changing the speed at which the centrifugal brake is operated is facilitated, and the task of configuring settings such that the centrifugal brake operates at the same speed for both wheels of the vehicle 101 can also be easily performed.

Figure 25:
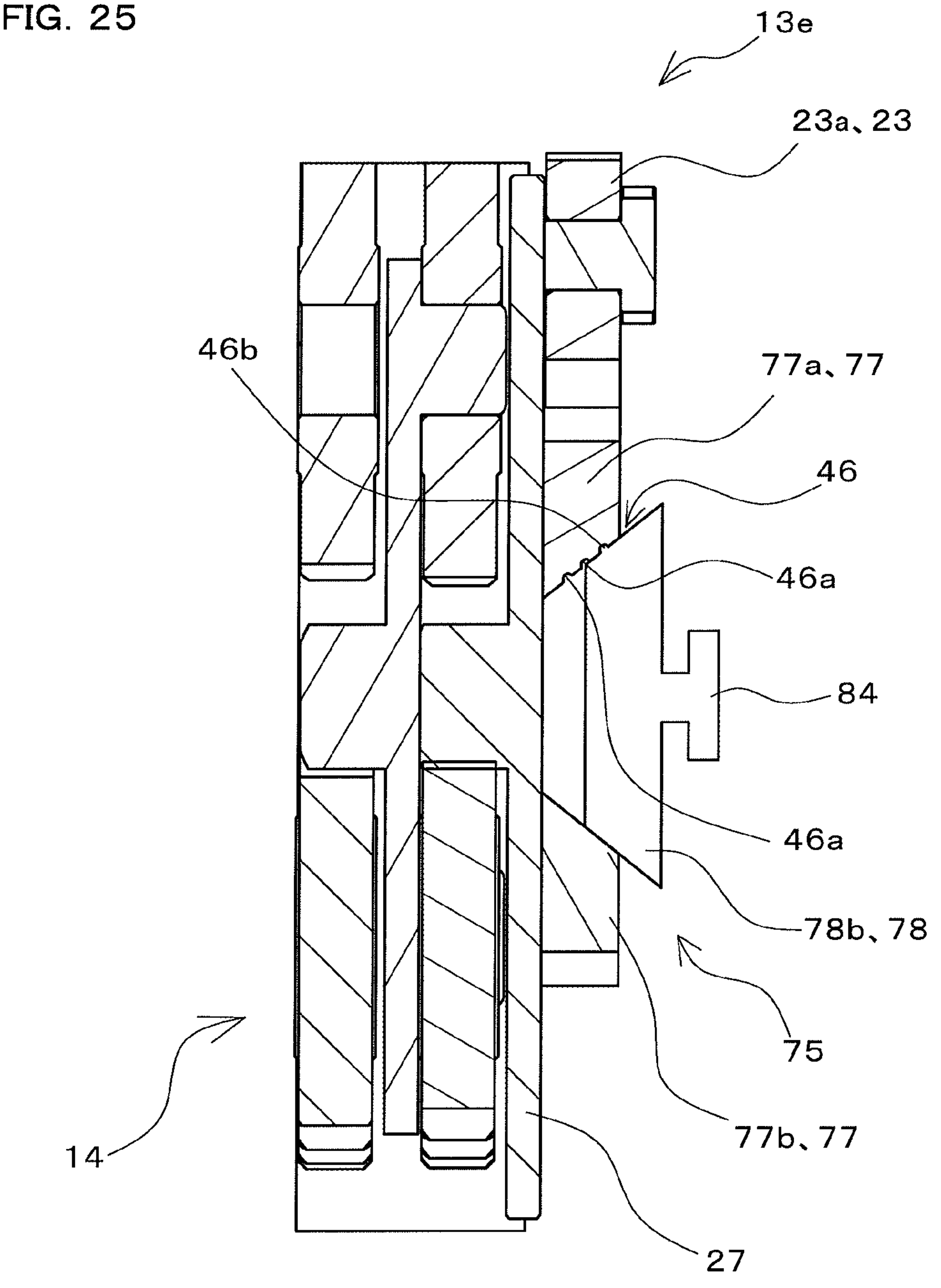
FIG. 25 is a diagram showing a variation of the fifth embodiment.

Note that the fifth embodiment may be modified as shown in FIG. 25. The centrifugal brake unit 13*e* according to the modification shown in FIG. 25 is different from the centrifugal brake unit 13*d* in that an operating portion 84 is provided in place of the plate portion 80, and in that a positioning mechanism 46 configured similarly to that in the first embodiment is provided in place of the positioning mechanism 81. Note that the cross-section of the centrifugal brake unit 13*e* shown in FIG. 25 is shown as a cross-section corresponding to the cross-section of the centrifugal brake unit 13*d* shown in FIG. 22A.

The operating portion 84 is configured as a portion that is subjected to an operational force applied by the user. The operating portion 84 is installed so as to be exposable to the outside, and is provided so as to be integrated with or fixed to the drive-side wedge-shaped members 78, each being provided with one of the tapered faces of the position change mechanism 75 serving as the wedge-shaped mechanism. The positioning mechanism 46 includes a plurality of recessed portions 46*a* (in the present modification, an exemplary configuration with three recessed portions is shown), and a projecting portion 46*b*, as in the first embodiment. The recessed portions 46*a* are provided as a plurality of recessed sections that are recessed on the tapered face of each spring-side wedge-shaped member 77. The projecting portion 46*b* is provided as a projecting section that is provided on the tapered face of each drive-side wedge-shaped member 78 and capable of being separately locked at each of the recessed portions 46*a*.

With the above-described modification as well, as with the speed control device 1 in the first embodiment, the speed at which the centrifugal brake operates can be easily changed from the outside without disassembling the device. Further, the transmission mechanism includes the operating portion 84 that is provided so as to be integrated with or fixed to the drive portion 78, and the operating portion 84 is provided so as to be exposable to the outside. For this reason, the transmission mechanism for transmitting an external force to the position change mechanism 75 can be realized with a small number of constituent components and a simple structure.

Sixth Embodiment

Figure 26A:
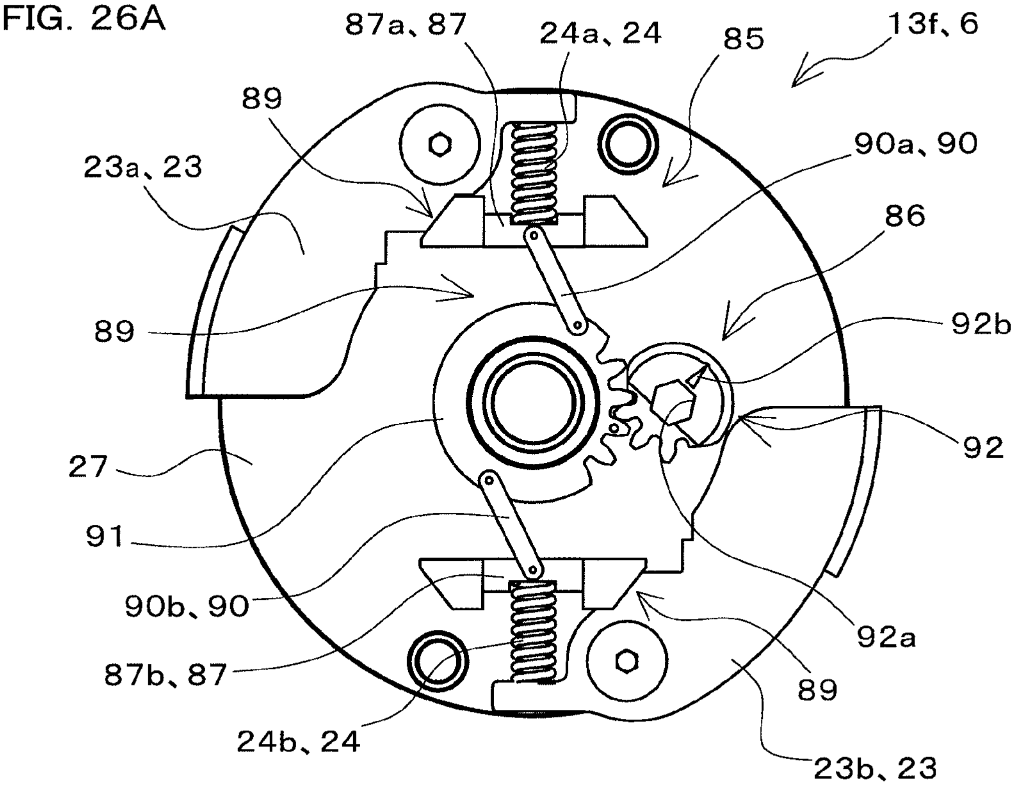
FIGS. 26A and 26B are diagrams schematically showing an internal structure of a vehicle speed control device according to a sixth embodiment of the present invention.
Figure 26B:
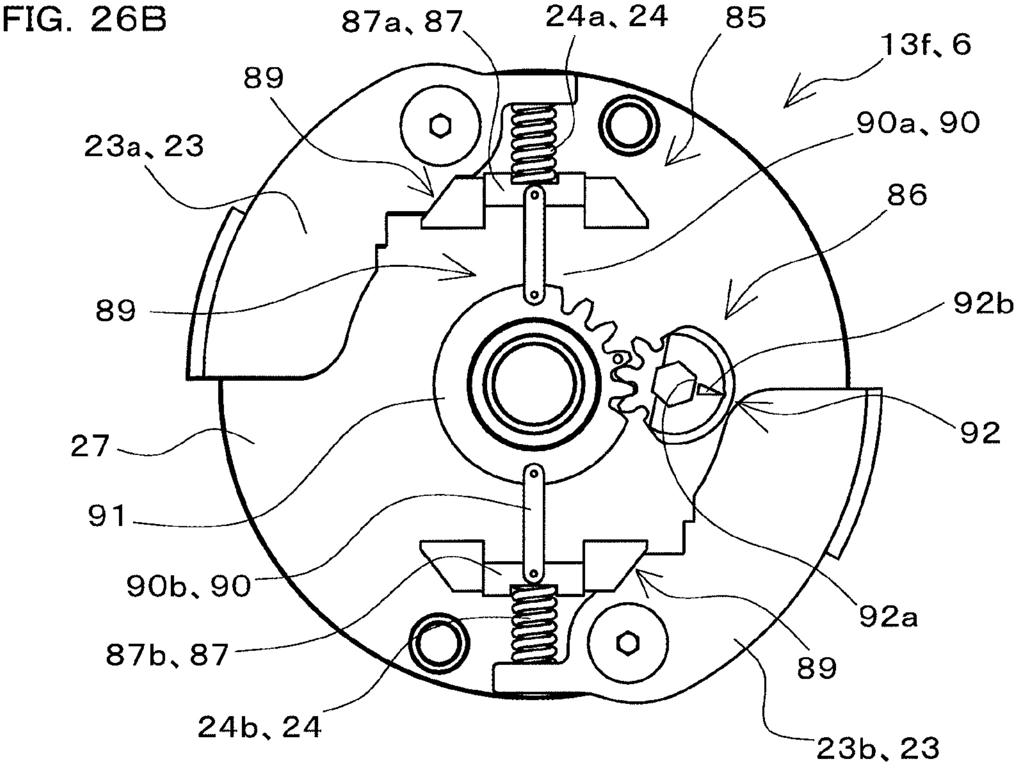

Next, the sixth embodiment of the present invention will be described. FIGS. 26A and 26B are diagrams schematically showing the internal structure of a vehicle speed control device 6 (hereinafter also referred to simply as a "speed control device 6") according to the sixth embodiment of the present invention, and show a centrifugal brake unit 13*f* from the outside in the vehicle width direction. FIGS. 26A and 26B show the centrifugal brake unit 13*f* in different operational states.

The speed control device 6 is configured substantially similarly to the speed control device 1 in the first embodiment, and the centrifugal brake unit 13*f* is also configured substantially similarly to the centrifugal brake unit 13 in the first embodiment. However, the speed control device 6 is different from the speed control device in the first embodiment in the configuration of a position change mechanism 85 and a transmission mechanism 86 in the centrifugal brake unit 13*f*. The difference from the first embodiment will now be described, and the elements that are configured similarly to those in the first embodiment will be given the same reference numerals in the diagrams or described with reference to the same reference numerals to omit the description of these elements.

The position change mechanism 85 is installed within a brake drum 11, and is provided as a mechanism for changing the positions of ends of springs 24 on one end side, each being an elastic member. This position change mechanism 85 includes spring position holding portions 87 and a drive portion 88.

A pair of spring position holding portions 87 (87*a*, 87*b*) are provided, each serving as an elastic member position holding portion in the present embodiment, and are provided as members for holding the ends of the springs 24 (24*a*, 24*b*) on the one end side. The pair of spring position holding portions 87 (87*a*, 87*b*) are provided so as to correspond to the pair of springs 24 (24*a*, 24*b*), and are installed at positions opposed to each other via the radial center of the support plate 27. The spring position holding portions (87*a*, 87*b*) are provided as block-like members.

The spring position holding portion 87*a* is provided with a recessed portion for holding the end of the spring 24*a* on the one end side, and the spring position holding portion 87*b* is provided with a recessed portion for holding the end of the spring 24*b* on the one end side. The position change mechanism 85 is further provided with guide portions (89, 89) that are provided so as to be integrated with or fixed to the support plate 27 and installed so as to correspond to the respective spring position holding portions (87*a*, 87*b*), and slidably support the respective spring position holding portions (87*a*, 87*b*) in a radial direction of the support plate 27.

The drive portion 88 is configured as a mechanism for driving the spring position holding portions 87 so as to change the positions of the spring position holding portions 87 that hold the ends of the springs 24, with a force that is input from the outside and transmitted by the transmission mechanism 86. The drive portion 88 includes link mechanisms 90 and a drive gear 91.

In the present embodiment, a pair of link mechanisms 90 (90*a*, 90*b*) are provided, and each of them is configured as a single link member. One end of each link mechanism (90*a*, 90*b*) is rotatably connected to the corresponding spring position holding portion (87*a*, 87*b*), and the other end is rotatably connected to the drive gear 91.

The drive gear 91 is installed so as to mesh with an adjustment gear 92 in the transmission mechanism 86. The drive gear 91 is rotatably supported to the support plate 27 at the center of the support plate 27. An outer gear that meshes with teeth of the adjustment gear 92 is provided on the outer circumference of the drive gear 91. This outer gear is provided as a part in the circumferential direction of the adjustment gear 92. As a result of the drive gear 91 rotating in a predetermined direction, the link mechanisms (90*a*, 90*b*) are displaced such that the spring position holding portion 87*a* and the spring position holding portion 87*b* move away from each other. On the other hand, as a result of the drive gear 91 rotating in a direction opposite to the aforementioned direction, the link mechanisms (90*a*, 90*b*) are displaced such that the spring position holding portion 87*a* and the spring position holding portion 87*b* approach each other.

The transmission mechanism 86 includes the adjustment gear 92. The adjustment gear 92 is rotatably supported to the support plate 27. The adjustment gear 92 is provided with a hexagonal hole 92*a* capable of engaging with an end of the operation tool 16. Further, the adjustment gear 92 is provided so as to be capable of transmitting a force that is input from the outside via an operation tool 16 with its end engaging with a hexagonal hole 92*a* by a user, to a drive pinion 91 of the drive portion 88. Accordingly, as a result of the operation being performed to rotate the adjustment gear 92, the drive pinion 91 rotates, the link mechanisms 90 are displaced, and the positions of the spring position holding portions 87 change. Note that the outer gear that meshes with the teeth of the drive pinion 91 is provided on the outer circumference of the adjustment gear 92. This outer gear is provided as a part in the circumferential direction of the adjustment gear 92.

The adjustment gear 92 is installed such that at least the hexagonal hole 92*a* and an indicator 92*b*, which is shown as an exemplary triangular mark imprinted in an end face where the hexagonal hole 92*a* is provided, are exposable to the outside. Thus, the user can visually check the hexagonal hole 92*a* and the indicator 92*b* from the outside. Note that when the user operates the adjustment gears 92 using the operation tool 16, he/she can recognize the amount of operation by visually checking the rotational position of the indicator 92*b* that rotates with the adjustment gears 92.

As described above, in the speed control device 6, the position change mechanism 85 includes the link mechanisms 90. Further, in the speed control device 6, the positions of the ends of the springs 24 on the one end side held by the spring position holding portions 87 change as a result of the operation being performed to rotate the adjustment gear 73. With this change, the condition under which the springs 24 bias the brake shoes 23 changes, and the speed at which the centrifugal brake operates changes. Note that FIG. 26B shows a state where the ends of the springs 24 on the one end side have moved outward in the radial direction of the support plate 27, compared with the state shown in FIG. 26A.

Note that the speed control device 6 is provided with a positioning mechanism, as in the first to fifth embodiments. In this case, for example, the speed control device 6 may be provided with a positioning mechanism configured similarly to that in the third embodiment.

With the above-described speed control device 6, as with the speed control device 1 in the first embodiment, the speed at which the centrifugal brake operates can be easily changed from the outside without disassembling the device.

With the speed control device 6, since the position change mechanism 85 is provided so as to have a configuration including the link mechanisms 90, the mechanism for changing the positions of the ends of the springs 24 on the one end side can be configured in a compact manner with a small structure.

In the speed control devices according to the first to sixth embodiments, the mechanisms for changing the speed at which the centrifugal brake operates, such as the position change mechanism and the transmission mechanism, are housed substantially within the width of the wheel and do not protrude. Accordingly, the mechanisms do not interfere when being attached to an existing vehicle, and the degree of flexibility in installation also increases.

Although the embodiments of the present invention were described thus far, the present invention is not limited to the above-described embodiments, and may be modified in various manners for implementation within the scope recited in Claims.

INDUSTRIAL APPLICABILITY

The present invention is widely applicable to a vehicle speed control device that is provided in a vehicle whose vehicle body moves due to a wheel rotatably attached to the vehicle body rotating as a result of a person manually pushing the vehicle body and that is capable of controlling the vehicle speed, and to a vehicle equipped with this speed control device.

DESCRIPTIONS OF REFERENCE NUMERALS

1 Vehicle speed control device
11 Brake drum
20 Rotary shaft
23, 23*a*, 23*b* Brake shoe
24, 24*a*, 24*b* Spring member (elastic member)
25 Position change mechanism
26 Transmission mechanism
101 Vehicle
101*a* Vehicle body
101*c* Wheel

The invention claimed is:

1. A vehicle speed control device for a vehicle whose vehicle body moves due to a wheel rotatably attached to the vehicle body rotating as a result of a person manually pushing the vehicle body and is capable of controlling a speed of the vehicle, comprising:

a brake drum that has a tubular portion and is configured to be fixed to the vehicle body;

a brake shoe that rotates around a rotary shaft of the wheel and reduces a rotation speed of the wheel with friction by coming into contact with an inner circumferential side face of the brake drum;

an elastic member for preventing contact between the brake drum and the brake shoe when the rotation speed of the wheel is lower than or equal to a braking speed, and permitting contact between the brake drum and the brake shoe when the rotation speed of the wheel exceeds the braking speed;

a position change mechanism that is installed within the brake drum and changes a position of an end of the elastic member on one end side, wherein the change of the position of the end of the elastic member changes the braking speed; and a transmission mechanism for transmitting a force that is input by an external operation to the position change mechanism and driving the position change mechanism, wherein the position change mechanism has an elastic member position holding portion that holds the end of the elastic member on the one end side, and a drive portion for driving the elastic member position holding portion so as to change the position of the elastic member position holding portion that holds the end of the elastic member, with the force that is input from an outside and transmitted by the transmission mechanism, and the position change mechanism has at least one of a rack-and-pinion mechanism, a link mechanism which comprises a link member rotatably connected to another link member or the elastic member position holding portion at an end of the link member, and a wedge-shaped mechanism with which the elastic member position holding portion is displaced as a result of opposed tapered faces sliding relative to each other.

2. The vehicle speed control device according to claim 1, wherein the transmission mechanism has any one of:

an adjustment gear that is installed such that at least a part thereof is exposable to the outside, and transmits the force that is input from the outside, to the drive portion;

a plate portion that is installed such that at least a part thereof is exposable to the outside, and is provided as a plate-like portion that is installed so as to be integrated with, fixed to or in contact with the drive portion; and an operating portion that is installed such that at least a part thereof is exposable to the outside, and is provided so as to be integrated with or fixed to a wedge-shaped member that is provided with one of the opposed tapered faces in the wedge-shaped mechanism.

3. The vehicle speed control device according to claim 1, wherein at least one of the position change mechanism and the transmission mechanism has a positioning mechanism capable of positioning the end of the elastic member on the one end side by changing the position with respect to a plurality of predetermined positions.

4. The vehicle speed control device according to claim 3, wherein the position change mechanism is configured as a wedge-shaped mechanism in which the elastic member position holding portion is displaced as a result of the opposed tapered faces sliding relative to each other, the elastic member position holding portion includes an elastic member-side wedge-shaped member provided with one of the opposed tapered faces, the drive portion includes a drive-side wedge-shaped member provided with the other of the opposed tapered faces, and the positioning mechanism has a plurality of recessed portions provided in one of the tapered face of the elastic member-side wedge-shaped member and the tapered face of the drive-side wedge-shaped member, and a projecting portion that is provided in the other of the tapered face of the elastic member-side wedge-shaped member and the tapered face of the drive-side wedge-shaped member, and that is capable of being locked in the recessed portions.

5. The vehicle speed control device according to claim 3, wherein the transmission mechanism has a rotary plate portion that is installed such that at least a part thereof is exposable to the outside and is provided as a plate-like portion installed so as to be integrated with, fixed to or in contact with the drive portion, and the force is input to the rotary plate portion as a result of a rotating operation from the outside, and the positioning mechanism has a through hole provided in the rotary plate portion, and a pin member that is installed in a state of passing through the through hole and is capable of being locked with respect to the through hole at a plurality of points of the through hole.

6. The vehicle speed control device according claim 1, wherein the elastic member is provided as a compression spring for biasing the brake shoe with respect to the position change mechanism, in a compressed state.

7. The vehicle speed control device according to claim 1, further comprising:

a planetary gear mechanism that is provided on a path through which rotation is transmitted from the wheel to the brake shoe, accelerates and transmits the rotation of the wheel.

8. The vehicle speed control device according to claim 7, wherein the planetary gear mechanism has a sun gear, a planetary gear that rotates on an axis of the planetary gear and revolves around the sun gear while meshing with the sun gear, and a carrier that rotatably supports the planetary gear, and the carrier is provided so as to be integrated with or fixed to a wheel structure portion of the wheel.

9. The vehicle speed control device according to claim 8, wherein the sun gear comprises a first sun gear and a second sun gear, the planetary gear comprises a first planetary gear and a second planetary gear, and the carrier comprises a first carrier and a second carrier, wherein the planetary gear mechanism includes:

a first-stage accelerating portion having the first sun gear, the first planetary gear, and the first carrier; and a second-stage accelerating portion that has the second sun gear, the second planetary gear, and the second carrier, and accelerates and transmits rotation of the first-stage accelerating portion, and the first carrier in the first-stage accelerating portion is provided so as to be integrated with or fixed to the wheel structure portion of the wheel, and the first sun gear in the first-stage accelerating portion and the second carrier in the second-stage accelerating portion are provided so as to be integrated with or fixed to each other.

10. The vehicle speed control device according to claim 1, wherein a tire provided on an outer circumference of the wheel is installed concentrically with the brake drum.

11. The vehicle speed control device according to claim 1, further comprising:

a cover that is detachably attached to the wheel on an outside in a vehicle width direction that is a width direction of the vehicle body, and covers a part of the wheel; and an operation tool that is installed on the cover in an attachable and detachable manner on the inside in the vehicle width direction, and is used in an operation by which the force from the outside is input to the transmission mechanism.

12. The vehicle speed control device according to claim 1, wherein in the position change mechanism having the wedge-shaped mechanism, the elastic member position holding portion includes an elastic member-side wedge-shaped member provided with one of the opposed tapered faces, and the drive portion includes a drive-side wedge-shaped member provided with the other of the opposed tapered faces, and the transmission mechanism includes an adjustment gear that is installed such that at least a part thereof is exposable to the outside and transmits the force that is input from the outside to the drive portion, a pinion that meshes with the adjustment gear, and a rack portion that meshes with the pinion and is provided so as to be integrated with or fixed to the drive-side wedge-shaped member.

13. The vehicle speed control device according to claim 12, wherein an outer gear that is provided on an outer circumference of the adjustment gear and meshes with the pinion is provided as a part in a circumferential direction of the adjustment gear.

14. The vehicle speed control device according to claim 12, further comprising:

a support plate in which the position change mechanism is installed, and that pivotably supports the brake shoe and rotatably supports the adjustment gear and the pinion; and a pressure plate that is attached so as to be opposed to the support plate via the brake shoe, the adjustment gear, the pinion, and the position change mechanism, in a state of being parallel to the support plate.

15. A vehicle comprising:

a vehicle body;

a wheel; and a vehicle speed control device;

wherein the vehicle body of the vehicle moves due to the wheel rotatably attached to the vehicle body rotating as a result of a person manually pushing the vehicle body and is capable of controlling a speed of the vehicle, the vehicle speed control device comprising:

a brake drum that has a tubular portion and is fixed to the vehicle body;

a brake shoe that rotates around a rotary shaft of the wheel and reduces a rotation speed of the wheel with friction by coming into contact with an inner circumferential side face of the brake drum;

an elastic member for preventing contact between the brake drum and the brake shoe when the rotation speed of the wheel is lower than or equal to a braking speed, and permitting contact between the brake drum and the brake shoe when the rotation speed of the wheel exceeds the braking speed;

a position change mechanism that is installed within the brake drum and changes a position of an end of the elastic member on one end side, wherein the change of the position of the end of the elastic member changes the braking speed; and a transmission mechanism for transmitting a force that is input by an external operation to the position change mechanism and driving the position change mechanism, wherein the position change mechanism has an elastic member position holding portion that holds the end of the elastic member on the one end side, and a drive portion for driving the elastic member position holding portion so as to change the position of the elastic member position holding portion that holds the end of the elastic member, with the force that is input from an outside and transmitted by the transmission mechanism, and the position change mechanism has at least one of a rack-and-pinion mechanism, a link mechanism which comprises a link member rotatably connected to another link member or the elastic member position holding portion at an end of the link member, and a wedge-shaped mechanism with which the elastic member position holding portion is displaced as a result of opposed tapered faces sliding relative to each other.

* * * * *